US006888813B1

United States Patent
Kishi

(10) Patent No.: US 6,888,813 B1
(45) Date of Patent: May 3, 2005

(54) CODE DIVISION MULTIPLE ACCESS (CDMA) TRANSMISSION SYSTEM

(76) Inventor: Masahichi Kishi, 218 Higashihazama, Nagakute-cho, Aichi-gun, Aichi 480-1123 (JP)

( * ) Notice: Subject to any disclaimer, the term of this patent is extended or adjusted under 35 U.S.C. 154(b) by 0 days.

(21) Appl. No.: 09/700,384

(22) PCT Filed: May 12, 1999

(86) PCT No.: PCT/JP99/02443

§ 371 (c)(1),
(2), (4) Date: Jan. 2, 2001

(87) PCT Pub. No.: WO99/59280

PCT Pub. Date: Nov. 18, 1999

(30) Foreign Application Priority Data

May 14, 1998 (JP) .......................................... 10-132017

(51) Int. Cl.$^7$ .............................................. H04B 7/216
(52) U.S. Cl. ........................ 370/342; 370/441; 375/140
(58) Field of Search ................................ 370/208, 335, 370/342, 441, 442, 503, 320, 209; 375/140, 206, 220

(56) References Cited

U.S. PATENT DOCUMENTS

| 5,729,570 A | * | 3/1998 | Magill ......................... 375/149 |
| 6,072,770 A | * | 6/2000 | Ho et al. ..................... 370/209 |
| 6,072,785 A | * | 6/2000 | Ho .............................. 370/320 |

FOREIGN PATENT DOCUMENTS

| JP | 56-86559 | 7/1981 |
| JP | 4-79438 | 3/1992 |
| JP | 8-125583 | 5/1996 |
| JP | 8-125584 | 5/1996 |
| JP | 9-289501 | 11/1997 |
| JP | 10-294718 | 11/1998 |

OTHER PUBLICATIONS

Noneaker et al., "Rake Reception For A CDMA Mobile Communication System With Multipath Fading", *Spread Spectrum Techniques And Applications*, 1994, IEEE ISSSTA '94., Jul. 4, 1994, pp. 98–104.
Tero Ojanpera et al., "Wideband CDMA For Third Generation Mobile Communications", *Artech House*, London, Jan. 1, 1998, p. 37.

\* cited by examiner

*Primary Examiner*—John Pezzlo
(74) *Attorney, Agent, or Firm*—Antonelli, Terry, Stout & Kraus, LLP

(57) ABSTRACT

A large-capacity CDMA transmission system that can realize communication with a moving unit such as an automobile, transmitting more quantity of information than the conventional system without increasing the occupied band width, using the same or narrower frequency band width.

This system assumes the code division multiple access (CDMA) transmission system for simultaneous multiple communication, which performs phase modulation on a carrier signal while maintaining a phase of the carrier signal in a predetermined period at a predetermined value, so as to generate a primary modulated wave, and then, multiplies the obtained primary modulated wave by a spread code sequence. On the transmitting side, a differential coding phase modulation (DPSK) is employed to generate a primary modulated wave. On the other hand, on the receiving side, a quasi-synchronous detection and difference operation are utilized to detect the phase difference between the last symbol interval and the current symbol interval, and the detected phase difference is given as the information of the current symbol interval.

17 Claims, 38 Drawing Sheets

EXAMPLE OF VIRTUAL SEGMENT INTERLEAVE STRUCTURE

EXAMPLE OF A DETAILED CONFIGURATION OF
DIFFERENTIAL CODING CIRCUIT (DP)

INPUT/OUTPUT CHARACTERISTICS OF π CORRECTOR (π COR)

EXAMPLE OF A CONFIGURATION OF DIFFERENTIAL CDMA RECEIVER

FIG.6 SCHEMATIC VIEW OF INFORMATION PHASE

EXAMPLE OF A DETAILED CONFIGURATION OF
PHASE CONTINUOUS DIFFERENTIAL CODING CIRCUIT (DP-CP)

EXAMPLE OF A DETAILED CONFIGURATION OF PHASE CONTINUATING CIRCUIT (CP)

SCHEMATIC VIEW OF PRIMARY MODULATED WAVEFORM

EXAMPLE OF A DETAILED CONFIGURATION OF SPREAD CODE SEQUENCE WAVEFORM CONTINUATING CIRCUIT (CODE-CS)

EXAMPLE OF VIRTUAL SEGMENT INTERLEAVE STRUCTURE

EXAMPLE OF A DETAILED CONFIGURATION OF VIRTUAL SEGMENT INTERLEAVE DESPREADING CIRCUIT (deSS-VSI)

FIG. 18 TRANSMISSION CHARACTERISTICS IN AUTOMOBILE TELEPHONE MODE OF DIFFERENTIAL CDMA TRANSMISSION SYSTEM

SCHEMATIC POWER SPECTRUM

TRANSMISSION CHARACTERISTICS IN AUTOMOBILE TELEPHONE MODE OF VIRTUAL SEGMENT DIFFERENTIAL CDMA TRANSMISSION SYSTEM

EXAMPLE OF A CONFIGURATION OF THE CONVENTIONAL CDMA TRANSMITTER

FIG.27 SCHEMATIC VIEW OF PRIMARY MODULATED WAVE AND SYMBOL STRUCTURE

EXAMPLE OF QPSK BIT CONSTELLATION

EXAMPLE OF π/4-SHIFTED QPSK BIT CONSTELLATION

EXAMPLE OF SEGMENT STRUCTURE IN A SYMBOL INTERVAL OF PRIMARY MODULATED WAVE

EXAMPLE OF CHIP STRUCTURE IN A SEGMENT INTERVAL OF PRIMARY MODULATED WAVE

FIG. 32 EXAMPLE OF A CONFIGURATION OF THE CONVENTIONAL CDMA RECEIVER

EXAMPLE OF A DETAILED CONFIGURATION OF DESPREADING CIRCUIT (deSS)

EXAMPLE OF A DETAILED CONFIGURATION OF PHASE CORRECTION CIRCUIT (CMP)

FIG. 36 TRANSMISSION CHARACTERISTICS IN STATIONARY TELEPHONE MODE OF THE CONVENTIONAL SYSTEM

TRANSMISSION CHARACTERISTICS IN PEDESTRIAN TELEPHONE MODE OF THE CONVENTIONAL SYSTEM

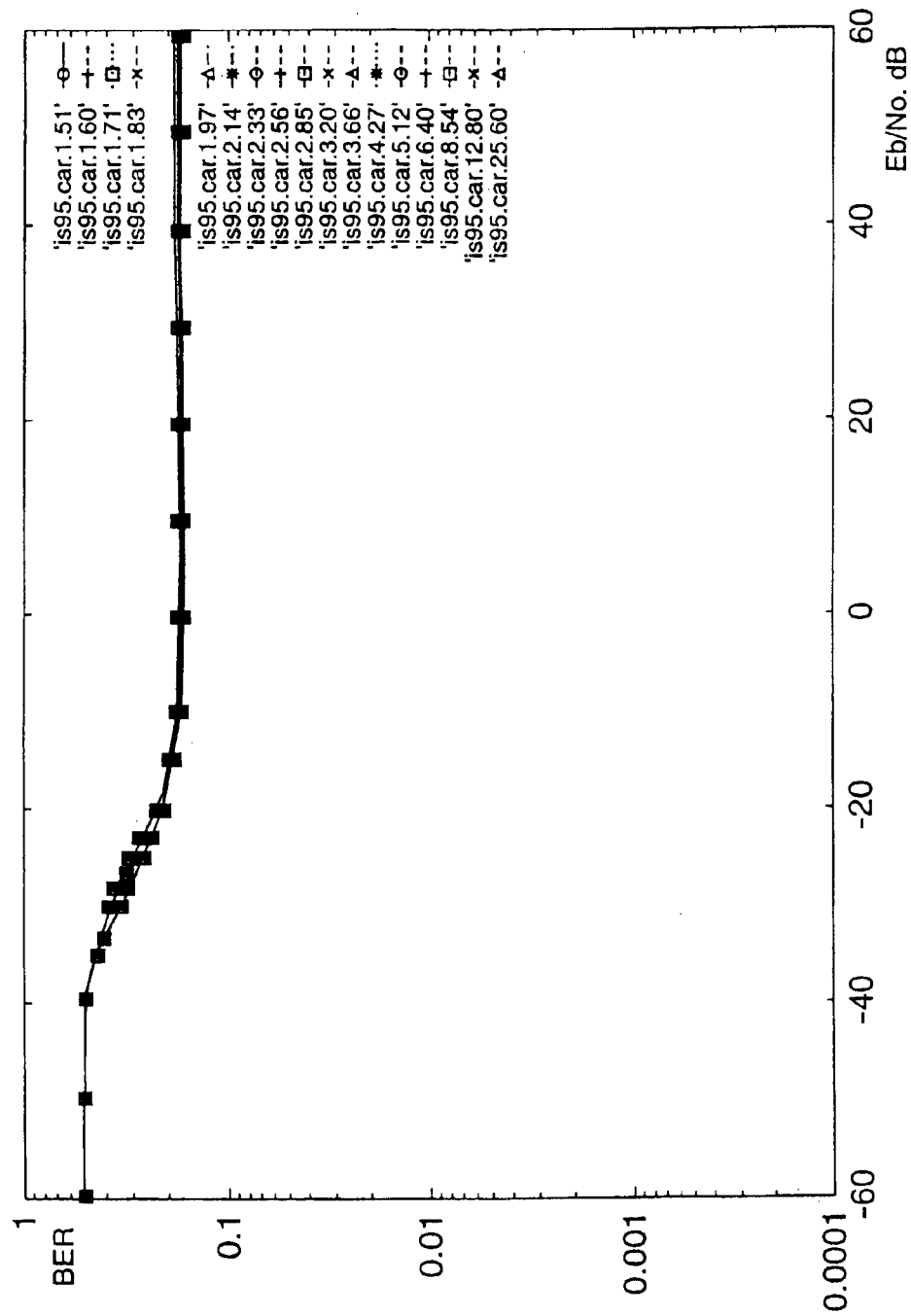

CODE DIVISION MULTIPLE ACCESS (CDMA) TRANSMISSION SYSTEM

TECHNICAL FIELD

The present invention relates to the code division multiple access (CDMA) transmission system for transmitting high-speed digital information, in particular under severe fading environment such as in the mobile communication.

BACKGROUND ART

Recently, in the field of the mobile communication such as the automobile telephone and the pedestrian telephone, the code division multiple access (CDMA) transmission system has come into practical use. The principle of the CDMA transmission system will be summarized as follows.

A carrier signal in each symbol period of a certain length is subjected to Phase Shift Keying (PSK) according to information to be transmitted, to generate a primary modulated wave. In that case, if necessary, primary modulated waves are generated more than the number n of channels used for the code division multiple access.

The primary modulated wave is multiplied by a spread code of a specified code length such as 32 or 64, repeating a plurality of times equal to the number of segments in each symbol period, to generate a spread signal. The length of this spread code sequence is equal to the so-called spread factor. Further, it is assumed that spread codes are provided by a Walsh function or the like, and orthogonal to one another. Further, in a single spread code in each symbol period, a period from the first code to the last code is called a segment. Each symbol period consists of a plurality of segments. In particular, a segment corresponding to a spread code is called "transmission basic segment" or simply "basic segment". As referred to in describing the technique of despreading, a segment corresponding to a despread code is similarly called "basic segment" or simply "basic segment".

For every transmission basic segment and reception basic segment, the leading edge point and the trailing edge point coincide respectively with the point in the leading edge of the first code and the point in the trailing edge of the last code of the spread code or despread code. Except for delay times such as a processing delay and a transmission delay in transmission and reception, the transmission basic segment and the reception basic segment coincide temporally with each other. In this sense, "transmission basic segment" and "reception basic segment" are generally called "basic segment", and differentiated from "virtual segment". Here, "virtual segment" is a new concept disclosed in the present invention for improving receiving performance. Further, "transmission segment" is used for specifying a segment used for despread starting from a non-coincident point of time.

Adding n spread codes required for multiple access simultaneously utilizing n channels and at least one spread code indicating phase compensation information and control information required for the communication system, the sum total obtained by adding at least (n+1) spread signals is transmitted.

On the other hand, on a receiving side, control information such as chip timing, symbol timing, symbol period, and segment period is detected from a received wave. Then, the received wave is multiplied by a despread code corresponding to the spread code used at the time of transmission, so that the sum total of the received segments for the period during which the despread code continuity is obtained, to determine the despread value. For each symbol, the despread signal is obtained from the despread values of a plurality of received segments existing within the symbol period, to demodulate the primary modulated wave from a despreading circuit and to detect information phase within the symbol period. The phase value detected in this way is called a detected phase value. In mobile communication, severe fading occurs frequently, so that a phase error is generated in the detected phase value, largely deviating from a correct phase value. Thus, in order to compensate a phase error, a known phase value such as zero is subjected to the primary modulation and then a pilot signal obtained by spreading with a specific spread code, which is transmitted at the same time with the primary modulation. When the pilot signal is received, it is possible to know the phase error from the previously-known phase value. Assuming that phase errors of the same value arise with respect to all the spread codes, and subtracting that phase error from the detected phase value to correct it, disturbance due to fading etc. can be suppressed.

Next, information corresponding to the detected phase value corrected is identified, thus accomplishing transmission of the information.

Such conventional technique of CDMA transmission system will be further described referring to the drawings. In the figures, the same or like numerals or symbols denote the same or like components.

FIG. 26 shows an outlined configuration of an ordinary CDMA transmitter. In FIG. 26, a known value used for a pilot signal is inputted through an input terminal 100 and information values are inputted through n information input terminals 101–10n, to corresponding phase modulation circuits (MOD) 110 and 111–11n, respectively. The number n of the inputted information values means the number of channels simultaneously utilized in multiple access.

According to the inputted information, the phase modulation circuits perform phase modulation of a carrier signal to generate (n+1) primary modulated waves corresponding to the signals received through the input terminals 100–10n, respectively.

Spreading circuits (SS) 120–12n obtain the products of corresponding primary modulated waves and the spread codes applied from spread code generating circuits (CG) 130–130n, synchronously with the correspondence of the spread codes with the period of time (chip period), and output the obtained products as the spread codes, respectively. Here, the spread codes generated by the spread code generating circuits (CG) 130–13n are orthogonal to one another. Further, the spread code generating circuits (CG) are synchronous with one another, and generate spread codes corresponding to each line of a Walsh function and having the code length N more than or equal to (n+1), within one symbol period and repeating a plurality of times corresponding to the number of the segments, respectively.

Then, (n+1) spread codes and various control signals are summed in a summing circuit (SUM) 140. Output of the summing circuit (SUM) 140 is limited in its frequency band width by a bandlimiting circuit (BPF) 141, and if necessary, subjected to frequency conversion and power amplification in a transmitting circuit (TX) 142, prior to transmission.

Now, operation of the phase modulation circuits (MOD) 110–11n in the above-mentioned FIG. 26 will be described in detail in the following. Namely, in each of the phase modulation circuits (MOD) 110–11n, the carrier signal is divided into periods of a prescribed period T as shown by the primary modulated wave and symbol structure of FIG. 27. Phase of the carrier signal is modulated so that a phase of each period corresponds one-to-one to a symbol value 00, 01, 10, or 11 transmitted in one period, in accordance with the bit arrangement of QPSK shown in FIG. 28 or the bit arrangement of π/4-shifted QPSK shown in FIG. 29, to generate a primary modulated wave.

Here, the primary modulated wave generally refers to phase-modulated signals generated by QPSK, offset QPSK, differential QPSK, π/4-shifted differential QPSK, or the like. Further, when, as described above, QPSK is used for generating a primary modulated wave, it is assumed that a phase of a QPSK wave takes four kinds of values 0, 90, 180 and 270 degrees (or, 0, ±90 and ±180 degrees). When π/4-shifted QPSK is used, phase information of a QPSK wave takes four kinds of values 45, 135, 225 and 315 degrees (or, ±45 and ±135 degrees). Phase values are residues of 360 degrees, and phases of QPSK waves are set to divide the total phase space into the maximum parts. For example, when it is assumed that the reference phase is 0 degree in QPSK or 45 degrees in π/4-shifted QPSK, all the phases are spaced from each other at intervals of 90 degrees. By making four kinds of phases of primary waves correspond to the states 00, 01, 10 and 11, a transmission bit series can be made to correspond to a series of dibits each being a combination of two bits. Thus, each symbol can transmit two bits.

As shown in the figures, the symbols are set as 00, 01, 11, and 10 counterclockwise in order that a Hamming distance corresponding to adjacent phases becomes 1 and a Hamming distance corresponding to non-adjacent phases becomes 2. Here, the Hamming distance means the number of different bit values between states. For example, distance (00, 01), distance (01, 11), distance (11, 10) and distance (10, 00) are all 1, while distance (00, 11) and distance (10, 01) are each 2.

Such phase-to-state mapping is called Gray coding, and used for suppressing probability of a transmitted information error due to disturbances during propagation to a lower level. Logically, even when the received phase is shifted more than 45 degrees from the transmitted phase due to a disturbance and taken erroneously as an adjacent state, one bit out of the two is saved since the distance from the adjacent states is always set at 1.

As a matter of course, when phase error of 135 degrees or more arises, all the two bits become errors. In that case, however, any state assignment leads to all bit error, which can not be saved by Gray coding. Thus, it is impossible to save such an error without introducing an error correcting code or the like.

On the other hand, the symbol period T is a quantity defined by the reciprocal of the symbol rate. For example, when the symbol rate is 32 k symbol/sec. (hereinafter, symbol/sec will be expressed as sps), T becomes T=31.25 μseconds. When, the symbol rate is 32 ksps, the transmission speed of QPSK becomes 64 k bit/sec. (hereinafter, bit/sec. will be expressed as bps).

Next, operation of the spreading circuits (SS) 120–12n of FIG. 26 will be described in more detail.

Now, as shown in FIG. 30, each symbol period of a primary modulated wave is divided into four segment intervals, Segment 0 through Segment 3, each being the same period of time. Here, is given a description of the case of four segments per symbol. However, the other cases are similar and can be understood by analogy. Accordingly, their description will be omitted. Further, as shown in FIG. 31, each segment interval is divided into chip intervals, the number of which is equal to the number of codes in the spread code sequence. Further, it is assumed that a chip value is given by the product of a primary modulated wave and a spread code value in each chip interval. Since a primary modulated wave is a function of time, time resolution of a chip value is the chip period τ. However, since CDMA performs spreading operation and later-described despreading operation on a receiving side, time resolution of transmitted information is the segment period τN. Here, N is the code length.

The waveform of the spread signal shown in FIG. 31 shows a case in which the first code of a Walsh function having code length of 32 is used as the spread code.

Generally, a Walsh function is given by the following recurrence formula.

$$W_{2N} = \begin{vmatrix} W_N & W_N \\ W_N & \overline{W_N} \end{vmatrix} \qquad (1)$$

where $W_{2N}$ is a square matrix of 2N×2N,
$W_N$ is a square matrix of N×N, and
$\overline{W_N}$ is a square matrix of N×N whose elements are complements of the elements of $W_N$.

For example, $W_2$ whose element is square matrix of 1×1, i.e. a scalar, is given as follows.

$$W_2 = \begin{vmatrix} 0 & 0 \\ 0 & 1 \end{vmatrix} \qquad (2)$$

A row of such Walsh function $W_{2N}$ is used as a code sequence. Here, however, 0 of the Walsh function is made to correspond to "−1" and 1 of the Walsh function to "1". Then, when, for example, the i-th row is synchronized with chip times, zeroth to 31st colums, within a segment, a code sequence called an i-th Walsh code sequence is obtained. Here, 0≦i≦N−1, and N is the rank of the Walsh function.

Although it is not necessary to use a Walsh code as a spread code, it is necessary that the code sequences are orthogonal to each other. Here, when the inner product of codes is zero, then it is said that those codes are orthogonal. Further, a Walsh code having a code length of 32 will be described. However, description of the other cases such as the code length of 64 will be omitted, since they are similar, and can be easily understood by analogy.

Here, orthogonality will be briefly examined taking two or three examples of Walsh codes.

Zeroth through second Walsh code sequences are respectively given as follows.

0th code: {−1, −1, −1, −1, . . . , −1, −1, −1, −1}
1st code: {−1, 1, −1, 1, . . . , −1, 1, −1, 1}
2nd code: {−1, −1, 1, 1, . . . , −1, −1, 1, 1}

The inner product of the 0th and 1st codes, inner product {0, 1}, can be calculated as follows.

inner product {0, 1}=1−1+1−1+ . . . +1−1+1−1=0

Similarly, the inner product of the 1st and 2nd Walsh codes, inner product {1, 2}, and the inner product of the 0th and 2nd codes, inner product {0, 2} can be calculated respectively as follows.

inner product {1, 2}=1−1−1+1+ . . . +1−1−1+1=0 inner product {0, 2}=1+1−1−1+ . . . +1+1−1−1=0

Since all these inner products are 0, it is clear that the codes of the Walsh function are orthogonal to one another.

The other cases can be easily examined, and description of them is omitted.

On the other hand, inner products of the Walsh codes themselves can be calculated as follows. Namely, inner product $\{0, 0\}=1+1+1+1+\ldots +1+1+1+1=32$ inner product $\{1, 1\}=1+1+1+1+\ldots +1+1+1+1=32$ inner product $\{2, 2\}=1+1+1+1+\ldots +1+1+1+1=32$ When normalized by the code length 32, the inner products of all the code themselves become always unit 1. When Walsh codes are used as code sequences, this means that the same Walsh code can be used as a spread code and the despread code.

Now, it is assumed that, in a certain segment period, the above-mentioned 0th–2nd Walsh codes are used to transmit three pieces of information by multiplex transmission. When the 0th Walsh code is used to transmit a value a, the 1st Walsh code to transmit a value b, and the 2nd Walsh code to transmit a value c, then information inputted to the summing circuit (SUM) 140 (summed signal $\{0, 1, 2\}$) is described correspondingly to the chips as follows.

summed signal $\{0, 1, 2\}$ $=+a\{-1, -1, -1, -1, \ldots, -1, -1, -1, -1\}$ $+b\{-1, 1, -1, 1, \ldots, -1, 1, -1, 1\}$ $+c\{-1, -1, 1, 1, \ldots, -1, -1, 1, 1\}$ $=\{-a-b-c, -a+b-c, -a-b+c, -a+b+c, \ldots, -a-b-c, -a+b-c, -a-b+c, -a+b+c\}$ (3)

When the receiving side can correctly receive the summed signal, the received summed signal is multiplied by the despread code, to obtain the value of the primary modulated signal in the corresponding segment, as follows.

Namely, the value corresponding to the 0th Walsh code sequence is given by the inner product of the summed signal $\{0, 1, 2\}$ and the 0th Walsh signal, as follows. Namely, summed signal $\{0, 1, 2\}$-0th Walsh code=

$-(-a-b-c)-(-a+b-c)-(-a-b+c)-(-a+b+c)$ $-(-a-b-c)-(-a+b-c)-(-a-b+c)-(-a+b+c)$ $=+a+b+c+a-b+c+a+b-c+a-b-c$ $+a+b+c+a-b+c+a+b-c+a-b-c$ $=32a$ (4)

Accordingly, it is clear that, when the inner product of the summed signal $\{0, 1, 2\}$ and the 0th Walsh code is normalized by the code length 32, the value a is correctly received while the values b and c are completely suppressed, realizing correct receiving without interference.

Further, the value corresponding to the 1st Walsh code is given by the inner product of the summed signal $\{0, 1, 2\}$ and the 1st Walsh code as follows. Namely, summed signal $\{0, 1, 2\}$-1st Walsh signal=

$-(-a-b-c)+(-a+b-c)-(-a-b+c)+(-a+b+c)$ $-(-a-b-c)+(-a+b-c)-(-a-b+c)+(-a+b+c)$ $=+a+b+c-a+b-c+a+b-c-a+b+c$ $+a+b+c-a+b-c+a+b-c-a+b+c$ $=32b$ (5)

Accordingly, it is clear that, when the inner product of the summed signal $\{0, 1, 2\}$ and the 1st Walsh code is normalized by the code length 32, the value b is correctly received, while the values a and c are completely suppressed.

Still further, the value corresponding to the 2nd Walsh code is given by the inner product of the summed signal $\{0, 1, 2\}$ and the 2nd Walsh code as follows. Namely, summed signal $\{0, 1, 2\}$-2nd Walsh code=

$-(-a-b-c)-(-a+b-c)+(-a-b+c)+(-a+b+c)$ $-(-a-b-c)-(-a+b-c)+(-a-b+c)+(-a+b+c)$ $=+a+b+c+a-b+c-a-b+c-a+b+c$ $+a+b+c+a-b+c-a-b+c-a+b+c$ $=32c$ (6)

Accordingly, it is clear that, when the inner product of the summed signal $\{0, 1, 2\}$ and the 2nd Walsh code is normalized by the code length 32, the value c is correctly received, while the values a and b are completely suppressed.

Thus, as long as spread codes are orthogonal to one another, multiple access in which the number of active channels is same as the number of the spread codes is possible, and communication can be conducted only when the spread codes on both sides of the communication coincide with each other. That is the reason that the Code Division Multiple Access transmission system can be realized using a code, which is the third axis orthogonal to both the time and frequency axes, as a key for communication, in contrast with the Frequency Division Multiple Access transmission system in which a carrier frequency is used as a key and the Time Division Multiple Access transmission system in which a time slot is used as a key. Further, in CDMA, since it can be considered that a code determines a transmission path, a channel is established for each spread code. Thus, frequently, the number of the spread codes is called the number of channels.

In FIG. 31, since the primary modulated wave has positive values 0–1 in the 0th segment of the symbol 1, and negative values 0—1 in the 1st segment as shown in FIG. 30, the sign of the corresponding chip values in the 0th segment of the symbol 1 changes from minus to plus alternately and the sign of the chip values in the 1st segment changes from plus to minus alternately.

When the code length is 32, the chip rate of the spread codes becomes 32 ksps-4 segments-32 chip/segment=4.096 M chips/sec. (hereinafter, chips/sec. is written as cps).

All the spread codes changes synchronously with one another in each chip interval, and thus the summed signal whose signal value in a chip interval is the summation of the hip values becomes a rectangular wave of a constant value within a chip interval. Accordingly, both in the case of the maximum information rate of 2 Mbps in which 32 channels are used for simultaneous transmission and in the case of the minimum information rate in which 1 channel is used for transmission at 64 kbps, the chip rate is always constant at 4.096 Mcps irrespective of transmission rates of information.

Thus, as shown in FIG. 26, a plurality of spread signals corresponding to information signals and necessary control signal are generated by the spreading circuits (SS) 120–12n, using spread codes outputted from the spread code generating circuits (CG) 130–13n and orthogonal to one another. Then, the summation of the plurality of spread codes is obtained by the summing circuit (SUM) 140 and, if necessary, the summed signal obtained is subjected to the frequency conversion and power amplification in the transmitting circuit (TX), to be transmitted as a CDMA signal.

Here, it is assumed that the number (n+1) of the spreading circuits (SS) 120–12n is equal to or less than the spread factor, i.e., the length N of spread code sequence.

In order to transmit only the sum total of the summed signal, a transmission band of half the chip rate, i.e. 2.048 MHz is sufficient from the Shannon's sampling theorem. However, it is necessary to obtain the inner product of the received chip waveform and the despread code for despreading, and thus, it difficult to ensure the orthogonality between the spread codes by transmitting only the sum total. Because of this, it is desirable to transmit the rectangular waveform of the summed signal as faithfully as possible, and accordingly the band width of 2.048 MHz or more is used.

Accurate transmission of a rectangular waveform of a CDMA signal requires a frequency several times as high as the chip rate. However, as shown in FIG. 26, in many cases, band-pass filter operation is carried out as a function of the bandlimiting circuit (BPF) 141, to limit the frequency band width to the degree of the chip rate.

As shown in FIG. 26, if necessary, the CDMA signal is subjected to suitable processing such as conversion to a target frequency and power amplification in the transmitting circuit (TX) 142, and thereafter, radiated through an antenna. As the target frequency, a frequency domain of 2 GHz is frequently used, and accordingly, the following discussion is directed to CDMA transmission in this frequency domain of 2 GHz. However, the other frequency band is similar and can be easily conjectured, and their description is omitted. Further, the above-mentioned control signal does not directly relate to the present invention, and therefore, its further description is omitted.

Here, usually, a radio wave transmitted through the transmitting circuit (TX) 142 as described above is seldom transmitted through an ideal radio wave propagation path. In the mobile communication such as the automobile telephone and the pedestrian telephone, a transmitter itself moves so that the Doppler shift is generated and the carrier frequency deviates. Or, in many cases, a radio wave is received via a plurality of propagation paths. Accordingly, the phase and amplitude of the received wave changes with time (which is called the fading phenomenon, and in particular called the Rayleigh fading in a poor transmission environment causing the phase change of uniform distribution and making the amplitude have the Rayleigh distribution). Or, a radio wave is strongly reflected by building walls etc., and accordingly, it arrives at various points of time through different propagation paths of various lengths. In addition, in many cases, these strongly-reflected waves themselves are transmitted through multi-ray propagation paths with each arrival wave suffering the Rayleigh fading phenomenon independently.

On the receiving side, a CDMA receiver comprises main functional circuits, for example, for reception, synchronous detection, reception control, demodulation, despread, phase correction, judgment, etc.

In FIG. 32, the reception control circuit (CNT) 204 detects various control signals required for control of the receiver, and outputs a plurality of despread code sequences required for receiving. The synchronous detection circuit (SYNC) 203 outputs a regenerated carrier wave, a chip synchronizing signal, a segment synchronizing signal, a symbol synchronizing signal, etc. from the received signal.

The demodulator circuit (deMOD) 201 has the structure shown in FIG. 33. In that figure, the received wave applied to an input terminal 2010 connected to the receiving circuit (RX) 200 is inputted to the multipliers 2011 and 2012. Here, the demodulator circuit (deMOD) 201, which generally utilizes the synchronous detection system, obtains the product of the regenerated carrier wave 202 and the received wave by the multiplier 2011, then accumulates the product for each carrier cycle by the accumulator 2014 to obtain the inner product of each carrier cycle, takes in the obtained inner products into the latch register (REG) 2016 to hold them only for their carrier cycle periods, and outputs the values held in the latch register (REG) 2016 as in-phase components i(t) of the modulated signal of the primary modulated wave, for respective carrier cycle periods. At the same time, the demodulator circuit (deMOD) 201 obtains an orthogonal carrier signal by shifting the regenerated carrier wave 202 by 90 degrees in phase by the phase shifter 2013, to obtain the product of the orthogonal carrier signal and the received wave by the multiplier 2012. Then, the product is accumulated for each carrier cycle by the accumulator 2015 to obtain the inner product for each carrier cycle. The obtained inner products are taken into the latch register (REG) 2017 to hold them only for their carrier cycle periods. The values held in the latch register (REG) 2017 are outputted as quadrature components q(t) of the modulated signal of the primary modulated wave, for respective carrier cycle periods. The signal R inputted to the accumulators 2014, 2015 is an accumulation reset signal inputted from the control terminal 2018 for each carrier cycle. At every trailing edge of this accumulation reset signal R, the accumulated values of the accumulator 2014, 2015 are reset to zero. Further, the signal R inputted to the latch registers (REG) 2016, 2017 are the accumulation reset signal inputted from the control terminal 2018 for each carrier cycle. At every leading edge of this accumulation signal R, the accumulators 2016, 2017 hold the inputted values.

In FIG. 32, the in-phase components i(t) and quadrature components q(t) of the demodulated signal from the demodulator circuit 201 are inputted to (n+1) despreading circuits (deSS) 210–21n. FIG. 34 shows an example of these despreading circuits (deSS) 210–21n. An in-phase component i(t) and quadrature component q(t) of the demodulated signal are inputted to the input terminals 2100, 2101, respectively. The multipliers 2102, 2103 obtain the products of the in-phase component i(t) or quadrature component q(t) of the demodulated signal and the i-th despread code sequence inputted from the terminal 22i, in accordance with the chip synchronizing signal, and obtain the accumulation of the product for each segment, in accordance with the segment synchronizing signal. Here, the i-th despread code sequence means the despread code sequence corresponding to the i-th spread code used on the transmitting side. When the Walsh function is used, the despread code sequence and the spread code sequence are equal to each other.

Accordingly, in FIG. 32, the corresponding despread codes are inputted to the respective terminals 220–22n of the despreading circuits 210–21n. Then, outputs of the multipliers 2102, 2103 are accumulated in the accumulators 2014, 2015. The accumulation reset signal R is inputted to the accumulators 2104, 2105 from the terminal 2110, for each segment. The outputs of the accumulators 2104, 2105 are each normalized by the code length, held by the latch registers (REG) 2106, 2107 for the segment interval, and outputted from the output terminals 2108, 2109 as the in-phase component $I_i'(t)$ and quadrature component $Q_i'(t)$ of the despread signal.

Here, since the spread codes are orthogonal to one another, when the desperad code coincides with the spread code of the transmission, despreading circuits 210–21n output a finite value, realizing correct receiving. On the other hand, when the despread code does not coincide with the spread code of the transmission, the despreading circuits 210–21n always output zero, and thus, does not effectively output the received signal.

The in-phase components $I_i'(t)$ and quadrature components $Q_i'(t)$ of the despread signal relating to n information channels of the simultaneous multiple access system are outputted from the despreading circuits 211–21n. The in-phase component $I_0'(t)$ and quadrature component $Q_0'(t)$ of the despread signal relating to the pilot signal common to those n channels are outputted from the despreading circuit 210.

These despread signals are each subject to disturbances such as phase error, amplitude distortion, delay, and the like, during transmission. By transmitting a pilot spread signal obtained by spreading a primary modulated wave of phase information of a known value, for example "0", and by measuring the error between the known value and a phase value detected on the receiving side, it is logically possible to generally know the phase error due to the disturbances that have arisen during the transmission. Accordingly; as shown in FIG. 32, in many cases, is employed the pilot system in which one channel of a pilot signal for transmitting a known value is added to the n channels of information, to generally correct disturbances during transmission.

Accordingly, the following description is directed to the case in which one pilot channel is added to n information channels. However, a case in which one pilot channel is added to one information channel and a case in which an in-phase component and quadrature component of a primary modulated wave in each spread signal are assigned respectively to an information channel and a pilot channel are similar and can be easily understood by analogy. Therefore, description of such cases is omitted.

In FIG. 32, outputs of the despreading circuits (deSS) 211–21n and output of the despreading circuit (deSS) 210 are led to the phase correction circuits (CMP) 231–23n. FIG. 35 shows an example of cofiguration of those phase correction circuits (CMP). The in-phase component $I_i'(t)$ and quadrature component $Q_i'(t)$ of the despreading circuit (deSS) 23i are inputted to the input terminals 2300 and 2301, respectively. Further, the in-phase component $I_i'(t)$ and quadrature component $Q_0'(t)$ of the despreading circuit 230 are inputted to the input terminals 2302 and 2303, respectively. Then, the in-phase component $I_i'(t)$ of the information channel i is inputted to the multipliers 2310 and 2311, and the quadrature component $Q_i'(t)$ of the information channel i is inputted to the multipliers 2312 and 2313. The in-phase component $I_0'(t)$ of the pilot channel is inputted to the multipliers 2310 and 2312, and the quadrature component $Q_0'(t)$ of the pilot channel is inputted to the multipliers 2313 and 2311. The adder 2320 outputs the sum of the outputs of the multipliers 2310 and 2313, as the in-phase component $I_i(t)$ of the phase correction signal, to the terminal 2340.

Further, the adder 2321 outputs the difference between the output of the multiplier 2312 and the output of the multiplier 2311, as the quadrature component $Q_i(t)$ of the phase correction signal, to the terminal 2341.

In FIG. 32, further, the outputs of the phase correction circuits (CMP) 231–23n are led to the decision circuits (DEC) 241–24n. When the in-phase component $I_i(t)$ and quadrature component $Q_i(t)$ of the phase correction signal are inputted, the decision circuits (DEC) 241–24n each obtain a phase angle and a received symbol $S_i(t)$ of dibit defined correspondingly to the received phase angle obtained, and output it as the corresponding information to the terminal 251–25n.

Next, a series of processing in the receiver shown in FIG. 32 will be described in detail, using mathematics expressions. The output of the receiving circuit (RX) 200, i.e. the received signal r(t) is written as the equation 7.

$$r(t) = \sum_{j=1}^{m} \sum_{i=0}^{n} a_j(t)W_i\{t - \delta_j(t)\}\cos[\{\omega_c \pm \Delta\omega_j(t)\}\{t - \delta_j(t)\} + \theta_i\{i - \delta_j(t)\} + \Delta\phi_j(t)] \qquad (7)$$

Here, the suffix j indicates j-th propagation path of multi-ray Rayleigh fading, when, for the sake of convenience, the propagation paths are expressed as 1st, 2nd, . . . , m-th propagation paths in order of average received power. The letter m indicates the total number of the multi-ray propagation paths;

The suffix i (i=0, 1, . . . , n) indicates the number of the code sequence of the Walsh function, and here n means the total number of the code sequences of the Walsh function used for transmission;

$\delta_j(t)$ indicates a delay time in the propagation path j;

$a_j(t)$ indicates an amplitude distortion in the propagation path j. It is assumed that $a_j(t)$ is given by $a_j(t)=\alpha_j(t)k_j(t)$. Here, $\alpha_j(t)$ is a fading amplitude distortion in the propagation path j, and it is assumed that the amplitude shows the Rayleigh distribution and the maximum variable frequency is defined by the fading frequency. Further, $k_j(t)$ is the propagation gain of the propagation path j;

$\Delta\phi_j(t)$ indicates the fading phase error of the propagation path j, and its value is uniformly distributed between –180 degrees and 180 degrees. It is assumed that the upper limit of the variable frequency is defined by the fading frequency;

$W_i(t)$ is the value of the i-th spread code sequence at the time t, the i-th spread code sequence changing correspondingly to the chip;

$\omega_c$ is defined by $\omega_c=2\pi f_c$, where $f_c$, is the carrier frequency;

$\Delta\omega_j(t)$ indicates the frequency deviation caused by Doppler shift in the propagation path j; and $\theta_i(t)$ indicates the information phase of the primary modulated wave corresponding to the i-th code sequence.

Here, in the synchronous detection circuit (SYNC) whose details are not shown, the carrier signal is regenerated in accordance with the components that have passed a plurality of propagation paths and contained in the received wave. These regenerated carrier in-phase wave c(t) and regenerated carrier quadrature wave s(t) are respectively given as follows.

$$c(t)=\cos[\omega_c\{t-\delta(t)\}+\Delta\phi(t)] \qquad (8)$$

$$s(t)=\sin[\omega_c\{t-\delta(t)\}+\Delta\phi(t)] \qquad (9)$$

where δ(t) is a time delay of the regenerated carrier wave, and Δφ(t) is a phase error of the regenerated carrier wave.

The outputs of the demodulator circuit (deMOD) 201, i.e., the in-phase component i(t) and quadrature component q(t) of the demodulated signal are respectively given as the inner products of the received signal r(t) and the regenerated carrier in-phase wave c(t) or the regenerated carrier quadrature wave s(t) as follows.

$$i(t) = \frac{1}{\tau}\int_t^{t+\tau} r(t)c(d)dt \tag{10}$$

$$q(t) = \frac{1}{\tau}\int_t^{t+\tau} r(t)s(d)dt \tag{11}$$

where τ is the carrier cycle period, i.e., the reciprocal of the carrier frequency.

The carrier cycle is small in comparison with the chip cycle, and furthermore, the fading cycle and the frequency deviation of the Doppler shift are sufficiently small in comparison with the carrier frequency. Accordingly, it can be assumed that the value of the spread code, the fading phase distortion, and the fading amplitude distortion are maintained at constant values within a carrier cycle. Here, the fading cycle means the reciprocal of the fading frequency.

Thus, the equations 10 and 11 can be calculated as follows.

$$i(t) = \frac{1}{2\tau}\int_t^{t+\tau} \sum_{j=1}^{m}\sum_{i=0}^{n} \alpha_j(t)W_j \tag{12}$$

-continued
$$\{t - \delta_j(t)\} \cdot [\cos\{2\omega_c t + \theta_i(t - \delta_j(t)) \pm \Delta\omega_j(t)(t - \delta_j(t)) +$$
$$\Delta\phi_j(t) + \Delta\phi(t) - \omega_c(\delta_j(t) + \delta(t))\} +$$
$$\cos\{\theta_i(t - \delta_j(t)) \pm \Delta\omega_j(t)(t - \delta_j(t)) +$$
$$(\Delta\phi_j(t) - \Delta\phi(t)) - \omega_c(\delta_j(t) + \delta(t))\}]dt$$

With respect to the variables for the trigonometric functions within the brackets [ ], variables other than the component of the carrier are almost constants within a carrier cycle. Accordingly, with respect to the in-phase component i(t) of the demodulated signal, the integral of the first term within the brackets [ ] converges to zero, and the second term becomes almost the average.

$$i(t) = \frac{1}{2}\sum_{j=1}^{m}\sum_{i=0}^{n} \alpha_j(t)W_j\{t - \delta_j(t)\}\cos[\theta_i(t - \delta_j(t)) + \varphi_j(t)] \tag{13}$$

where $$\varphi_j(t) = \pm\Delta\omega_j(t)\{t-\delta_j(t)\} + \{\Delta\phi_j(t)-\Delta\phi(t)\} - \omega_c\{\delta_j(t)-\delta(t)\} \tag{14}$$

Similarly, the quadrature component q(t) of the demodulated signal is obtained as follows.

$$q(t) = -\frac{1}{2\tau}\int_t^{t+\tau} \sum_{j=1}^{m}\sum_{i=0}^{n} \alpha_j(t)W_j \tag{15}$$
$$\{t - \delta_j(t)\} \cdot [\sin\{2\omega_c t + \theta_i(t - \delta_j(t)) \pm \Delta\omega_j(t)(t - \delta_j(t)) +$$
$$\Delta\phi_j(t) + \Delta\phi(t) - \omega_c(\delta_j(t) + \delta(t))\} +$$
$$\sin\{\theta_i(t - \delta_j(t)) \pm \Delta\omega_j(t)(t - \delta_j(t)) +$$
$$(\Delta\phi_j(t) - \Delta\phi(t)) - \omega_c(\delta_j(t) + \delta(t))\}]dt \cong$$
$$-\frac{1}{2}\sum_{j=1}^{m}\sum_{i=0}^{n} \alpha_j(t)W_j\{t - \delta_j(t)\}\sin[\theta_i(t - \delta_j(t)) + \varphi_j(t)]$$

The in-phase component $I_d'(t)$ or quadrature component $Q_d'(t)$ of the despread code of the channel d outputted from the despreading circuit (deSS) 210–21n are given as the inner product between the despread code sequence $W_d$ and the in-phase component i(t) or quadrature component q(t) of the demodulated signal within a segment, as follows.

$$I_d'(t) = \frac{1}{2N} \tag{16}$$
$$\sum_{k=0}^{N-1}\sum_{j=1}^{m}\sum_{i=0}^{n} \alpha_j(t)W_i\{t + k\lambda - \delta_j(t)\}W_d\{t + k\lambda - \delta_j(t)\} \cdot \cos[\theta_i(t + k\lambda - \delta_j(t)) + \varphi_j(t + k\lambda)]$$

$$Q_d'(t) = \frac{1}{2N} \tag{17}$$
$$\sum_{k=0}^{N-1}\sum_{j=1}^{m}\sum_{i=0}^{n} \alpha_j(t)W_i\{t + k\lambda - \delta_j(t)\}W_d\{t + k\lambda - \delta_j(t)\} \cdot \sin[\theta_i(t + k\lambda - \delta_j(t)) + \varphi_j(t + k\lambda)]$$

where 0≤d≤n, and λ is the chip cycle and N is the code length.

$$\varphi_j(t+k\lambda) = \pm\Delta\omega_j(t)\{t+k\lambda-\delta_j(t)\}+\{\Delta\phi_j(t)-\Delta\phi(t)\}-\omega\{\delta j(t)-\delta(t)\} \tag{18}$$

When, in the equations 16 and 17, the despread code $W_d$ of the reception channel d correctly coincides the transmission code $W_i$, then, the in-phase component $I_i'(t)$ and quadrature component $Q_i'(t)$ of the despread signal corresponding to the i-th spread code are respectively given as follows.

$$I_i'(t) \cong \sum_{j=1}^{m} \frac{\tilde{a}_j(t)}{2}\cos\{\theta_i(t - \delta_j(t)) + \tilde{\psi}_i(t) + \tilde{\varphi}_j(t)\} \tag{19}$$

-continued $$Q'_i(t) \cong \sum_{j=1}^{m} \frac{\tilde{a}_j(t)}{2}\sin\{\theta_i(t-\delta_j(t))+\tilde{\psi}_i(t)+\tilde{\varphi}_j(t)\} \quad (20)$$

where $\tilde{a}_j(t)$ is an expected value, within a segment, of the amplitude distortion $a_j(t)$ in the j-th propagation path;

$\psi_i(t)$ is an expected value, within a segment, of the phase error $\phi_i(t)$ having the frequency characteristics intrinsic to the spread code sequence $W_i$;

$\phi_j(t)$ is an expected value, within a segment, of the phase error $\phi_j(t)$ in the j-th propagation path, $$\phi_j(t)=\pm\Delta\omega_j(t)\{t-\tilde{\delta}_j(t)\}+\{\Delta\phi_j(t)-\Delta\phi(t)\}-\omega_c\{\delta_j(t)-\delta(t)\} \quad (21)$$

and $$\tilde{a}_j(t)=\tilde{a}_j(t)\tilde{k}_j(t)$$

$\tilde{a}_j(t)$ is an expected value, within a segment, of the fading amplitude distortion in the propagation path j;

$\tilde{k}_j(t)$ is an expected value, within a segment, of the propagation gain in the propagation path j;

$\Delta\omega_j(t)$ is an expected value, within a segment, of the Doppler shift in the propagation path j;

$\Delta\phi_j(t)$ is an expected value, within a segment, of the fading phase error in the propagation path j;

$\delta_j(t)$ is an expected value, within a segment, of the propagation delay in the propagation path j;

$\Delta\phi(t)$ is an expected value, within a segment, of the phase error of the regenerated carrier wave; and $\delta(t)$ is an expected value, within a segment, of the delay of the regenerated carrier wave.

The spread code sequence $W_i$ of the received wave coming through an inferior propagation path has already been subjected to distortion, and thus, an error $\phi_i(t)$ intrinsic to the spread code sequence $W_i$ is generated in the despread signal. Further, the in-phase component $I_i'(t)$ and quadrature component $Q_i'(t)$ of the despread signal for the channel i in the two-ray Rayleigh fading environment are given by the following simple equation.

$$I_i'(t)\cong\beta(t)\cos\{\theta_i(t-\tilde{\delta}_1(t))+\psi_i(t)+\psi(t)\} \quad (22)$$

$$Q_i'(t)\cong-\beta(t)\sin\{\theta_i(t-\tilde{\delta}_1(t))+\psi_i(t)+\psi(t)\} \quad (23)$$

where $$\tilde{\beta}(t) = \frac{1}{2}\sqrt{\tilde{a}_1(t)^2 + \tilde{a}_2(t)^2 + 2\tilde{a}_1(t)\tilde{a}_2(t)\cos\{\tilde{\varphi}_1(t)-\tilde{\varphi}_2(t)\}} \quad (24)$$

$$\tilde{\vartheta}(t) = \tan^{-1}\left[\frac{\tilde{a}_1(t)\sin\{\tilde{\varphi}_1(t)\}+\tilde{a}_2(t)\sin\{\tilde{\varphi}_2(t)\}}{\tilde{a}_1(t)\cos\{\tilde{\varphi}_1(t)\}+\tilde{a}_2(t)\cos\{\tilde{\varphi}_2(t)\}}\right] \quad (25)$$

Further, the equation 24 can be expressed using the 2nd propagation path to the 1st propagation path ratio $P_{21}(t)$ of the instantaneous power to obtain the following equation.

$$\tilde{\beta}(t) = \frac{\tilde{a}_1(t)}{2}\sqrt{1+P_{21}^2(t)+2P_{21}(t)\cos\{\tilde{\varphi}_1(t)-\tilde{\varphi}_2(t)\}} \quad (26)$$

where the instantaneous power ratio $P_{21}(t)$ is defined by $$P_{21}(t) = \frac{\tilde{a}_2(t)}{\tilde{a}_1(t)}$$

Similarly, the equation 25 can be expressed as follows, using the instantaneous power ratio on its right side.

$$\tilde{\vartheta}(t) = \tan^{-1}\left[\frac{\sin\{\tilde{\varphi}_1(t)\}}{\cos\{\tilde{\varphi}_2(t)\}}\frac{1+P_{21}(t)\frac{\sin\{\tilde{\varphi}_2(t)\}}{\sin\{\tilde{\varphi}_1(t)\}}}{1+P_{21}(t)\frac{\cos\{\tilde{\varphi}_2(t)\}}{\cos\{\tilde{\varphi}_1(t)\}}}\right] \quad (27)$$

The incoming wave of the 1st propagation path is called a desired wave (D wave) and an incoming wave of a propagation path other than the 1st propagation path is called an undesired wave (U wave), and their power ratio $$P_{12}(t) = \frac{\tilde{a}_1(t)}{\tilde{a}_2(t)}$$

is, in particular, defined as the instantaneous DUR. This instantaneous DUR is the reciprocal in relation to the above-defined instantaneous power ratio $P_{21}(t)$.

Further, in many times, DUR is defined as the ratio of the time-average of the power of the D wave to the time-average of the power of the U wave, and expressed by D/U as a true value or by $10\cdot\log_{10}(D/U)$ as a decibel.

The spread code $W_i$ generates the spread signal exhibiting an intrinsic spectrum distribution, and thus, in the frequency-selective fading environment in which the propagation path itself has the frequency characteristic, the error $\psi_i(t)$ shown in the equations 19, 20, 22, and 23 appears strongly.

When the known phase value of the pilot channel is 0 and the channel is assigned to the 0th channel, the in-phase component $I_0'(t)$ and quadrature component $Q_0'(t)$ of the despread signal in the pilot channel are given as follows.

$$I_0'(t)\cong\beta(t)\cos\{\psi_0(t)+\psi(t)\} \quad (28)$$

$$Q_0'(t)\cong\beta(t)\sin\{\psi_0(t)+\psi(t)\} \quad (29)$$

The phase correction circuit 23i conducts phase correction shown in the following, to output the in-phase component $I_i(t)$ and quadrature component $Q_i(t)$ of the correction signal. Namely, $$I_i(t)=I_i'(t)I_0'(t)+Q_i'(t)Q_0'(t) \quad (30)$$

$$Q_i(t)=Q_i'(t)I_0'(t)-I_i'(t)Q_0'(t) \quad (31)$$

Substituting the equations 22, 23, 28, and 29 expressing respective components of the despread signal into the equations 30 and 31, the correction signal is given as follows.

$$I_i(t) = \tilde{\beta}^2(t)\cos\{\theta_i(t-\delta_1(t))+\tilde{\psi}_i(t)+\tilde{\vartheta}(t)\}\cos\{\tilde{\psi}_o(t)+\tilde{\vartheta}(t)\}+ \quad (32)$$
$$\tilde{\beta}^2(t)\sin\{\theta_i(t-\delta_1(t))+\tilde{\psi}_i(t)+\tilde{\vartheta}(t)\}\sin\{\tilde{\psi}_o(t)+\tilde{\vartheta}(t)\}$$
$$= \tilde{\beta}^2(t)\cos\{\theta_i(t-\delta_1(t))+\tilde{\psi}_i(t)+\tilde{\psi}_o(t)\}$$

$$Q_i(t) = -\tilde{\beta}^2(t)\sin\{\theta_i(t-\delta_1(t))+\tilde{\psi}_i(t)+\tilde{\vartheta}(t)\}\cos\{\tilde{\psi}_0(t)+\tilde{\vartheta}(t)\}+ \quad (33)$$

-continued $$\tilde{\beta}^2(t)\cos\{\theta_i(t-\delta_1(t))+\tilde{\psi}_i(t)+\tilde{\partial}(t)\}\sin\{\tilde{\psi}_0(t)+\tilde{\partial}(t)\}$$

$$=-\tilde{\beta}^2(t)\sin\{\theta_i(t-\delta_1(t))+\tilde{\psi}_i(t)-\tilde{\psi}_0(t)\}$$

Using the in-phase component $I_i(t)$ and quadrature component $Q_i(t)$ of the correction signal in the decision circuits 241–24n, the information phase of the channel i is obtained as follows. And, based on the obtained information phase of the channel i, the received symbol, i.e., received information of the channel i is decided in accordance with the rule assigned on the transmission side. The information phase of the channel i is given as follows.

$$\text{information phase}_i(t) = -\tan^{-1}\left[\frac{Q_i(t)}{I_i(t)}\right] \quad (34)$$

$$=\tan^{-1}\left[\frac{\sin\{\theta_i(t-\delta_1(t))+\tilde{\psi}_i(t)-\tilde{\psi}_0(t)\}}{\cos\{\theta_i(t-\delta_1(t))+\tilde{\psi}_i(t)-\tilde{\psi}_0(t)\}}\right]$$

$$=\theta_i(t-\delta_i(t))+\tilde{\psi}_i(t)-\tilde{\psi}_0(t)$$

In the last right side of the equation 34 expressing the reception information of the channel i, the first term is a true value of the received phase, and the second and subsequent terms indicate disturbances. The Doppler shift error, the fading phase error, and the delay error appearing in the equations 12 and 13 now disappear, thus showing that the phase correction circuits operate effectively. However, it is clear that, as shown by the second and third terms, the frequency-selective fading errors can not be removed, and remain as factors deteriorating the communication quality.

The received information may be decided from the information phase within a single segment shown in the equation 34. However, the received information can be decided from the average value of the information phases in a plurality of segments in the same symbol period, in order to improve the noise immunity and communication quality.

For example, for obtaining the averages of the in-phase component $I_i(t)$ and quadrature component $Q_i(t)$ of the correction signal within a symbol, it is noted that the amplitude distortion in a symbol is nearly constant, to obtain the average values using the equations 32 and 33. Then, by deciding the information phase from the obtained average values, the communication quality can be further improved.

Further, the averages may be obtained after removing the amplitude distortions in the equations 32 and 33. Namely, utilizing the fact that the amplitude value of the correction signal is obtained by squaring the sum of the square of the in-phase component and the square of the quadrature component, the amplitude distortion can be easily removed.

DISCLOSURE OF THE INVENTION

In order to quantitatively examine effects of the frequency-selective fading on CDMA in communication of various moving modes in a usual city area, computer simulations are conducted as follows.

It is said that typically DUR=25 dB and delay is 1 μsecond, from actual measurements of propagation in a city area. However, these values largely fluctuate depending on city environment such as building heights, wall materials, and road widths, as well as weather conditions. Of course, in conducting the simulations with setting of the following system conditions and moving modes, it is assumed that components of the received waves coming through various propagation paths are each subject to independent Rayleigh fading, arriving in a changing propagation time depending on city environment.

In these simulations, severe conditions are set in order to make those simulations match any real propagation. Namely, as the system conditions, it is assumed that the transmission frequency domain is the 2 GHz band, the chip rate is 4.096 Mcps, the number of the simultaneous multiple accesses is 31 (at the transmission speed of 1.984 Mbps), the symbol rate is 32 ksps, and the spread code length and despread code length are each 32.

For evaluating a system, is used an Eb/No value that gives BER=0.001, i.e. the value generally used in mobile communication in which a compensation function is not used. Here, BER is a ratio of the received error bits to the total received bits, and Eb/No is a decibel value dB of a ratio of the received power to the received noise power on the receiving side. Further, in order to correctly evaluate the CDMA system, the compensation functions such as an error correction coding, RAKE reception, transmission power control, AGC, and the like, which have been conventionally and frequently used in the CDMA system, are not used in the simulations.

When the internal noise in the receiver is sufficiently small, the noise entering in the course of propagation, i.e. city noise becomes the governing term in the received noise power. City noise is independent of the communication system, and has a nearly constant value. Thus, the smaller Eb/No required for realizing a certain BER value is, the smaller the transmission power corresponding to the gain of Eb/No is, meaning the communication system is superior.

With respect to environmental conditions, it is insufficient to rely only on measured values in city areas. And, it is necessary to conduct simulations assuming more severe conditions than the measured values. As more severe conditions, is assumed two-ray Rayleigh fading in which DUR=10 dB, and delay is 1 μsecond. Since, in mobile communication, moving speed of a mobile unit largely affects the communication characteristics, simulations are conducted in the following three telephone modes.

[Automobile Telephone Mode]

When CDMA conducts communication in the 2 GHz domain, and in fading environment such as a city area, a quasi-constant wave appears near the earth surface, and the wave length of this quasi-constant wave is about 0.15 m. When communication is conducted during high-speed travelling of 100 km/h along, for example, an express-highway of a city area, then, the maximum Doppler shift is 0.1 ppm (i.e., the maximum frequency deviation according to the Doppler shift is 200 Hz), and the maximum fading frequency $f_d$ is about 185 Hz. Since the symbol rate of CDMA is 32 ksps, we obtains the following.

$$f_d T \approx 0.005$$

[Pedestrian Telephone Mode]

When CDMA conducts communication in the 2 GHz domain, and a mobile unit conducts communication in walking at 10 km/h in a city area, the maximum Doppler shift becomes 0.01 ppm and the maximum fading frequency $f_d$ becomes about 18.5 Hz. Since the symbol rate of CDMA is 32 ksps, the following result is obtained.

$$f_d T \approx 0.0005$$

[Stationary Telephone Mode]

When CDMA conducts communication in the 2 GHz domain, fading frequency $f_d$ does not completely become zero in a stationary state at a stop of walking or driving, although the Doppler shift becomes zero. As described above, fading is generated as a result of synthesizing many arrived radio waves that have subjected to reflection, delay, and diffraction at many places. Also, according to change of physical conditions, such as a state of air temperature and humidity distribution, constituting the radio wave propagation path, characteristics affecting radio wave propagation change.

Accordingly, even when a mobile unit is stationary, the propagation path fluctuates and slow fading appears. As a result, the fading frequency of the stationary telephone mode becomes about a tenth of the pedestrian telephone mode. Thus, $f_d$ becomes about 1.85 Hz, and the following result is obtained.

$$f_d T \approx 0.00005$$

FIGS. 36, 37 and 38 show respective simulation effects when, with respect to CDMA of the conventional pilot system, the transmission band width is employed as a parameter and communication is conducted according to the above-described three telephone modes. The vertical and horizontal axes of these figures indicate a bit error rate BER and a received electric field level Eb/No, respectively.

In the stationary telephone mode (is95.sty) of FIG. 36, high quality communication of BER=0.001 can be realized in all the transmission band widths 1.51–25.60 MHz, and in the received electric field area Eb/No≦0 dB.

With respect to the explanation IS95.STY. 2.14–is95.STY. 25.60 in the figure, IS95 means the system name of the conventional CDMA transmission system, STY means the telephone mode of the stationary telephone mode, and 2.14–25.60 are values of the transmission band widths given in MHz.

In the explanation in a series of figures, FIGS. 36–38, 16–18, and 20–25, a character string A.B.C is used in a similar manner. Namely, $$A.B.C = \left\{ \begin{array}{l} IS95 \\ \textit{diffCDMA} \\ IS95\_CP \\ \textit{diffCDMA\_CP} \\ \textit{diffCDMA\_CS} \\ ID95\_CPS \\ \textit{diffCDMA\_CPS} \\ \textit{diffCDMA\_VSI} \end{array} \right\} \cdot \left\{ \begin{array}{l} STY \\ MAN \\ CAR \end{array} \right\} \cdot \left\{ \begin{array}{l} 0.600 \\ \vdots \\ 3.20 \\ \vdots \\ 26.60 \end{array} \right\}$$

means a system name, telephone mode, and transmission band width.

With respect to the first string A,

IS95 means the conventional CDMA transmission system, as already described;

diffCDMA means the differential CDMA transmission system;

IS95_CP means the conventional CDMA to which the phase continuous technique is applied;

diffCDMA_CP means the differential CDMA transmission system to which the phase continuous technique is applied;

diffCDMA_CS means the differential CDMA transmission system to which the chip waveform continuating technique is applied;

IS95_CPS means the conventional CDMA transmission system to which the phase continuous technique and the chip waveform continuating technique are applied;

diffCDMA_CPS means the differential CDMA transmission system to which the phase continuous technique and the chip waveform continuating technique are applied; and diffCDMA_VSI means the differential CDMA transmission system to which the virtual segment interleave technique is applied.

Further, with respect to the middle string B,

STY means the stationary telephone mode, as already described;

MAN means the pedestrian telephone mode; and

CAR means the automobile telephone mode.

Further, the value of the last string C means the transmission band width given in MHz.

In the pedestrian telephone mode (is95.man) shown in FIG. 37, when the transmission band width is set at 3.46 MHz or more, it is possible to realize high quality communication with BER=0.001 at the almost same receiving level as the stationary telephone mode. However, when the transmission band width is limited to 3.28 MHz or less, there arise floors at which BER≧0.001, and there appears a defect that high quality communication with BER≦0.001 can not be realized even if the strongest transmission power is used. Here, using the transmission band width as a parameter, FIG. 37 illustrates, in detail, the neighborhood of the band width at which the floor phenomenon appears. This is because use of the band width value critical to the floor phenomenon is important for quantitatively evaluating the transmission systems. The other transmission band widths are omitted in the figure, since, for example, the band width of 3.66 MHz or more brings a high quality communication state with BER≦0.001 and, on the other hand, the narrower band width of 3.20 MHz or less brings a floor. Here, the critical transmission band width is defined by the value of the minimum transmission band width that realizes high quality communication. In the case of this figure, the critical band width is 3.46 MHz.

In the case of the higher moving speed of the automobile telephone mode (is95.car) as shown in FIG. 38, all the received electric field levels bring a floor at BER≧0.2 regardless of the transmission band width. Thus, there is a problem that communication is impossible any longer, even with the strongest transmission power and the largest transmission band width.

Although mobile communication always suffers from the Rayleigh fading phenomenon, there is no Doppler shift in the stationary telephone mode and the fading phenomenon is not so obvious. Thus, in the stationary telephone mode, the piloted CDMA can acquire high quality of communication of BER=0.001 even for a transmission path of a rather narrow band. However, when communication is conducted moving at a slow moving speed such as about 10 km/h as in the pedestrian telephone mode shown in FIG. 37, the piloted CDMA can provide high quality of communication of BER=0.001 for weak received electric field having Eb/No≦0 dB, similarly to the stationary telephone mode, in the case that the transmission band width is 3.66 MHz or more. However, in the case that the transmission band width is 3.65 MHz or less, a floor is generated and it is impossible to conduct communication. Further, when the moving speed becomes a high speed of about 100 km/h as in the automobile telephone mode shown in FIG. 38, there appears a phenomenon that a floor is generated in the neighborhood of BER=0.2 even for the widest transmission band width and the highest transmission power, differently from the pedestrian telephone mode, and thus it is impossible to conduct communication.

Thus, by a hair's breadth, the piloted CDMA can provide a large-capacity communication system using sufficient transmission band width, being limited to the case of low speed moving of about 10 km/h as in the pedestrian telephone mode. However, the piloted CDMA can not provide high quality of communication for a moving unit moving at high speed of 100 km/h as in the automobile telephone mode.

Thus, considering the problem in the above-described conventional system, an object of the invention is to provide a large-capacity CDMA transmission system that can conduct communication with a moving unit such as an automobile, transmitting same information quantity as the conventional system without deteriorating communication quality in weak power transmission in the CDMA and without increasing the occupied band width, using the same frequency band width.

The configuration of a CDMA transmission system for attaining the above object of the invention premises a code division multiple access (CDMA) transmission system in which a primary modulated wave is generated by phase modulation maintaining a phase of a carrier signal at a predetermined phase within a predetermined period of time, spread signals are generated by multiplying this primary modulated wave by spread code sequences, and a plurality of spread signals are transmitted.

According to a first aspect of the invention, the differential coding phase modulation (shift keying) (DPSK) is used for generating the primary modulated wave on the transmitting side. On the receiving side, quasi-synchronous detection and difference operation are employed to detect the phase difference between the last symbol period and the current symbol period, and the detected phase difference is given as the information phase of the current symbol period.

According to a second aspect of the invention, the phases in the ends of symbol periods are made to change continuously, in the above-described code division multiple access (CDMA) transmission system. By this operation, the system is constructed such that a rapid phase change in the neighborhood area of an end of a symbol period is eliminated.

Further, according to a third aspect of the invention, spread code values are changed continuously in an end of a code period (chip) of the mentioned spread code sequence in the above-mentioned presumption. By this operation, the system is constructed such that a rapid change of the spread code values in the neighborhood area of an end of a chip period is eliminated.

Further, according to a fourth aspect of the invention, virtual segments are superposed in each symbol interval, so that despreading is performed in segments whose number exceeds the number of transmission segments of each symbol interval.

Further, various aspects of the present invention may include following construction:

a construction obtained by combining the first aspect with the second, third, or fourth mode;

a construction obtained by combining the first mode with the second, third and fourth aspects;

a construction obtained by combining the first aspect with the second and third modes, or the second and fourth aspects, or the third and fourth aspects;

a construction obtained by combining the second aspect with the third or fourth aspect;

a construction obtained by combining the second aspect with the third and fourth aspects; and a construction obtained by combining the third aspect with the fourth aspect.

BRIEF DESCRIPTION OF DRAWINGS

FIG. 38 is a graph showing an example of transmission characteristics in the automobile telephone mode of the conventional CDMA transmission system.

BEST MODE FOR CARRYING OUT THE INVENTION

Figure 1:
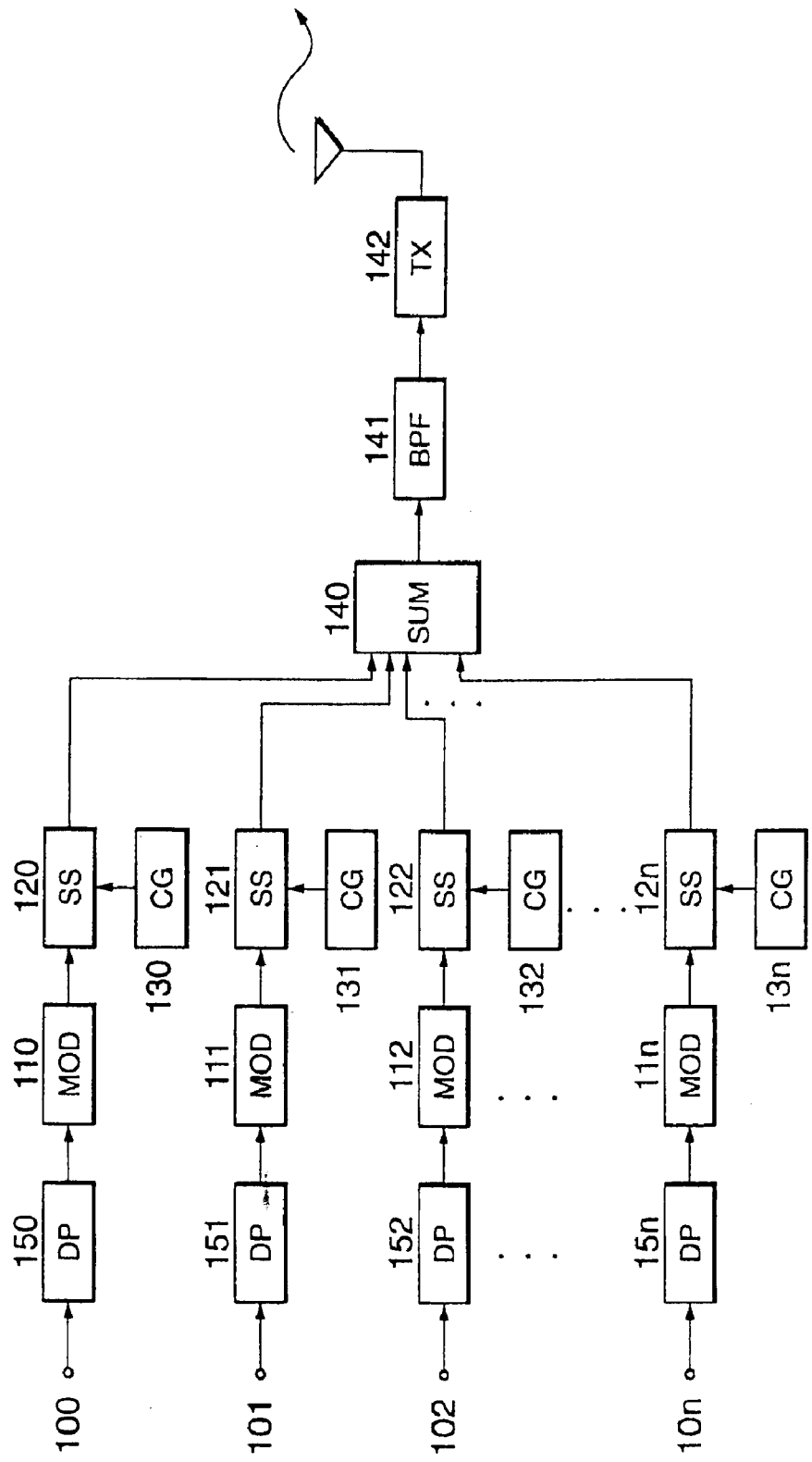
FIG. 1 is a diagram showing an example of a configuration of a differential CDMA transmitter according to the present invention.

In the following, embodiments of the present invention will be described referring to the drawings. In the figures, like numerals or symbols refer to like components.

As a first embodiment of the present invention, is proposed a CDMA transmission system wherein a primary modulated wave obtained by the differential coding phase modulation, in which a phase difference in a symbol interval shows information, is spread by a spread code.

As a second embodiment of the present invention, is proposed a phase continuous CDMA transmission system wherein a primary modulated wave obtained by phase modulation, in which a phase value continuously change, is spread by a spread code sequence.

As a third embodiment of the present invention, is proposed a chip waveform continuous CDMA transmission system wherein a primary modulated wave is spread using a chip waveform that is continuously changed.

Further, as a fourth embodiment of the present invention, is proposed a virtual segment interleave CDMA transmission system wherein virtual segments are set in despreading, and despread code is obtained in segments interleaved and superposed.

In the following, respective features of the present invention will be described with respect to those systems.

[Differential CDMA Transmission System]

As described above, when CDMA communication (in the automobile mode) is conducted moving at a speed of 100 km/h in a city area and using the 2 GHz domain, then, the maximum frequency deviation of the Doppler shift is 200 Hz, the maximum fading frequency is 185 Hz, and propagation delay between the first and second propagation paths is 1 μsecond. However, even in a rapid accelerating condition of arriving in 14 seconds at a 400 m point from a stationary state, a changing speed of the frequency deviation due to the Doppler shift is about 30 Hz/sec. and a difference between frequency deviations of the Doppler shift in adjacent symbol intervals is as small as 0.001 Hz which can be taken as nearly zero.

Further, although the phase deviation due to fading is as large as ±180 degrees, a difference between fading phase deviations in adjacent symbols is as small as ±0.01 degree which can be taken as nearly zero, also.

Similarly, the propagation delay can be taken as nearly constant between adjacent symbol intervals. Namely, a difference between propagation delays is a quantity decided by a length difference of a propagation path and a moving speed of the moving unit. Since change of propagation path length caused-by travelling at 100 km/h in a period of 31.25 μseconds of one symbol interval is 0.9 m at maximum, only 3 nanoseconds of difference in propagation delay is generated, and the propagation delay is nearly constant in adjacent symbol intervals.

It becomes clear that, in the case that information expressed by phase differences is transmitted, a phase difference between adjacent symbols is kept at the value of the time of transmission, even when many interfering waves such as reflected waves and diffracted waves are mixed into the propagation path, and frequency-selective fading is generated owing to deviation, phase error, and delay error of the carrier frequency, severely distorting the received wave.

FIG. 1 shows an example of a configuration of a differential CDMA transmitter according to the present invention, using DQPSK for primary modulation. The conventional CDMA transmitter of FIG. 26 employs not DQPSK but QPSK for primary modulation. In comparison, the CDMA transmitter of the present invention has the same configuration as the conventional CDMA transmitter shown in FIG. 26 except that DQPSK is employed for the primary modulation. In FIG. 1, the information input terminals 100–10n, phase modulation circuits (MOD) 110–11n, spreading circuits (SS) 120–12n, spread code sequence generating circuits (CG) 130–13n, a summing circuit (SUM) 140, a frequency bandlimiting circuit (Band Path Fitter) (BPF) 141, and a transmitting circuit (TX) 142 have the same functions as the respective components of the same reference numerals in FIG. 26.

Figure 26:
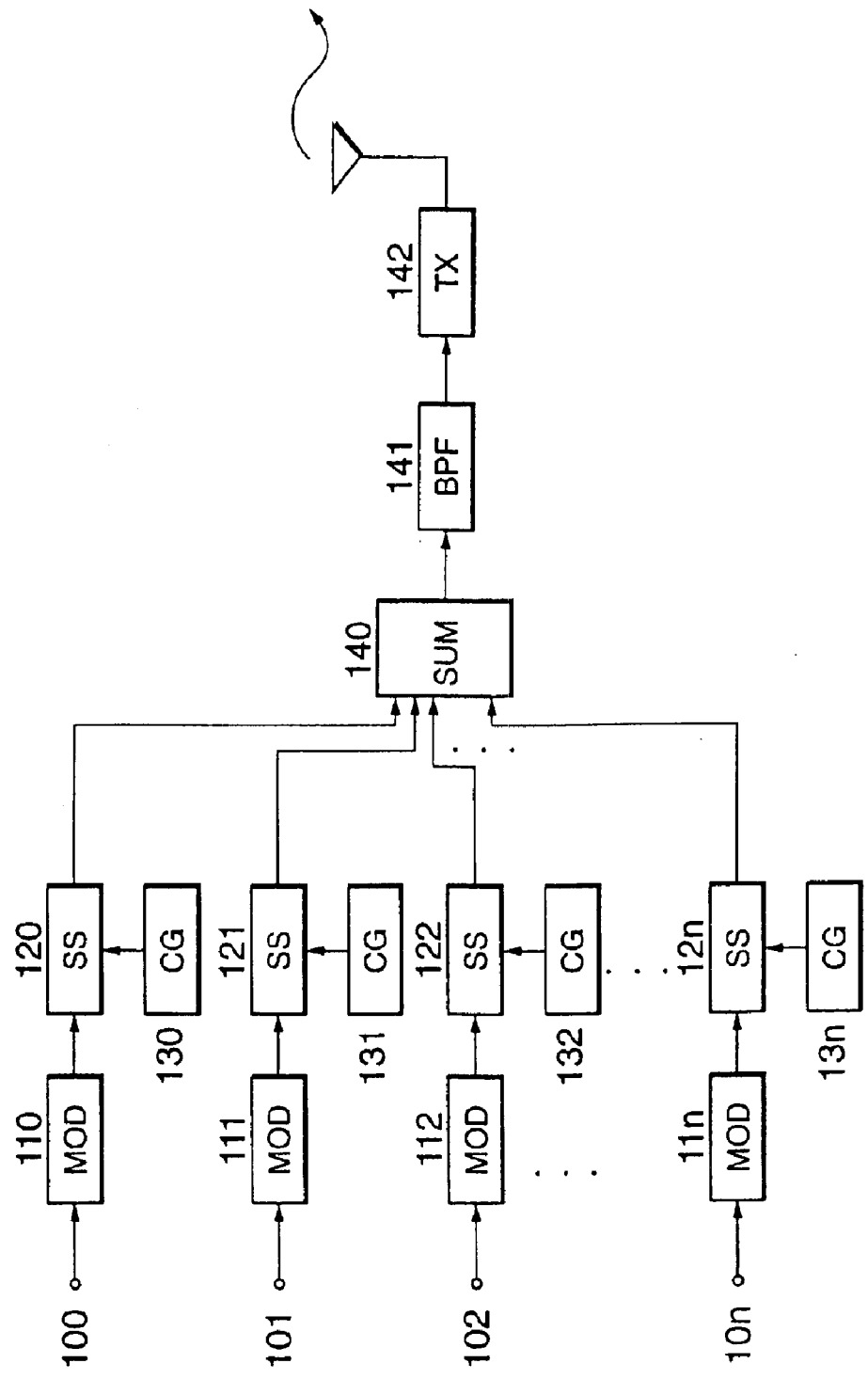
FIG. 26 is a diagram showing an example of a configuration of the conventional CDMA transmitter.

In contrast with the configuration of FIG. 26 in which a primary modulated wave (QPSK wave) is generated in accordance with inputted information, the feature of the present invention lies in that differential coding circuits (DP) 150–15n are provided on the input side of the phase modulation circuits (MOD) 110–11n, and those differential coding circuits (DP) 150–15n and the phase modulation circuits (MOD) 110–11n constitute a differential coding phase modulation circuit (diffMOD). This differential coding phase modulation circuit (diffMOD) generates a primary modulated wave (DQPSK wave) obtained by phase modulation (differential coding phase modulation) using the sum of the phase relating to the input information of the current symbol interval and the phase in the last symbol interval. In the following description, DQPSK is used for primary modulation. However, cases in which another differential PSK is used are similar, and description on those cases will be omitted since these cases may be understood by analogy.

Figure 2:
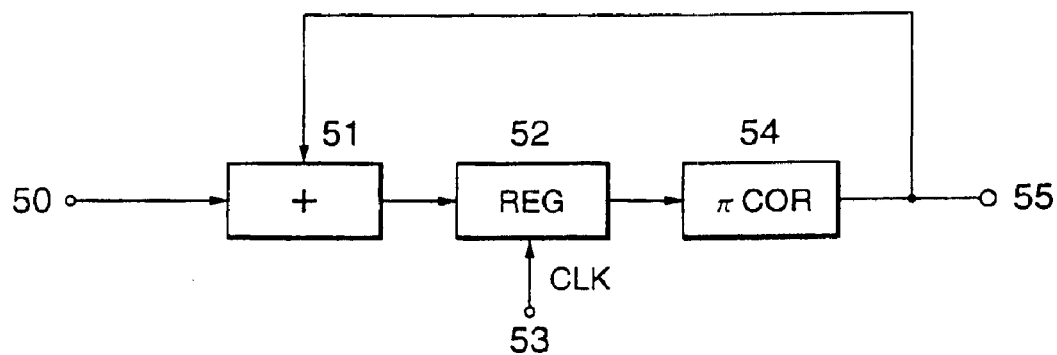
FIG. 2 is a diagram showing an example of a detailed configuration of a differential coding circuit in the differential CDMA transmitter shown in FIG. 1.

FIG. 2 shows an example of a detailed configuration of the differential coding circuits (DP) 150–15n placed in the previous stage to the phase modulation circuits (MOD) 110–11n. In the figure, an input signal from the input terminal 50 is inputted to the adder 51. The adder 51 adds the input signal and a signal of the feedback from the output 55 of the π corrector 54. The latch register 52 takes in the output of the adder 51 at a leading edge of a clock signal supplied to the clock terminal (CLK) 53, to hold and then input it to the π corrector 54.

Figure 3:
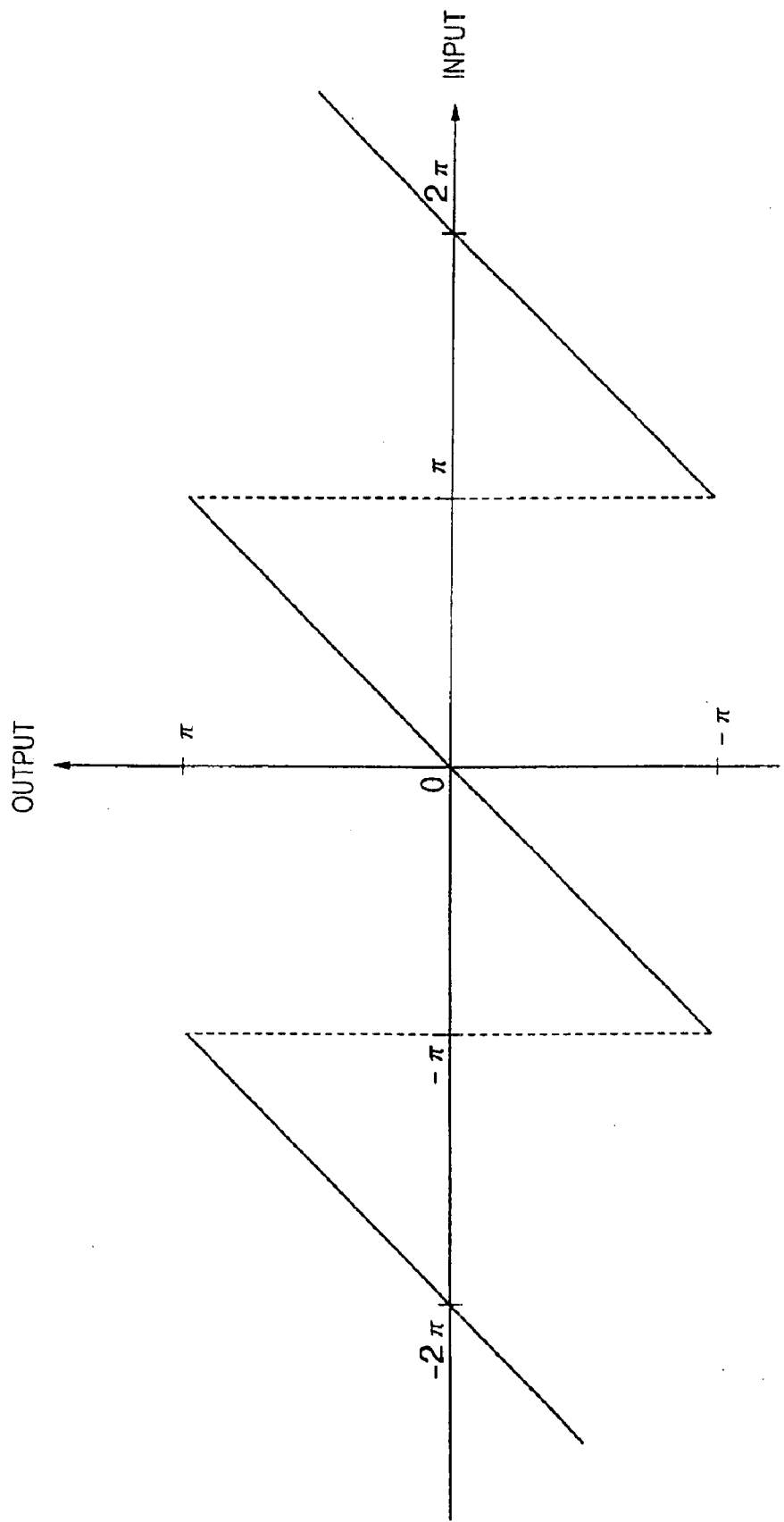
FIG. 3 is a graph showing an example of characteristics of a π corrector in the differential CDMA transmitter shown in FIG. 1.

Here, the π corrector (NCOR) 54 has the input/output characteristics shown in FIG. 3, and, when an input value a is −π or more or π or less, outputs the value a. When an input value a exceeds π, a value a−2π is outputted, and when an input value a is less than −π, a value a+2π is outputted.

Returning to FIG. 2, operation of the differential coding circuits (DP) 150–15n will be described. It is assumed that the input 50 holds phase information a of the next symbol and the latch register 52 holds a differential coding phase value b of the current symbol. However, for the sake of convenience, it is assumed that the absolute value of b is less than π.

Although the output of the adder 51 is a+b, the value b is held until a clock is applied to the terminal 53. After it is held for a period corresponding to the symbol interval T, when a clock is applied to the clock terminal 53, the latch register 52 takes in the value a+b at the leading edge of the clock signal, and holds the value until the next clock is applied. Further, at the same time with the clock, the input 50 is updated, to change to a phase value c of the next symbol.

In the meantime, the π corrector 54 judges the value of a+b and selects a value having the minimum absolute value out of three values a+b, and a+b±2π, to output it. Since a trigonometric function sin or cos provides the same function value for any of the three values, a+b−2π, a+b, a+b+2π, the primary modulated wave after the phase modulation shows the same waveform. By utilizing this property such that values stored or processed in the differential coding circuits (DP) 150–15n become within an interval between −π and +π, the processing circuits can be prevented from becoming complex.

Figure 4:
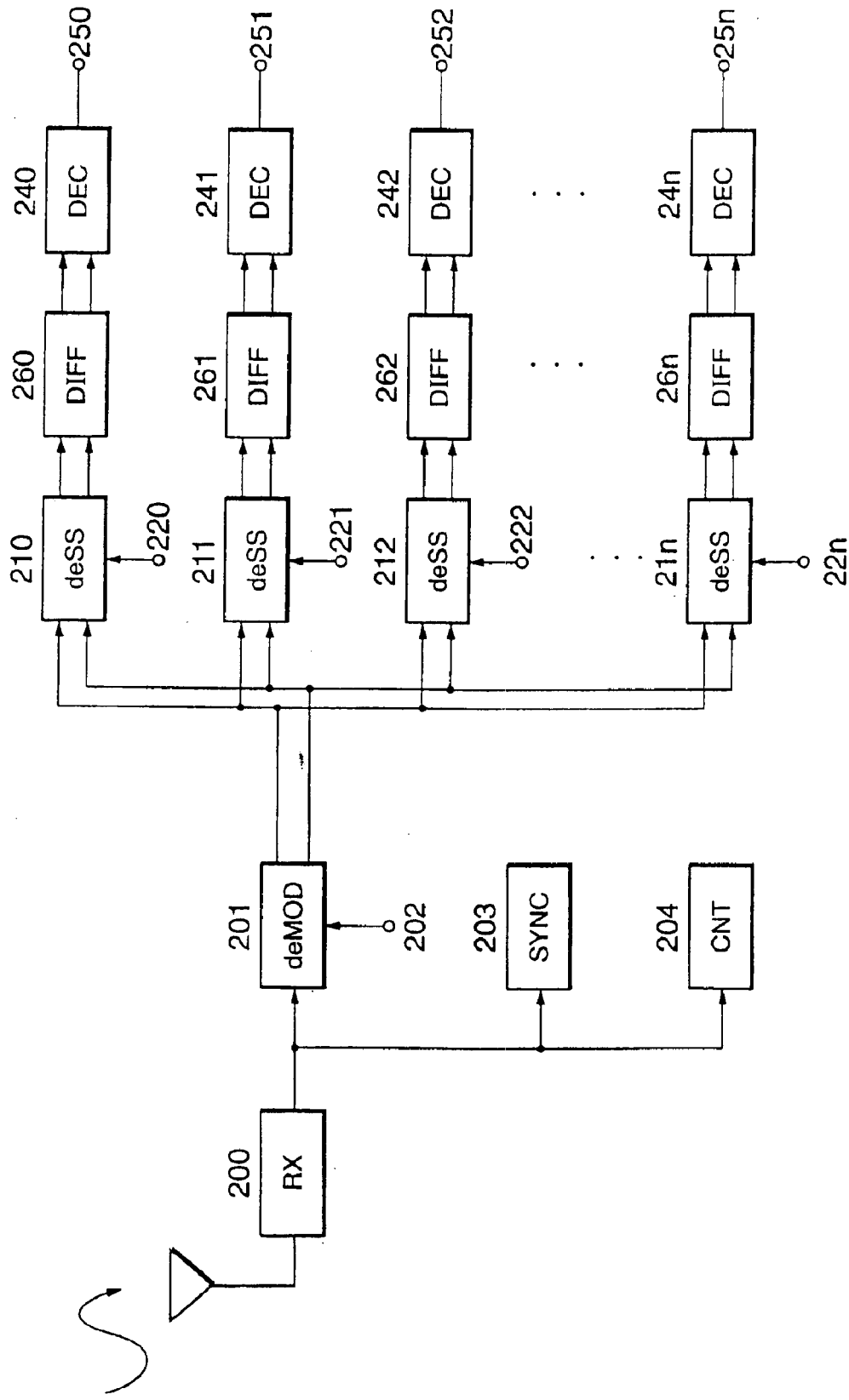
FIG. 4 is a diagram showing an example of a configuration of a differential CDMA receiver according to the present invention.

FIG. 4 shows an example of a configuration of a receiver to which the differential CDMA according to the present invention is applied. In the figure, the receiving circuit (RX) 200, demodulator circuit (deMOD) 201, input terminal 202 for a demodulation control signal, synchronism detection circuit (SYNC) 203, reception control detection circuit (CNT) 204, despreading circuits (deSS) 210–21n, input terminals 220–22n for despread code sequences, decision circuits (DEC) 240–24n, and output terminals 250–25n have the same functions as the respective components added with the corresponding reference numerals of the receiver of FIG. 32 to which the conventional CDMA is applied, and their detailed description will be omitted.

Figure 32:
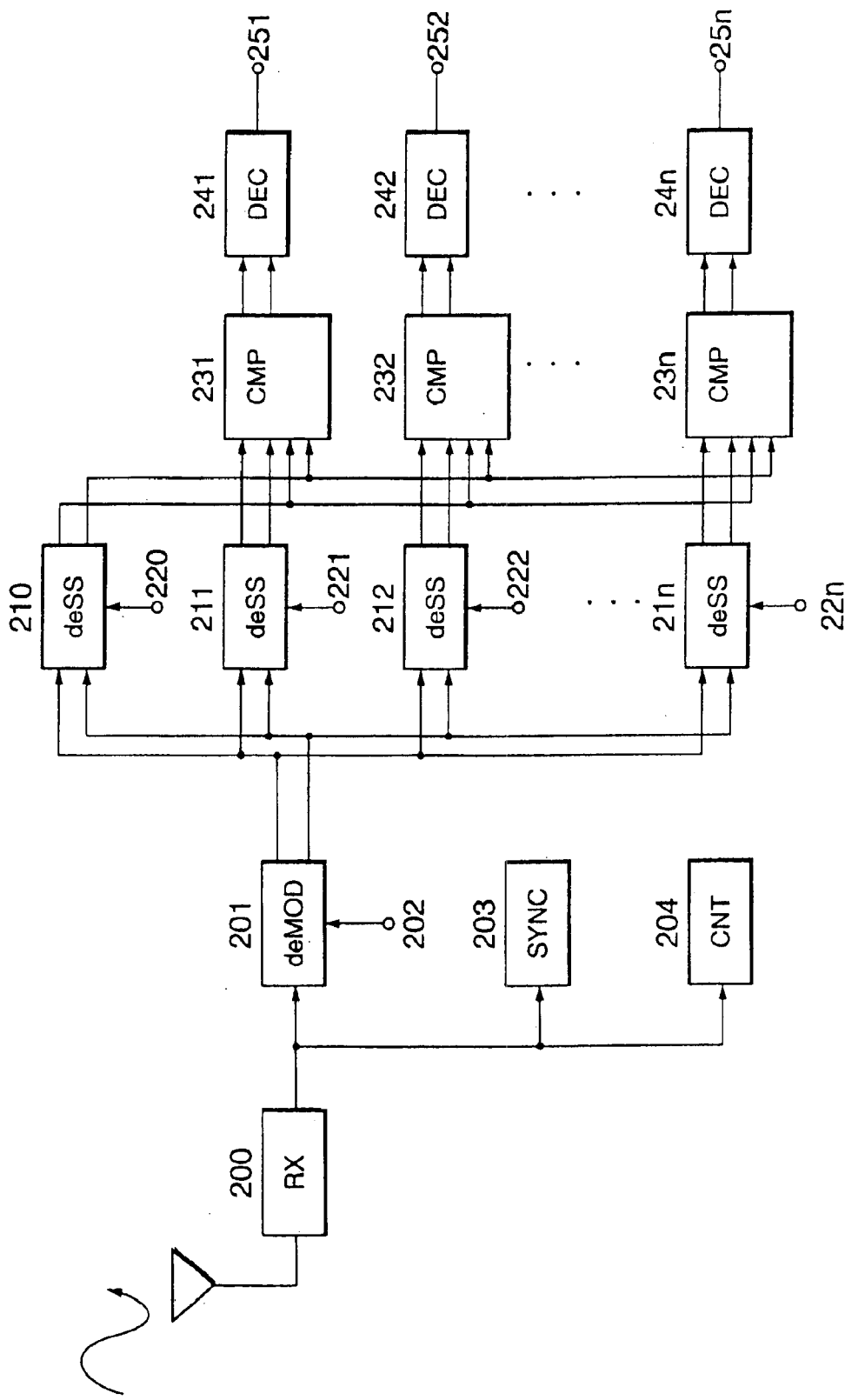
FIG. 32 is a diagram showing an example of a configuration of the conventional CDMA receiver.
Figure 33:
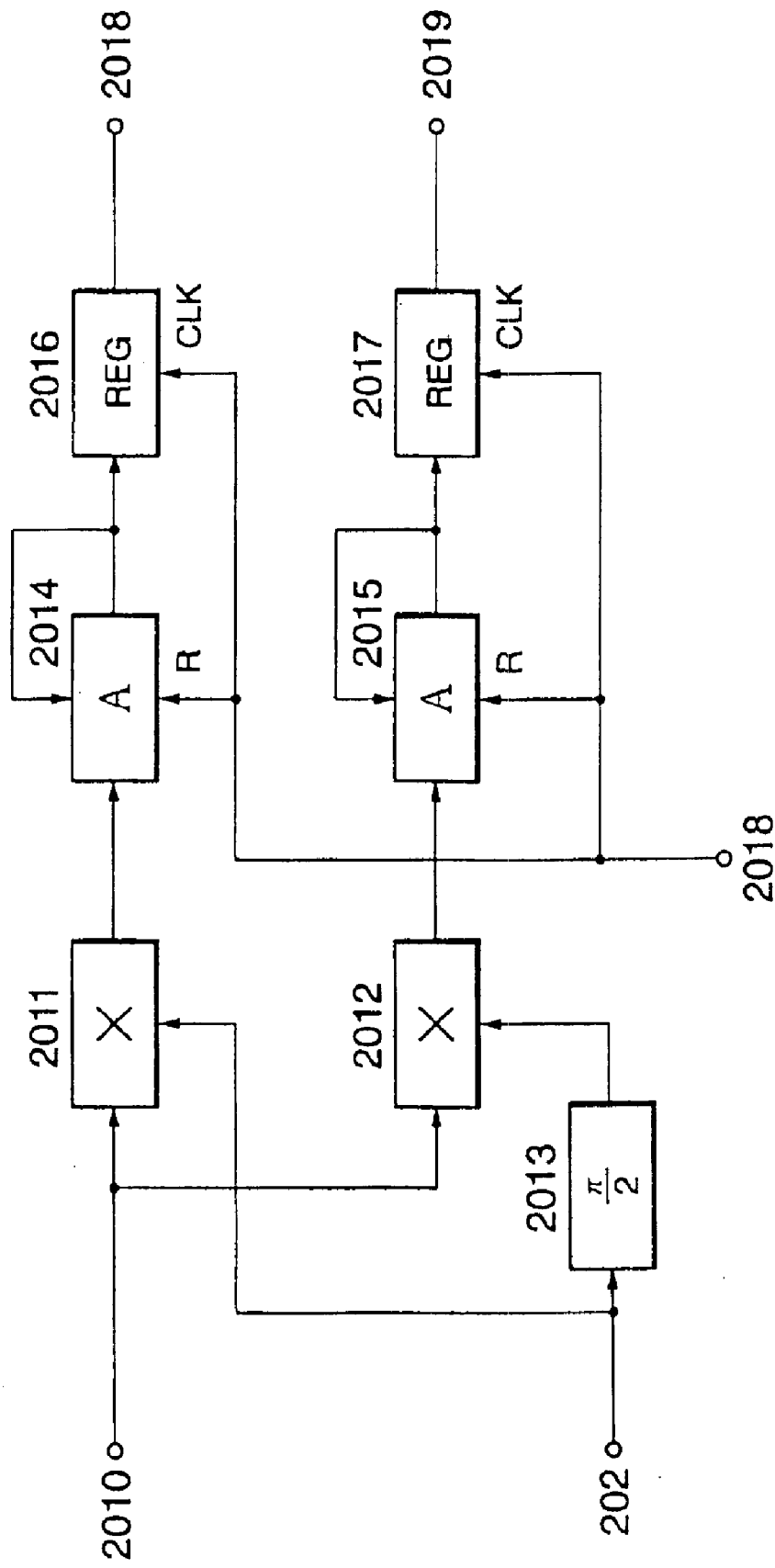
FIG. 33 is a diagram showing an example of a configuration of a demodulator circuit (deMOD) in the CDMA receiver shown in FIG. 32.

Differently from the conventional configuration of FIG. 32, the differential circuits (DIFF) 260–26n are substitute for the phase correction circuits (CMP) between the despreading circuits (deSS) 210–21n and the decision circuits (DEC) 240–24n.

Figure 5:
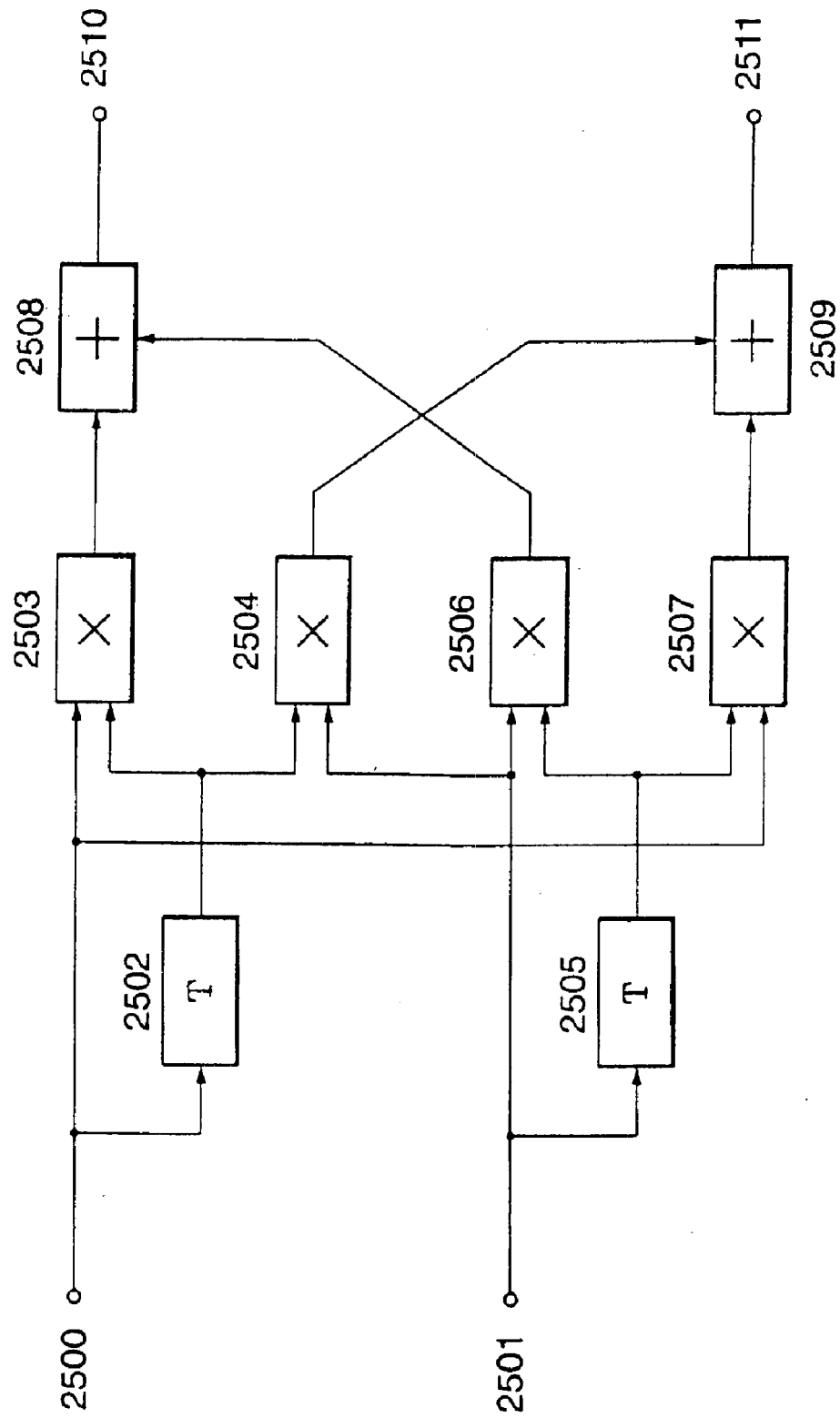
FIG. 5 is a diagram showing an example of a detailed configuration of a differential circuit in the differential CDMA receiver shown in FIG. 4.

FIG. 5 shows an example of a configuration of such differential circuits (DIF) 260–26n. In the figure, the in-phase component $I_i'(t)$ and quadrature component $Q_i'(t)$ of a despread signal as an output of the despreading circuit (deSS) are inputted to the input terminals 2500, 2501. $I_i'(t)$ is inputted to the multipliers 2503 and 2507, and to the delay circuit 2502. $Q_i'(t)$ is inputted to the multipliers 2504 and 2506, and to the delay circuit 2505. To the multipliers 2503 and 2504, is inputted the in-phase component $I_i'(t)$ of the despread signal through the delay circuit 2502. To the multipliers 2506 and 2507, is inputted the quadrature component $Q_i'(t)$ of the despread signal through the delay circuit 2505. Here, the delay circuits 2502, 2505 delay an input f(t) only by a period T corresponding to one symbol interval to output a signal f(t−T).

The adder 2508 adds the outputs of the multipliers 2503 and 2506, and outputs the result as the in-phase component $I_i(t)$ of the differential signal to the output terminal 2510. Further, the adder 2509 subtracts the output of the multiplier 2507 from the output of the multiplier 2504 to output the result as the quadrature component $Q_i(t)$ of the differential signal to the output terminal 2511.

In the configuration of the embodiment of FIG. 4, the differential circuits (DIFF) 260–26n are placed after the demodulator circuit (deMOD) 201 and the despreading circuits (deSS) 210–21n. However, every processing in a series of these circuits is a linear operation, and the order of processing does not affects the actions. Thus, it can be easily inferred that the order of placing the differential circuits (DIFF) 260–26n, demodulator circuit (deMOD) 201, and the despreading circuits (deSS) 210–21n does not affect the processing result. Thus, locations of the various circuits are not limited to the configuration of FIG. 4.

The output i(t) of the in-phase component and the output q(t) of the quadrature component of the demodulator circuit (deMOD) 201 include a plurality of received wave components arriving through multi-ray propagation path as described above in relation to FIG. 32. Accordingly, it is inevitably impossible to completely synchronize a plurality of carrier waves included in the received wave and a regenerated carrier wave regenerated by the synchronism detection circuit (SYNC) 203. Thus, synchronous detection in the demodulation processing becomes incomplete, and the conventional CDMA receiver includes many errors, which is a cause of the poor communication characteristics. However, in the conventional CDMA reception, such incomplete synchronous detection is taken as the complete synchronous detection without including an error, which is a cause of deteriorating communication quality. On the other hand, the present invention is designed to exclude such errors owing to incomplete synchronization. By this reason, in the techniques disclosed in the present invention, synchronous detection including an error in the carrier frequency, phase, or delay is called quasi-synchronous detection differentiating it from the complete synchronous detection, to make the existence of error clear.

In the differential CDMA reception, the demodulated signal by the quasi-synchronous detection is despread to obtain in-phase components and quadrature components of (n+1) despread signals. With respect to a series of processing for obtaining the (n+1) despread signals from the received wave, the conventional CDMA reception and the differential CDMA reception disclosed here are same to each other.

However, in the conventional CDMA reception, not all the (n+1) despread signals are used for transmitting information, but at least one is used as a common pilot signal and only n remaining despread signals are used for transmitting the information. Namely, a known value is transmitted as a pilot. A phase error of the pilot signal appearing at the time of reception is taken as a disturbance suffered in the course of propagation. The (n+1) channels are assumed to suffer the same phase error, and, thus, phase correction is carried out commonly on the remaining n despread signals, in order to receive n pieces of information.

On the other hand, the differential CDMA reception disclosed here is designed such that all the (n+1) despread signals are used for transmitting information, that, by obtaining a difference between received phases of adjacent symbols in each channel, the effect of errors of the quasi-synchronous detection is excluded, and the information can be received without being affected by the frequency-selective fading. Namely, the differential circuit (DIFF) $26i$ of the channel i carries out the difference operation shown in the following, using the despread signal of the channel i, the in-phase component $I_i'(t)$ and quadrature component $Q_i'(t)$ of the despread signal, and the in-phase component $I_i'(t-T)$ and quadrature component $Q_i'(t-T)$ of the despread signal delayed by one symbol period T, and outputs the results as the in-phase component $\hat{I}_i(t)$ and quadrature component $\hat{Q}_i(t)$ of the phase differential signal.

The in-phase component $\hat{I}_i(t)$ and quadrature component $\hat{Q}_i(t)$ of the phase differential signal, shown in the equations 35 and 36, $$\hat{I}_i(t)=I_i'(t)I_i'(t-T)+Q_i'(t)Q_i'(t-T) \quad (35)$$

$$\hat{Q}_i(t)=-I_i'(t)Q_i'(t-T)+Q_i'(t)I_i'(t-T) \quad (36)$$

can be obtained by substituting the in-phase component $I_i'(t)$ and quadrature component $Q_i'(t)$ of the despread signal, given by the equations 19 and 20, and the delayed in-phase component $I_i'(t-T)$ and delayed quadrature component $Q_i'(t-T)$ into those equations 35 and 36. In order to make the comparison clear, these components are obtained by substituting the in-phase component $I_i'(t)$ and quadrature component $Q_i'(t)$ of the despread signal under the two-ray Rayleigh fading environment, given by the equations 32 and 33, and the delayed in-phase component $I_i'(t-T)$ and the delayed quadrature component $Q_i'(t-T)$, similarly to the description of the conventional technique, as follows.

$$\hat{I}_i(t) = \tilde{\beta}(t)\tilde{\beta}(t')\cos\{\theta_i(t-\delta_1(t)) + \tilde{\varphi}_i(t) + \quad (37)$$
$$\tilde{\vartheta}(t)\}\cos\{\theta_i(t'-\delta_1(t')) + \tilde{\varphi}_i(t') + \tilde{\vartheta}(t')\} +$$
$$\tilde{\beta}(t)\tilde{\beta}(t')\sin\{\theta_i(t-\delta_i(t)) + \tilde{\varphi}_i(t) + \tilde{\vartheta}(t)\}\sin\{\theta_i(t'-\delta_i(t')) +$$
$$\tilde{\varphi}_i(t') + \tilde{\vartheta}(t')\}$$
$$= \tilde{\beta}(t)\tilde{\beta}(t')\cos\{\theta_i(t-\delta_i(t)) - \theta_i(t'-\delta_i(t')) + \tilde{\varphi}_i(t) - \tilde{\varphi}_i(t') +$$
$$\tilde{\vartheta}(t) - \tilde{\vartheta}(t')\}$$

$$\hat{Q}_i(t) = \tilde{\beta}(t)\tilde{\beta}(t')\cos\{\theta_i(t-\delta_1(t)) + \tilde{\varphi}_i(t) + \quad (38)$$
$$\tilde{\vartheta}(t)\}\sin\{\theta_i(t'-\delta_1(t')) + \tilde{\varphi}_i(t') + \tilde{\vartheta}(t')\} +$$
$$\tilde{\beta}(t)\tilde{\beta}(t')\sin\{\theta_i(t-\delta_i(t)) + \tilde{\varphi}_i(t) + \tilde{\vartheta}(t)\}\cos\{\theta_i(t'-\delta_i(t)) +$$
$$\tilde{\varphi}_i(t') + \tilde{\vartheta}(t')\}$$
$$= \tilde{\beta}(t)\tilde{\beta}(t')\sin\{\theta_i(t-\delta_i(t)) - \theta_i(t'-\delta_i(t')) + \tilde{\varphi}_i(t) - \tilde{\varphi}_i(t') +$$
$$\tilde{\vartheta}(t) - \tilde{\vartheta}(t')\}$$

where t'=t−T.

In adjacent symbol intervals, as already described, fading, Doppler shift, and the like are nearly constant, and thus, the following equations can be obtained.

$$\hat{I}_i(t) \approx \beta(t)\beta(t-T)\cos\{\theta_i(t-\delta_1(t))-\theta_1(t-T-\delta_1(t-T))\} \quad (39)$$

$$\hat{Q}_i(t) \approx \beta(t)\beta(t-T)\sin\{\theta_i(t-\delta_1(t))-\theta_i(t-T-\delta_1(t-T))\} \quad (40)$$

As already described in relation to the conventional technique, in many cases, the decision circuit obtains the received information from the received phase angle. In the conventional technique, the phase angle between the in-phase component and the quadrature component of the phase correction signal is obtained. On the other hand, as a feature of the present invention, the phase angle between the in-phase component and quadrature component of the phase differential signal is obtained. Namely, $$\text{information phase}_i(t) = \tan^{-1}\left[\frac{\hat{Q}_i(t)}{\hat{I}_i(t)}\right] \quad (41)$$
$$= \tan^{-1}\left[\frac{\sin\{\theta_i(t-\delta_q(t)) - \theta_i(t-T-\delta_1(t-T))\}}{\cos\{\theta_i(t-\delta_1(t)) - \theta_i(t-T-\delta_1(t-T))\}}\right]$$
$$= \theta_i(t-\delta_i(t)) - \theta_i(t-T-\delta_1(t-T))$$

It can be seen that the last right side of the equation 41 gives the difference between the phase angle $\theta_i(t-\delta(t))$ in the current symbol interval and the phase angle $\theta_i(t-T-\delta(t-T))$ in the previous symbol interval. In the present invention, information is changed to a differential code before transmission, and thus it becomes obvious that the phase difference $\theta_i(t-\delta(t))-\theta_i(t-T-\delta(t-T))$ correctly receives the received information of the channel i. In the case of the last right side of the equation 34 expressing the information phase angle according to the conventional system, the Doppler shift, fading phase error, carrier regeneration delay, and the like are removed. However, the frequency-selective fading distortion $$\psi_i(t)-\psi_0(t)$$

can not be removed, remaining as a disturbance term. Due to this disturbance term, a reception error arises, deteriorating the communication quality. On the other hand, in the present invention, it is obvious that, as shown in the equation 41, only the phase difference, i.e. the information itself, remains in the information phase angle obtained from the phase differential signal, and a disturbance term other than the information is completely removed.

Further, when the information phase is obtained using the averages in the symbols in the in-phase component and quadrature component of the phase differential signal shown in the equations 39 and 40, random noises can be suppressed and the communication quality can be improved. This can be easily understood, and therefore its description is omitted.

Further, the envelope of the phase differential signal can be obtained by the square of the square-sum of the in-phase component and quadrature component of the phase differential signal. For detecting the amplitude distortion etc., it is sufficient to use this envelope of the phase differential signal. Further, the amplitude distortion can be easily removed by normalizing the phase differential signal with the envelope. This can be easily understood, and therefore its description is omitted.

[Phase Continuous CDMA Transmission System]

It is known that the frequency band of the received wave, which is propagated being affected by the fading in the course of the transmission path, becomes larger than the original frequency band of the radio wave emitted from a transmitter. This enlarged frequency band width is called a fading band width.

As shown in equations 19 and 20, in the variables of the trigonometric functions expressing the in-phase component and quadrature component of the despread signal, other than the information $\theta_i$, the term $\psi_i(t)$ relating to the frequency-selective fading and the term relating to the fading phase error, Doppler shift, carrier regeneration error, and the like become factors of enlarging the frequency band width.

Figure 36:
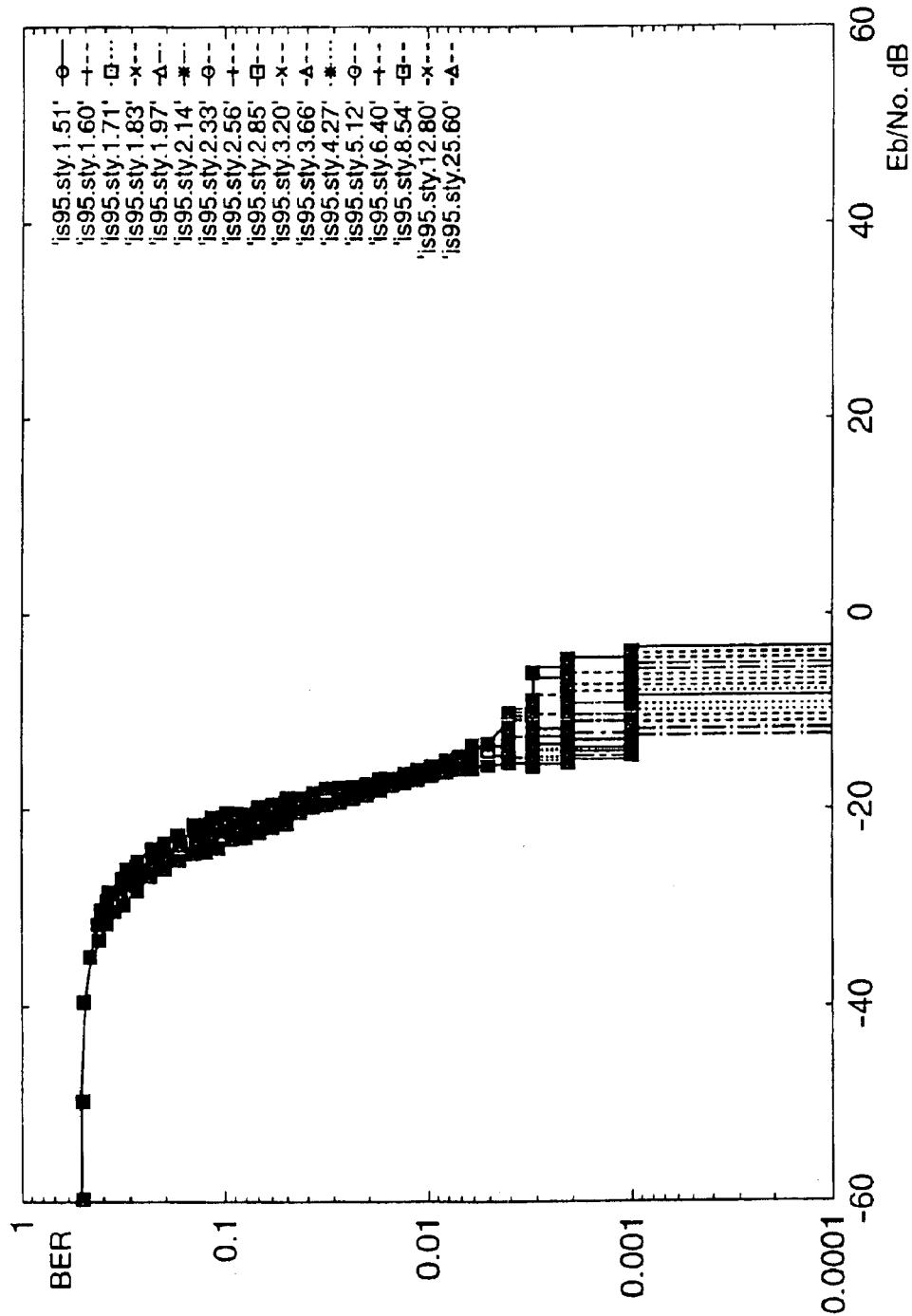
FIG. 36 is a graph showing an example of transmission characteristics in the stationary telephone mode of the conventional CDMA transmission system.

The higher the speed of a moving unit becomes, the higher the fading frequency becomes. And, to that extent, the fading band width is enlarged, and as a result, communication quality is deteriorated. As the moving speed of a moving unit increases from the stationary telephone mode through the pedestrian telephone mode to the automobile telephone mode, the communication quality is deteriorated to that extent. In fact, as shown in FIG. 36, in the stationary telephone mode, the received electric field required for obtaining BER$\leq$0.001 can be realized for all the transmission band width of 1.51 MHz or more at Eb/No$\leq$0 dB.

Figure 37:
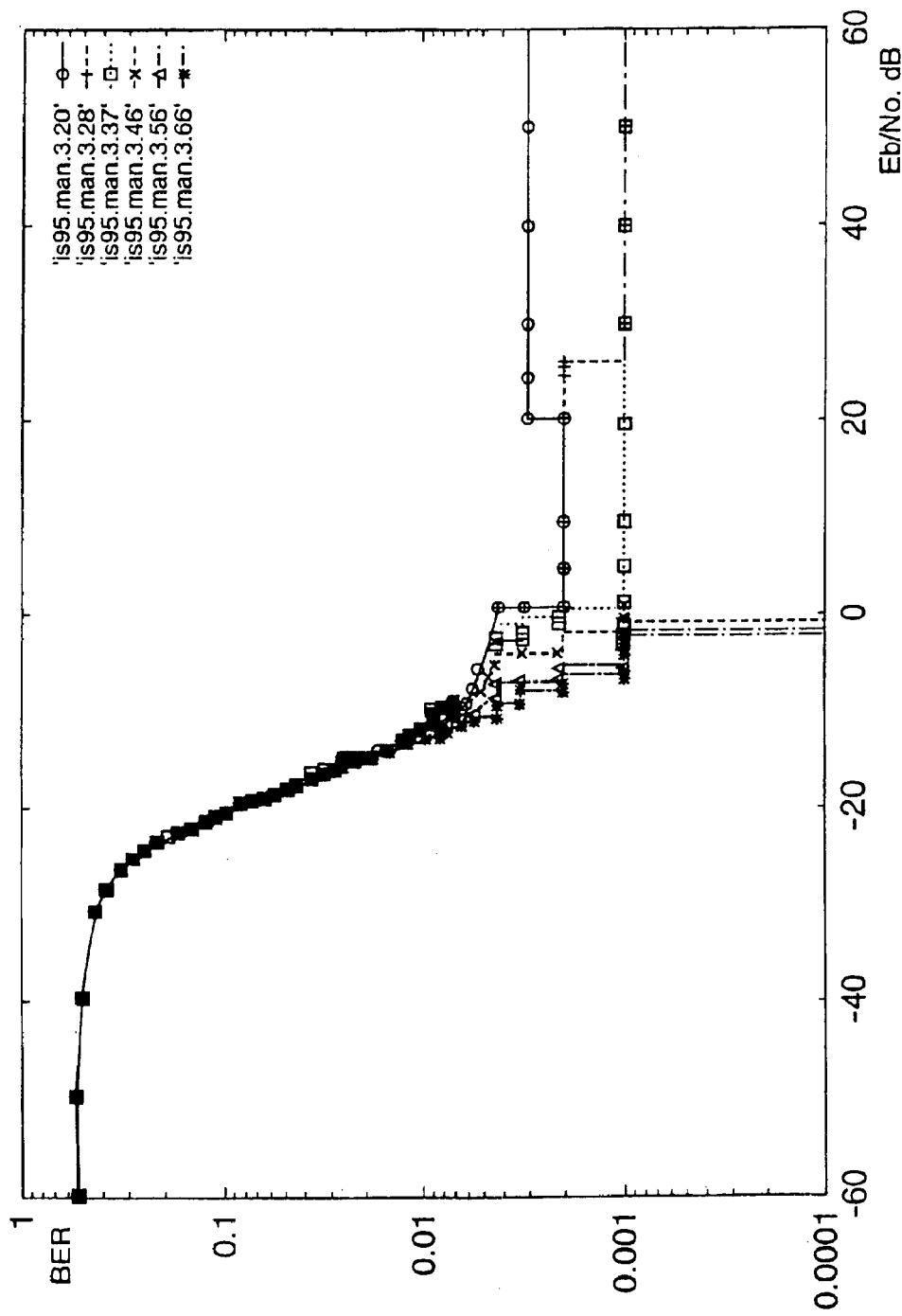
FIG. 37 is a graph showing an example of transmission characteristics in the pedestrian telephone mode of the conventional CDMA transmission system.

On the other hand, as shown in FIG. 37, in the pedestrian telephone mode, the transmission band width required for obtaining BER$\leq$0.001 is 3.46 MHz or more for the same received electric field of Eb/No$\leq$0 dB, and a floor appears for the transmission band width of 3.37 MHz. In the following, the minimum transmission band width realizing the high quality communication of this BER$\leq$0.001 is called the critical transmission band width, which is used for evaluating a CDMA transmission system.

As the critical transmission band width is smaller, it means that the frequency utilization efficiency is better. Effective utilization of the limited frequency resource is considered to be an important factor for evaluating a system, and thus, the critical transmission band width is used for evaluating a system.

As shown in FIG. 37, in the automobile telephone mode, BER is always 0.2 or more, and accordingly, the communication quality can not be improved even by the highest transmission power. In this case, the critical transmission band width is more than 25.60 MHz. As the cause of such occurrence of a floor, it is mentioned that the frequency band width of the transmission wave exceeds the allowable transmission band width, due to the increase of the fading band width.

The transmission band width is determined in advance, at the time of the system design, while the fading band width is determined by the moving speed of a moving unit, etc. Thus, for realizing high quality communication in the automobile telephone mode, it is efficient means to make the band width of the transmission wave narrower, to have a larger margin for increase of the fading band width.

The band width of the transmission wave is defined by convolution of the frequency band width of a spread code sequence and the frequency band width of a primary modulated wave. When information is not carried, a primary modulated wave becomes a tone signal of the carrier frequency, and the band width becomes zero, so that the frequency band width of the transmission wave coincides with the band width of the spread code sequence.

On the other hand, when information is carried, a primary modulated wave has discontinuity of phase at ends of a symbol interval. This discontinuity of phase enlarges the frequency band width, and convolution is also increased, so that the frequency band width of the transmission wave becomes wideband. In that case, information is transmitted by a phase value within a symbol period of the primary modulated wave, and not by violent phase fluctuation such as phase discontinuity at ends of a symbol interval. Accordingly, when violent phase change at the ends of a symbol interval is excluded, high quality communication can be realized without enlarging the transmission band width.

Figure 6:
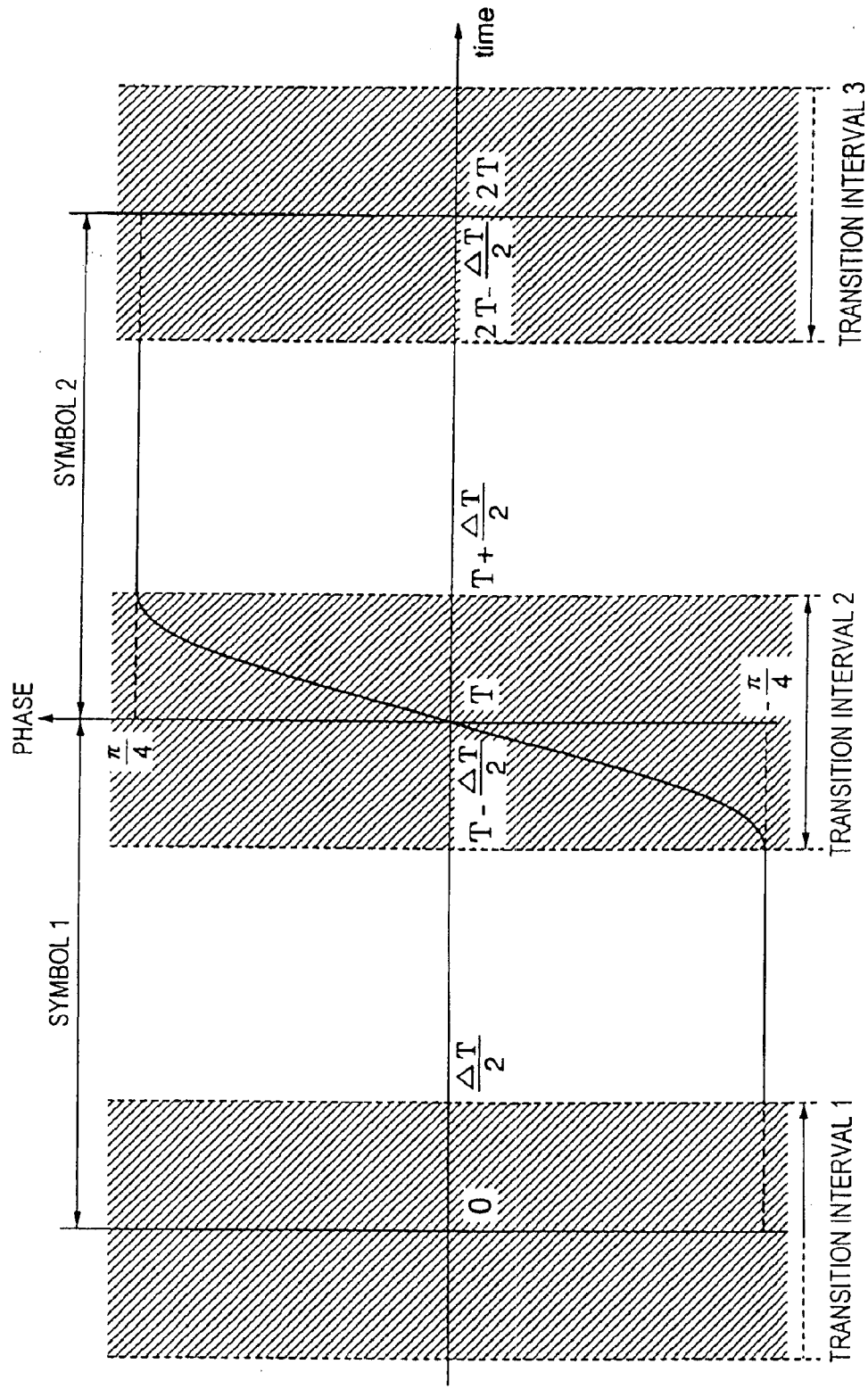
FIG. 6 is a schematic view showing information phases in the intervals of symbol 1 and symbol 2 of a primary modulated wave.

FIG. 6 shows an example of phases in the symbol interval 1 and symbol interval 2 is shown by a solid line. In the figure, phases relating to information of the conventional primary modulated wave are shown by a broken line. Further, in the symbols of the figure, is shown an example in which the symbol 1 is $-\pi/4$ radian and the symbol 2 is $\pi/4$ radian.

Figure 27:
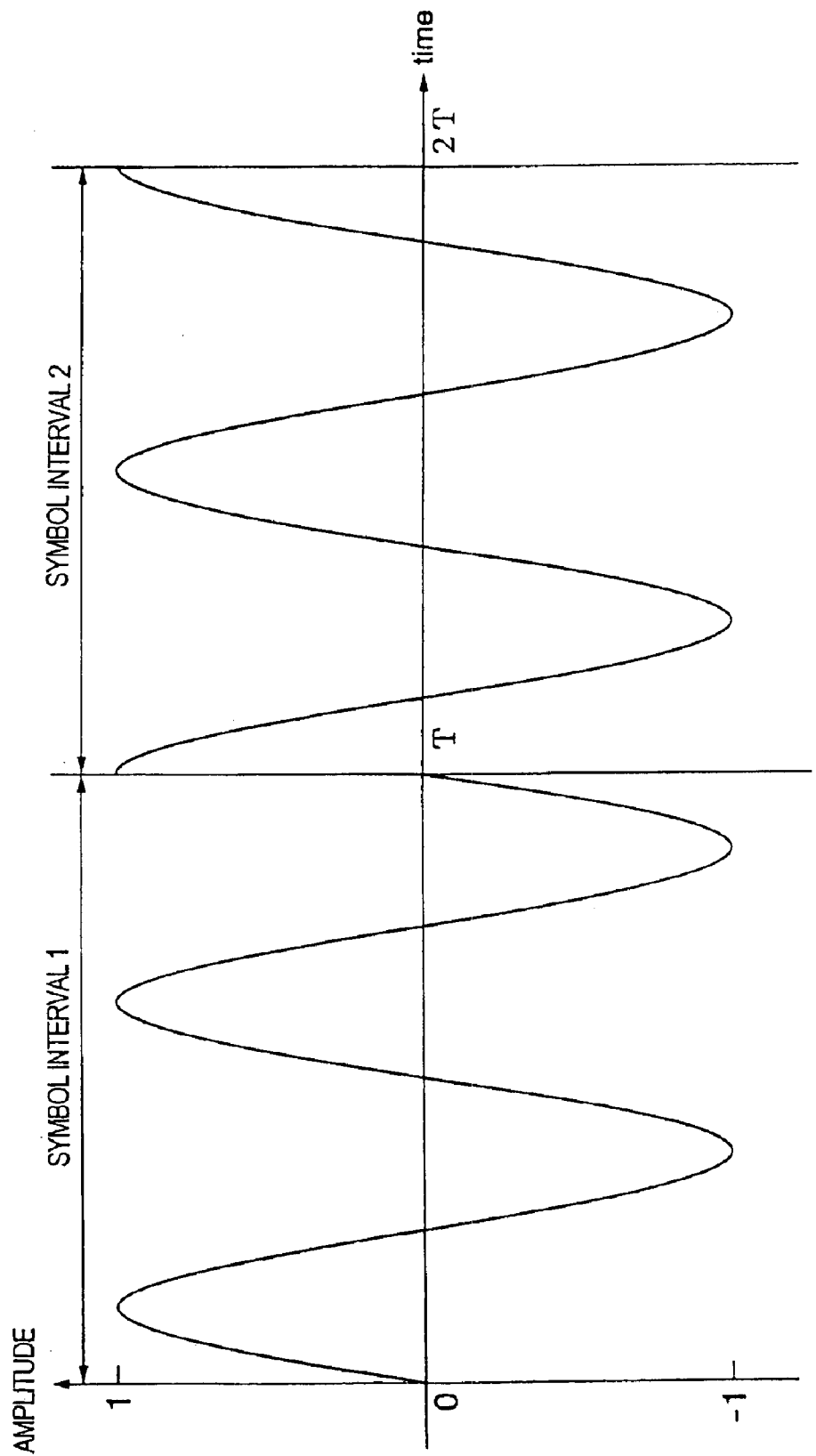
FIG. 27 is a schematic view showing a waveform in the intervals of symbol 0 and symbol 1 of a primary modulated wave of the CDMA transmitter shown in FIG. 26.
Figure 28:
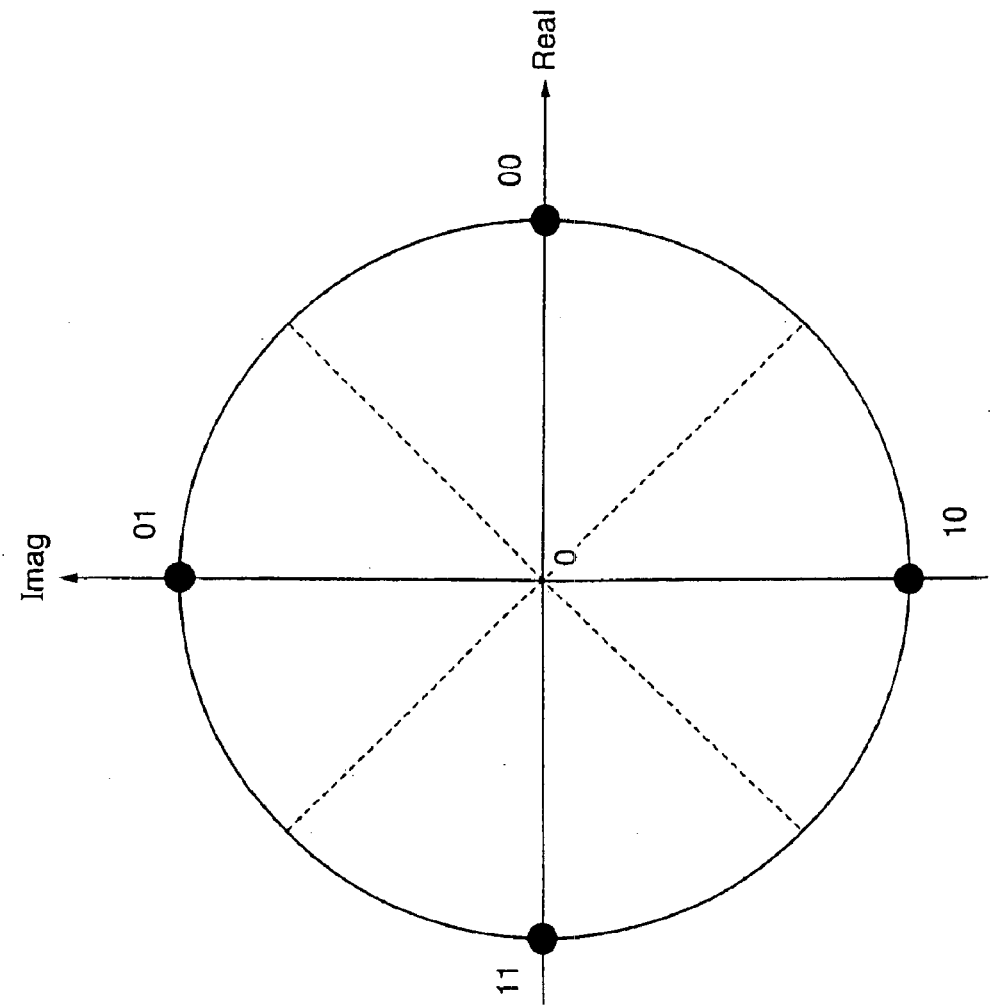
FIG. 28 shows an example of bit arrangement (bit constellation) for the QPSK.

As shown by the broken line, when an information phase is defined all over the symbol interval, extreme change (discontinuity) of the primary modulated wave appears at an end of the symbol interval as shown in FIG. 27, which becomes a cause of increasing the frequency band width of the primary modulated wave.

In contrast, according to the phase continuous technique as a feature of the present invention, a transition interval is provided in the neighborhood of each end of a symbol interval as shown by the solid line of FIG. 6, and the information phase changes continuously in this transition interval. Here, as shown by a solid curve in FIG. 6, the transition interval 1 refers to an interval set from the time $-\Delta T/2$ to the time $\Delta T/2$ between the symbol 0 and symbol 1, in which the phase changes continuously; the transition interval 2 to an interval set from the time $T-\Delta T/2$ to the time $T+\Delta T/2$ between the symbol 1 and the symbol 2, in which the phase changes continuously; and the transition interval k+1 to an interval set from the time $kT-\Delta T/2$ to the time $kT+\Delta T/2$ between the symbol k and the symbol k+1. Further, the length of each transition interval is a constant $\Delta T$.

Figure 7:
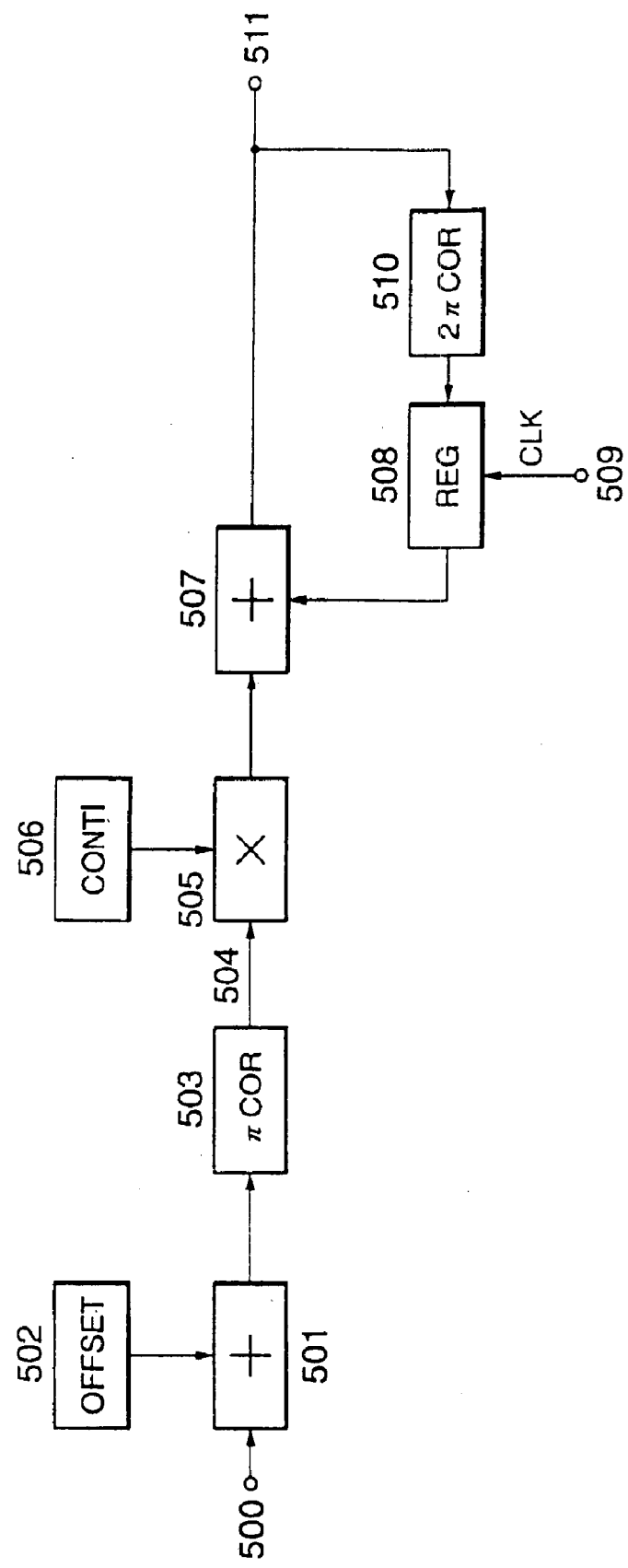
FIG. 7 is a diagram showing an example of a detailed configuration of a phase continuous differential coding circuit (DP-CP)

FIG. 7 is a block diagram showing an example of configuration of the phase continuous differential coding circuit (DP-CP) used, in place of the differential coding circuit (DP) 150–15n of FIG. 1, in the differential CDMA transmitter according to the present invention. In the figure, a signal inputted from the input terminal 500 is inputted to the adder 501. The adder 501 adds the input signal from the input terminal 500 and a shift signal from the shift-constant generating circuit (OFFSET) 502. The output of the adder 501 is inputted to the $\pi$ corrector ($\pi$COR) 503. The output 504 of the $\pi$ corrector ($\pi$COR) 503 and the output of the continuating circuit (CONTI) 506 are inputted to the multiplier 505, which outputs the product of both the inputs. Further, the output 511 of the phase continuous differential coding circuit (DP-CP) is returned in feedback through the $2\pi$ corrector ($2\pi$COR) 510 and the latch register (REG) 508, and added with the output of the multiplier 505 by the adder 507, to become the output 511. Further, in FIG. 7, at a leading edge of the clock signal inputted to the terminal (CLK) 509, the latch register (REG) 508 takes in its input to hold therein.

Figure 8:
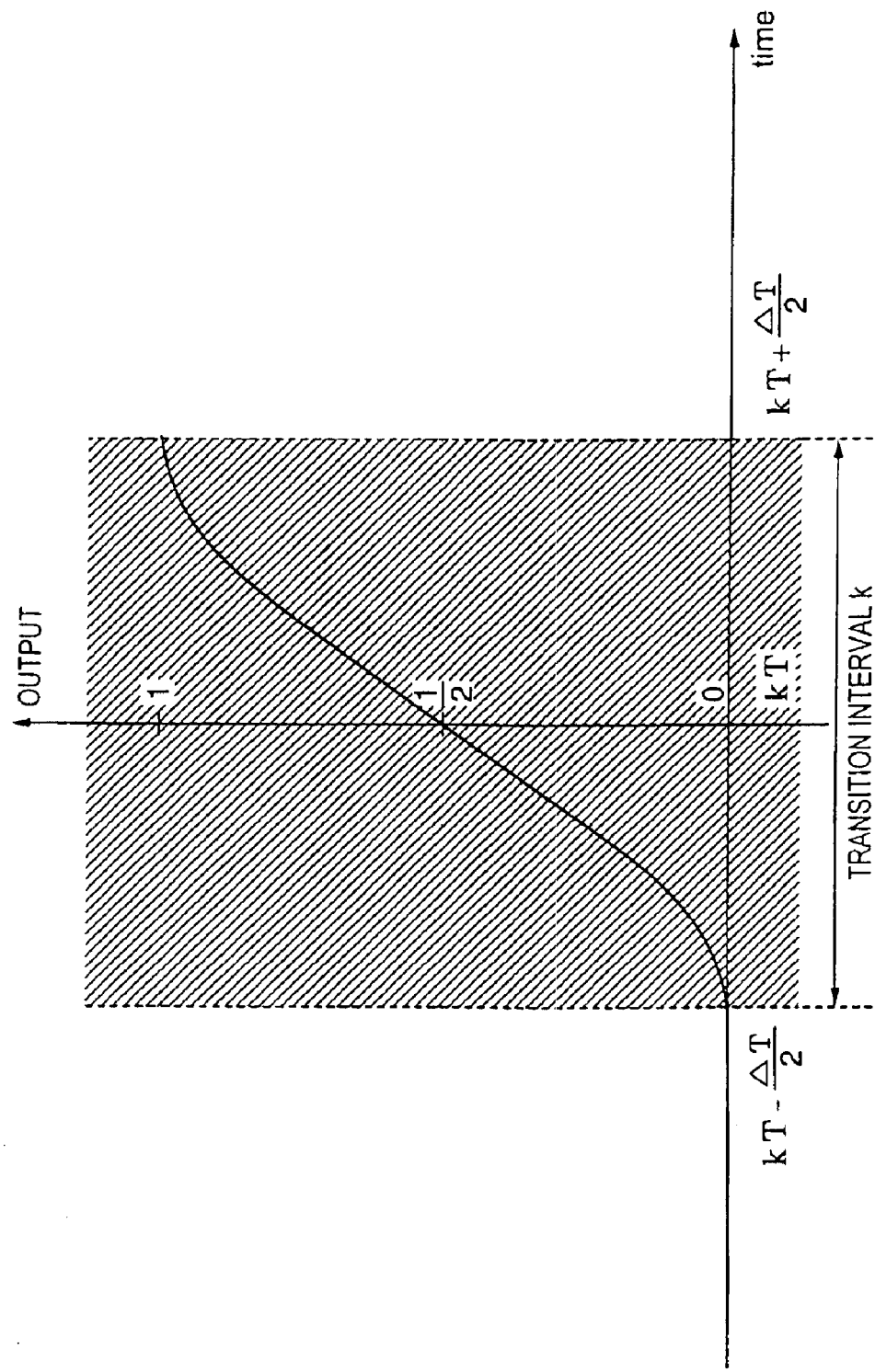
FIG. 8 is a graph showing an example of an operating characteristic of a continuating circuit (CONTI)

Here, the $2\pi$ corrector ($2\pi$COR) has terminals for input a and output b. When a value inputted to the terminal a exceeds $2\pi$ (a>$2\pi$), the $2\pi$ corrector outputs a value (a$-2\pi$) to the output terminal b. When a value inputted to the terminal a is less than $-2\pi$ (a<$-2\pi$), it outputs a value (a+$2\pi$). And, when a value inputted to the terminal a is more than or equal to $-2\pi$ and less than or equal to $2\pi$ ($-2\pi \leq a \leq 2\pi$), it outputs the input value a itself. Further, as shown in FIG. 8, the continuating circuit (CONTI) outputs a value that changes continuously from 0 to 1 in the transition interval k, for example, the value defined by the following equation 42.

$$\frac{1}{2}\left\{1 + \sin\left(\pi \frac{t-kT}{\Delta T}\right)\right\}, |t-kT| \le \Delta T| \quad (42)$$

Since an transition interval exists for each period of time T, this can be easily realized, for example, by storing in a ROM in advance the output values of the continuating circuit, and by reading these values in turn from the ROM, such that a circuit of these values can be made in one symbol interval.

Returning to FIGS. 6 and 7, the operation of the phase continuous differential coding circuit (DP-CP) will be described in due order. Since the operation is cyclic in the interval T, the operation will be described from the trailing edge t=ΔT/2 of the transition interval 0 to the trailing edge t=T+ΔT/2 of the transition interval 1. However, the operation is similar in the other periods. It is assumed that, at the time t=ΔT/2, a phase value $a_2$ of the symbol 2 is applied to the input terminal 500, and a differential coding phase value $b_1$ of the symbol 1 is outputted to the output terminal 511. However, for the sake of convenience, it is assumed that the absolute value of $b_1$ is less than or equal to $2\pi$.

At the time t=ΔT/2, the latch register 508 latches therein the output $b_1$ of the $2\pi$ corrector 510. The latched value is held therein until the time t=T+ΔT/2 when a clock is inputted to the terminal 509 next time. In the case of shiftDPSK, the corresponding shift quantity is stored into the shift-constant generating circuit (OFFSET) 502. In the case of DPSK, the value "0" is stored in the shift-constant generating circuit 502. In the following, the value stored in the shift-constant generating circuit (OFFSET) 502 is uniformly written as d.

Thus, the output d of the shift-constant generating circuit (OFFSET) 502 is added to the input $a_2$ from the input terminal 500, and the result is inputted to the $\pi$ corrector ($\pi$COR) 503. The $\pi$ corrector ($\pi$COR) 503 judges the output $a_2$+d of the adder 501, to select a value having the minimum absolute value out of three values $a_2$+d, $a_2$+d−$2\pi$, and $a_2$+d+$2\pi$, and outputs the selected value to the output terminal 504. This output is referred to as $p_{add}$.

The multiplier 505 outputs the product of $p_{add}$ and the output of the continuating circuit (CONTI) 506. The sum of the output of the multiplier 505 and the value $b_1$ held by the latch register 508 appears at the output terminal 511. In the transition interval 2, the output of the continuating circuit continuously changes from the value $b_1$ to arrive at a value $b_1+p_{add}$ at the time t=T+ΔT/2. At that time, while the output of $2\pi$ corrector ($2\pi$COR) 510 is changing in the transition interval 2, the output is finally decided as a value having the minimum absolute value out of three values $b_1+p_{add}$, $b_1+p_{add}-2\pi$, $b_1+p_{add}+2\pi$ at the trailing edge t=T+ΔT/2. This value will be written as $b_2$.

Further, at the time t=T+ΔT/2, when the next clock is applied, the latch register 508 takes in the value $b_2$ to hold therein, and the phase value $a_3$ of the symbol 3 is applied to the input terminal 500 and held thereat.

As described above, to the output terminal 511 of the phase continuous differential coding circuit (DP-CP), is outputted the phase signal that has been subjected to differential coding and changes continuously. Accordingly, by substituting the phase continuous differential coding circuit (DP-CP) shown in FIG. 7 for each of the differential coding circuits (DP) 150–15n, the phase continuous technique in the differential CDMA transmission system according to the present invention is realized.

Figure 9:
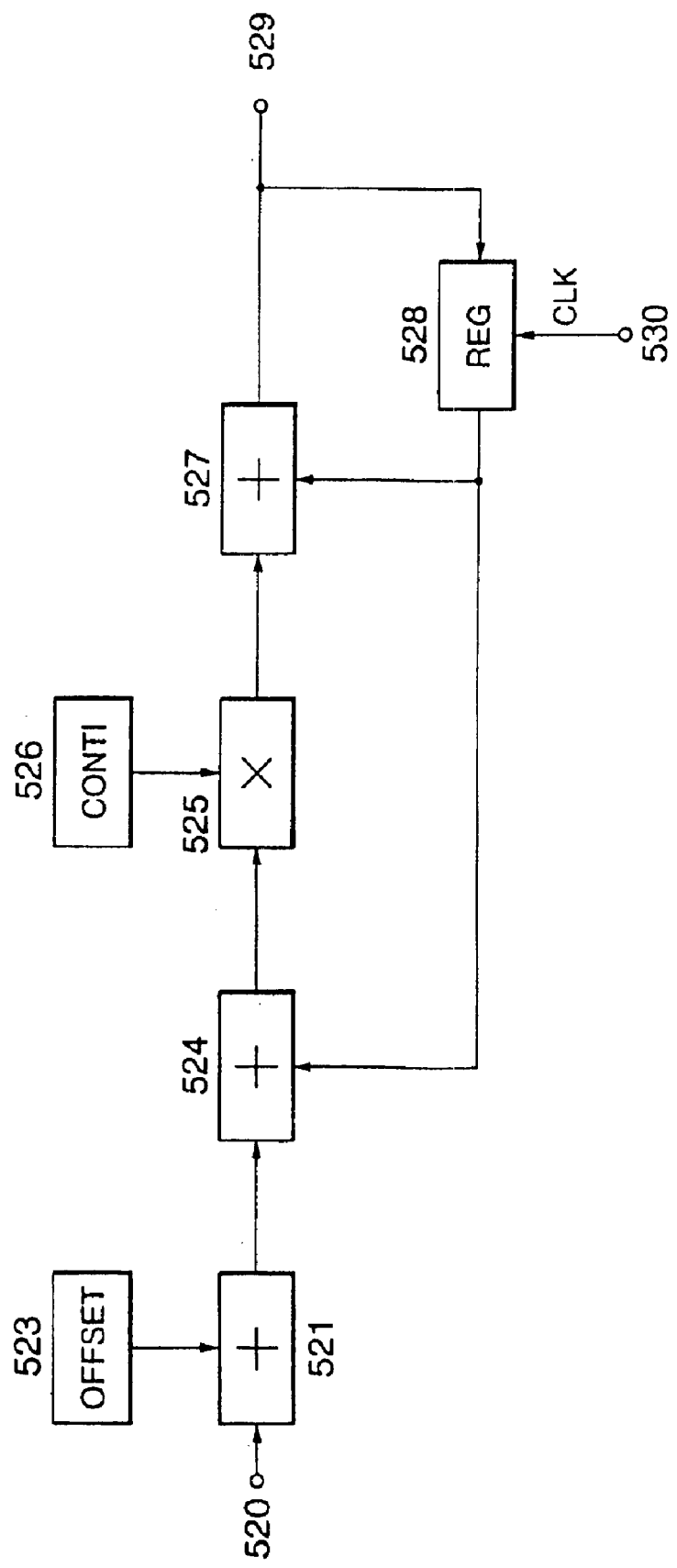
FIG. 9 is a diagram showing an example of a detailed configuration of a phase continuous circuit (CP)
Figure 18:
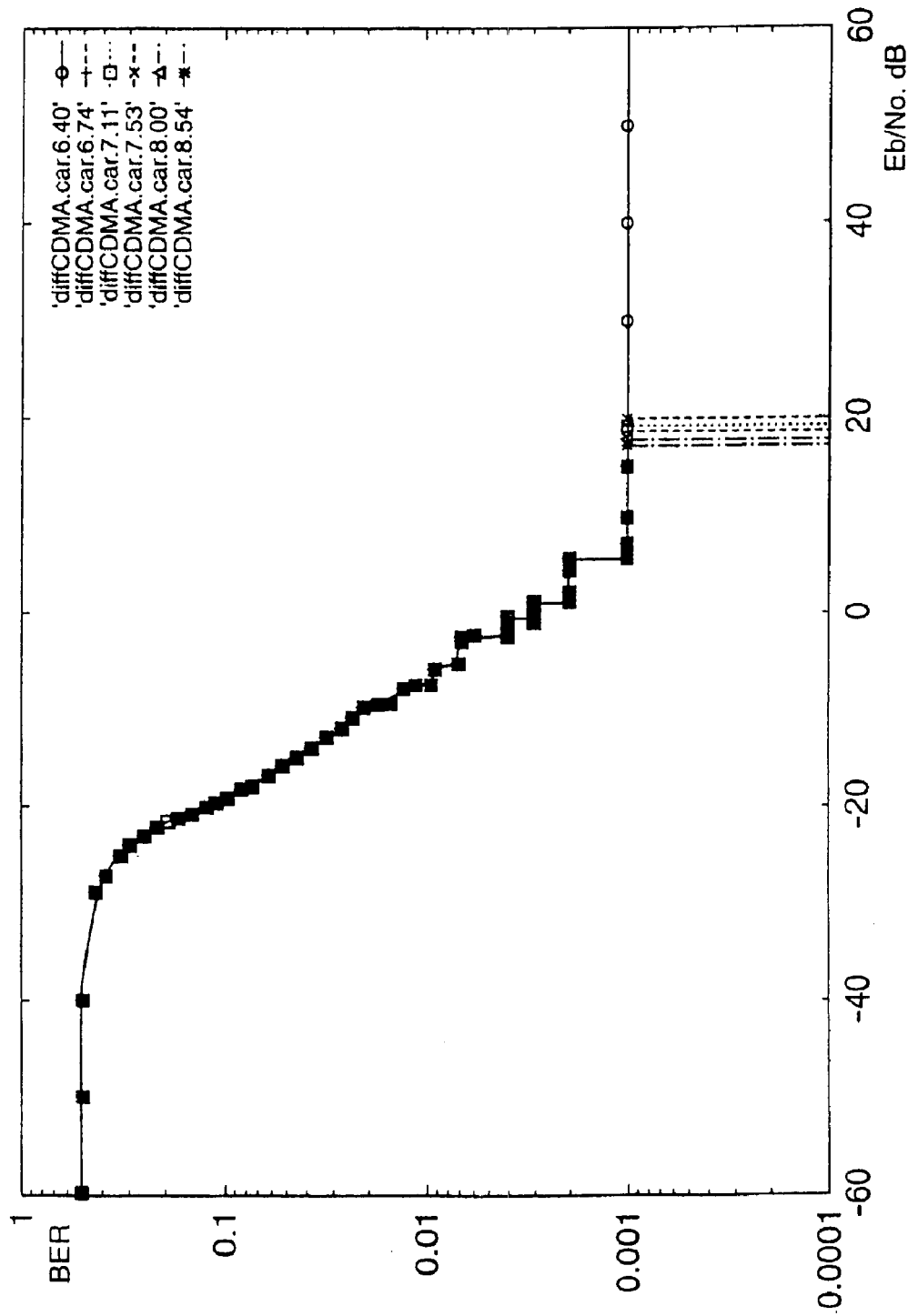
FIG. 18 is a graph showing examples of effect in the automobile telephone mode of the differential CDMA transmission system according to the present invention.

FIG. 9 is a block diagram showing an example of a configuration of the phase continuous circuit in the case that the phase continuous technique according to the present invention is applied to the conventional CDMA transmission system shown in FIG. 18. Namely, by placing this phase continuous circuit (CP) in the previous stage to each of the phase modulation circuits (MOD) 110–11n in FIG. 26, is realized a new transmission system in which the phase in the transition interval of a primary modulated wave by the conventional CDMA transmission system can change continuously. In FIG. 9, the shift-constant generating circuit (OFFSET) 523, the continuous circuit (CONTI) 526, and the latch register (REG) 528 have the same functions as the shift-constant generating circuit (OFFSET) 502, the continuous circuit (CONTI) 506, and the latch register (REG) 508 of FIG. 7, respectively. At the leading edge of the clock signal applied to the clock terminal (CLK) 530, the latch register (REG) 528 takes in an input, and hold therein. The operation of the phase continuous circuit will be described in due order, referring to FIGS. 6 and 9. The operation will be described from the last edge t=ΔT/2 of the transition interval 0 to the transition interval t=T+ΔT/2. However, the operation is cyclic in the transition interval. Thus, since the operation in the other intervals is similar and can be easily understood, description of such operation will be omitted. It is assumed that, at the time t=ΔT/2, the phase value $a_2$ of the symbol 2 is inputted to the input terminal 520, and the phase value $a_1$ of the symbol 1 is outputted to the output terminal 529. At the leading edge of a clock applied at the time t=ΔT/2, the latch register (REG) 528 latches the value $a_1$ inputted to the input terminal and holds that value until the next clock is applied at the time t=T+ΔT/2. The sum of the input $a_2$ and the output d of the shift-constant generating circuit (OFFSET) 502 is outputted from the adder 521. Next, the adder 524 outputs the difference between that sum and $a_1$ held by the latch register (REG) 528. This difference corresponds to the phase difference between the symbol 1 and the symbol 2.

As shown in FIG. 8, the output of the continuating circuit (CONTI) 526 changes continuously from 0 to 1 in a transition interval, similarly to the description given to the continuating circuit (CONTI) 506 of FIG. 7. Namely, as the product of the phase difference and the output of the continuating circuit (CONTI) 526, the multiplier 525 outputs the value 0 at the leading edge t=T−ΔT/2 of the transition interval 1 and the value $a_2-a_1$ at the last edge t=T+ΔT/2 of the transition interval 1. In this period, the output of the multiplier 525 continuously changes from 0 to $a_2-a_1$. The adder 527 obtains the sum of the output by the multiplier 525 and the value $a_1$ held in the latch register (REG) 528, and outputs the result to the output terminal 529, so that the output of the continuating circuit (CONTI) in the transition interval 2 continuously changes from $a_1$ to $a_2$. Further, at the last edge t=T+ΔT/2 of the transition interval 1, the output of the output terminal 529 is taken in by the latch register (REG) 528. Since the adder 527 outputs to the output terminal 529, the value $a_2$ held by the latch register (REG) 528 is outputted from the output terminal without interruption even when the output of the multiplier 525 becomes 0 at the last edge of the transition interval 2.

Thus, by placing the phase continuous circuit shown in FIG. 9 previously to the phase modulation circuit (MOD) in FIG. 26 from a conventional CDMA transmission system, is realized a new transmission system in which the phase changes continuously in a transition interval of a primary modulated wave.

Figure 10:
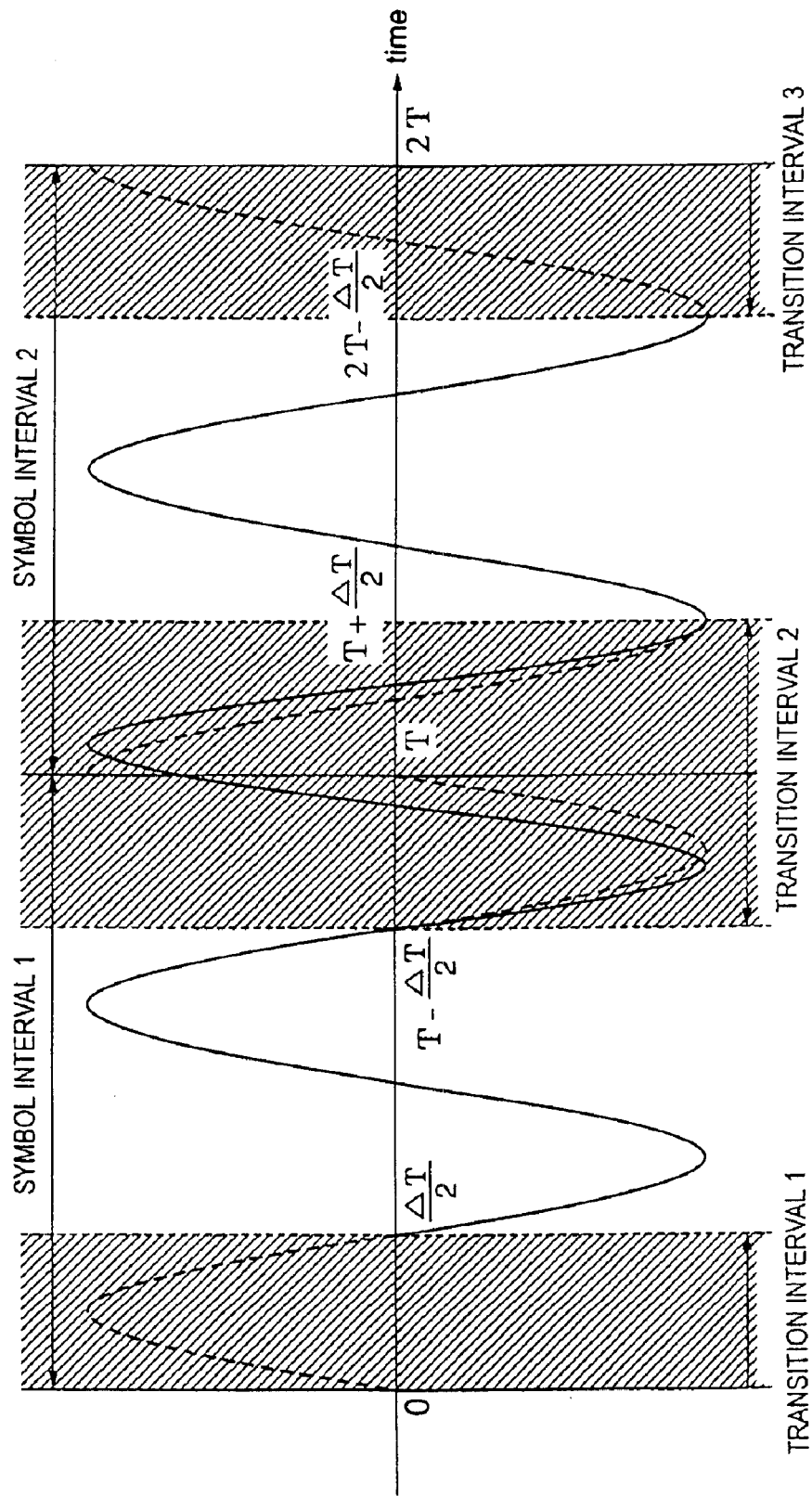
FIG. 10 is a schematic view showing a primary modulated waveform in the intervals of symbol 1 and symbol 2.

As described above, by making the information phase change continuously, discontinuity of a primary modulated wave can be eliminated as shown by the solid line in FIG. 10, which can suppress increase of the band width of the modulated wave. For comparison, the broken line in FIG. 10 shows the conventional primary modulated wave in which phases are not continuous. The smooth continuity of the primary modulated wave shown by the solid line in FIG. 10 can be realized since the discontinuity shown in FIG. 6 is excluded according to the present invention.

[Chip Waveform Continuous CDMA Transmission System]

Figure 11:
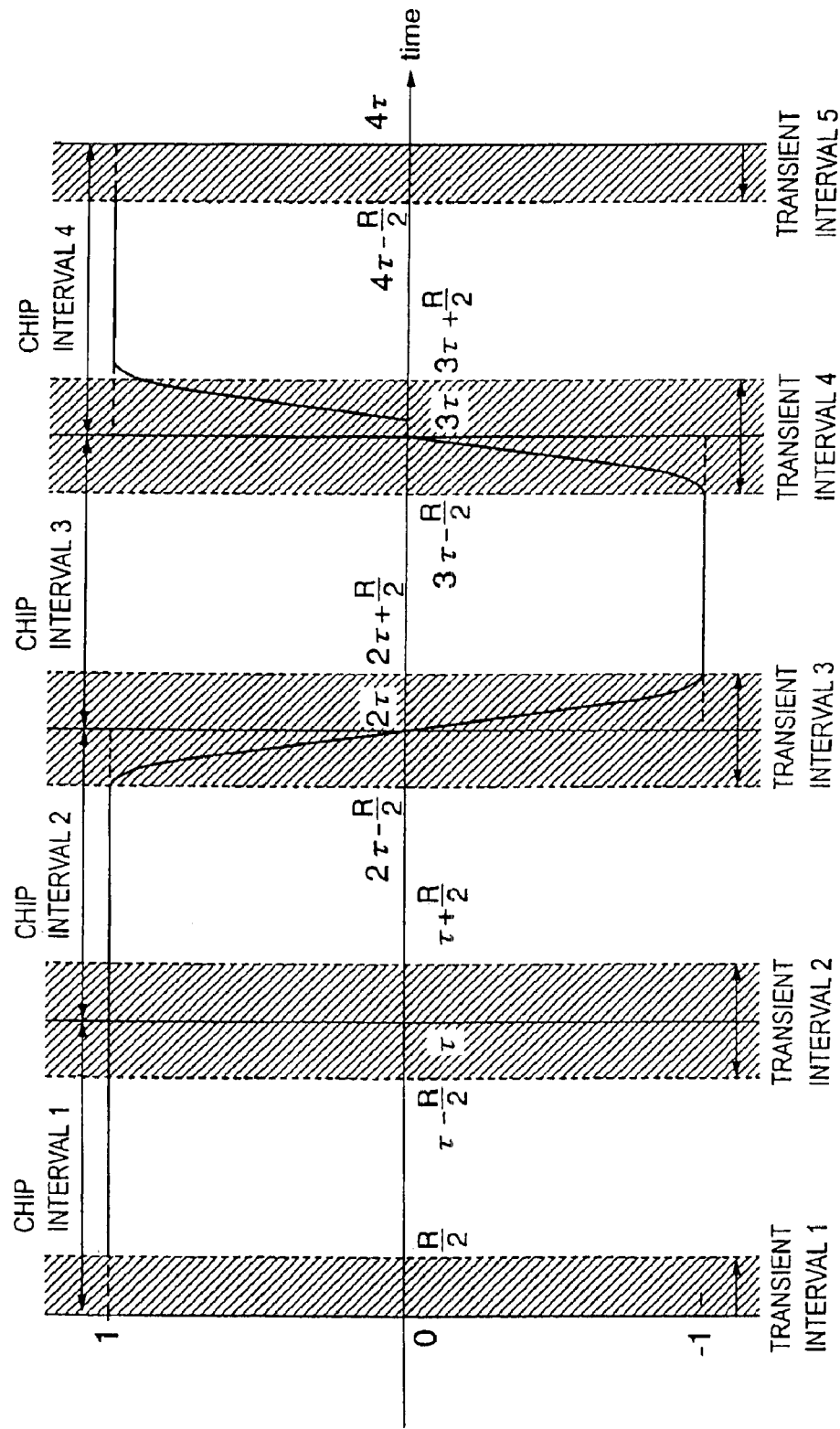
FIG. 11 is a schematic view showing a spread code sequence in the chip intervals 1–4.

In the conventional CDMA transmission system or the differential CDMA transmission system disclosed by the present invention, a PSK or DPSK wave of a primary modulated wave is multiplied by a spread code sequence such as a Walsh code sequence, to generate a spread spectrum signal. In the schematic view of FIG. 11 showing a time response waveform of a spread code sequence in the chips 1–4, a broken line shows an example of the conventional waveform of a spread code sequence. Although FIG. 11 shows a case in which both intervals of the chip 1 and chip 2 have a code value 1, the interval of chip 3 has a chip value −1, and the interval of chip 4 has a code value 1, the other cases are similar. In the case that values of spread codes are same between adjacent chip intervals such as the chip intervals 1 and 2, discontinuity in waveform does not arise between the adjacent chip intervals.

On the other hand, in the case that values of spread codes are different from each other as between the chip interval 2 and chip interval 3, or between the chip interval 3 and chip interval 4, drastic change of waveform of the spread signal appears at an end of a chip interval.

When a code value is maintained all over the chip interval to the end of the chip interval, drastic change of the waveform occurs at ends of chip intervals as shown in the broken lines of FIG. 11, and the frequency band width of the spread signal increases extremely. On the contrary, when the drastic fluctuation of the waveform of the spread code sequence at ends of chip intervals is excluded, increase of the frequency band width of the spread signal can be prevented. When the smoothness of the spread code sequence waveform is made maximum, the maximum frequency band width appears in the case of alternate pattern of code values, and its frequency band width is given by a reciprocal $1/2\tau$ of the length $2\tau$ of two chip intervals. The frequency band width of a spread code sequence decreases in inverse proportion to probability that code values are same between adjacent chip intervals, arriving at minimum value 0 when chip values are same in all the chip intervals.

However, in order to maintain orthogonality of spread code sequences, it is necessary to maintain the value of a spread code as long as possible within a chip interval, and the frequency band width of $1/2\tau$ is insufficient for that purpose. On the other hand, when a code value is maintained all over the chip interval as shown by the broken waveform of FIG. 11, the frequency band width increases more than necessarily. In the case that a radio wave propagates through poor transmission path filled up with noise as in mobile communication, even when transmission is carried out while a code value is maintained all over the chip interval, received chip waveform gets largely out of shape due to random noise entering the transmission path. Further, in order to conduct communication in a predetermined band width, it is necessary to limit the frequency band width of the transmission wave. Owing to the band width restriction; sharp waveforms at ends of chip intervals are inevitably lost. Further, as a more important problem, the effect of the band width restriction does not only distort the waveform of the spread code sequence, but also extends to the carrier waveform. As a result, even the carrier waveform is distorted and information phases to be propagated change, which is a cause of deterioration of communication quality.

Considering such background, suppressing unnecessary sharp fluctuation of the spread code sequence waveform is an important problem. Accordingly, the present invention is designed such that, as shown by the solid lines of FIG. 11, only when spread code values are different between adjacent chip intervals, slow change is made to occur in a transient interval. Here, as shown in FIG. 11, the transient interval means an interval provided in the neighborhood of each end of chip interval to extend over adjacent chip intervals. For the sake of convenience, the transient interval between the chip intervals 0 and 1 is called the transient interval 1, the transient interval between the chip intervals 1 and 2 is called the transient interval 2, and so on. Further, it is assumed that all the transient intervals have the same time length R.

Figure 12:
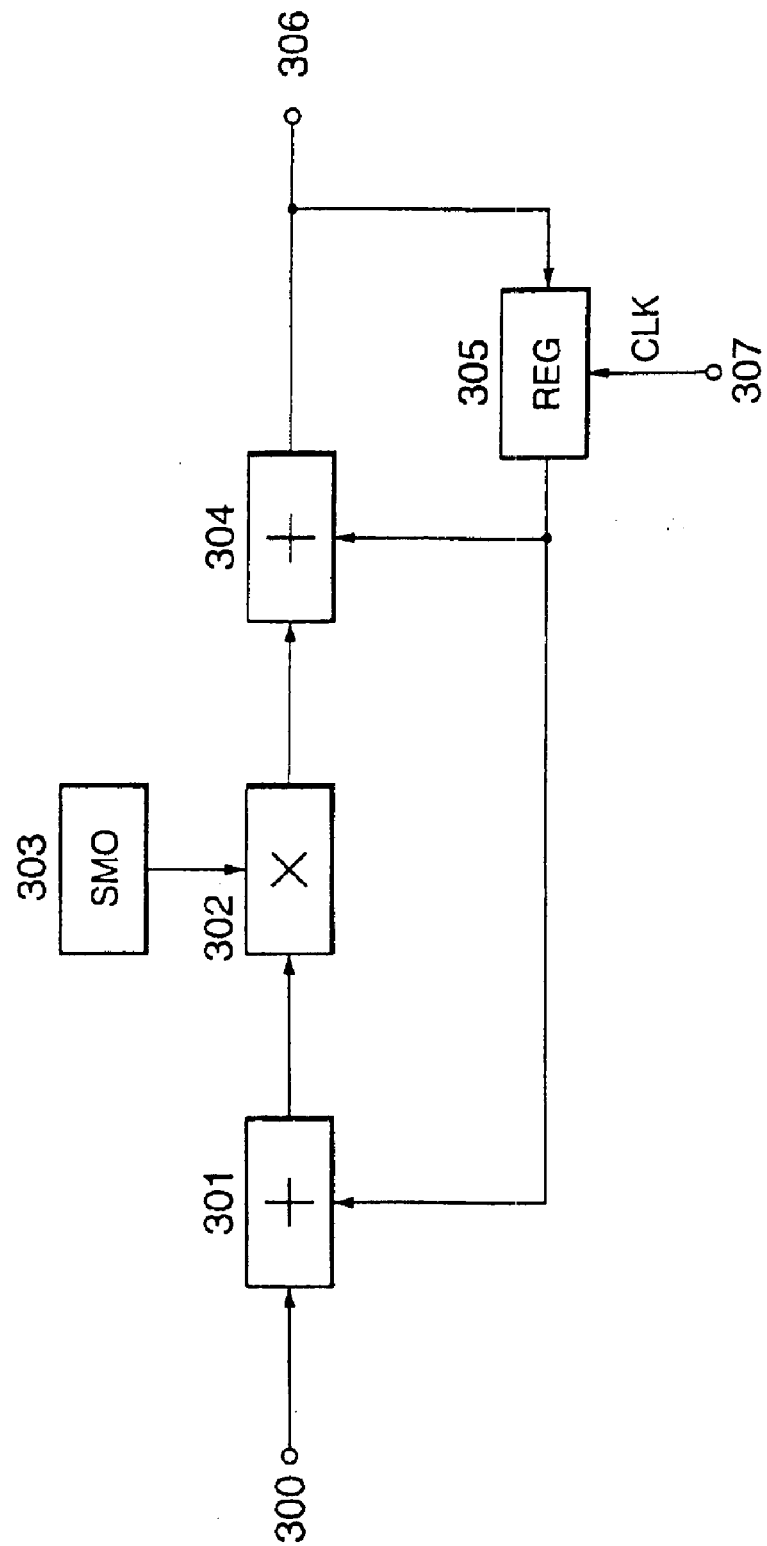
FIG. 12 is a diagram showing an example of a detailed configuration of a spread code sequence waveform continuating circuit (CODE-CS)

FIG. 12 is a block diagram showing an example of a configuration of a circuit that realizes chip waveform continuating. This spread code waveform continuating circuit (CODE-CS) is inserted, for example, between each pair of the spread code generating circuits (CG) 130–13m and the spreading circuits (SS) 120–12n of FIG. 1.

In FIG. 12, a spread code sequence from the corresponding spread code generating circuit (CG) 13i is inputted to the input terminal 300, and as itself inputted to the adder 301. At a leading edge of the clock signal applied to the clock terminal (CLK) 307, the output from the output terminal 306 of the spread code sequence waveform continuating circuit (CODE-CS) is taken in to the latch register (REG) 305 to be held therein. The adder 301 outputs a difference between the value of the spread code inputted to the input terminal 300 and the value held in the latch register (REG) 305. The multiplier 302 outputs the product of the output of the adder 301 and a value outputted from the smoother (SMO) 303. Next, the output of the adder 302 is added to the output of the latch register 305 in the adder 304, and the obtained sum is outputted to the output terminal 306 of the spread code sequence waveform continuating circuit (CODE-CS).

Figure 13:
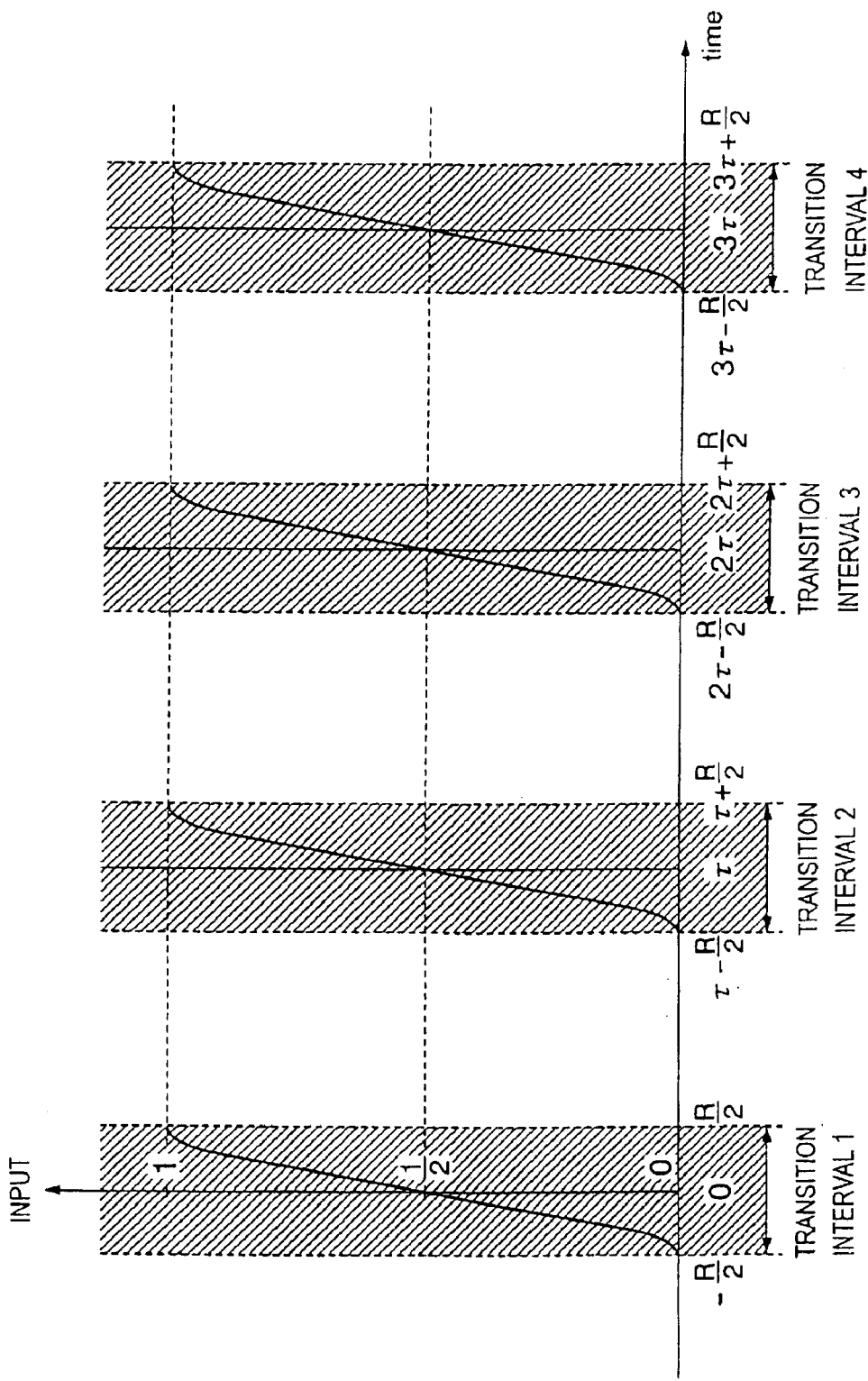
FIG. 13 is graph showing an example of an output characteristic of a smoother (SMO)

FIG. 13 is a graph showing a time response of the output of the smoother (SMO) 303, and the time response, smoother(t) continuously changes from 0 to 1 in each transient interval, as shown by the following equation.

$$\text{smoother}(t) = \frac{1}{2}\left\{1 + \sin\left(\pi\frac{t-k\tau}{R}\right)\right\}, \ |t-k\tau| \le R \tag{43}$$

As shown in the equation 43, the output of the smoother gives values cyclic in the chip interval T, and thus, the smoother can be realized by cyclicly reading a ROM or the like storing the values for one chip interval.

Returning to FIGS. 11 and 12, the operation of the spread code waveform continuating circuit (CODE-CS) will be described in due order. The operation is cyclic in the chip interval, description is given with respect to the period from the time $t=R/2$ to the time $t=2\tau+R/2$. The operations in the other chip intervals are similar and can be easily understood, and their description is omitted. It is assumed that, at the trailing edge of the transient interval $t=R/2$, the clock is applied to the clock terminal (CLK) 307, and the spread code value in the next chip interval is decided. As shown in FIG. 11, the output of the output terminal 306 is 1 at the time $t=R/2$, and thus, the latch register (REG) 305 takes in 1 to hold therein. In addition, the spread code value 1 of the chip interval 2 is applied to the input terminal 300. Since the output of the latch register (REG) 305 and the input of the input terminal 300 are same, the output of the adder 301 becomes 0. Accordingly, regardless of the output value of the smoother (SMO) 303, the output of the multiplier 302 is 0 all over the transient interval 2, the output of the adder 304 does not change from 1, and the value 1 is continuously outputted to the output terminal 305. As shown in FIG. 11, the spread code sequence waveform retains the value 1. Further, at the trailing edge t=τ+R/2 of the transient interval 2, the latch register (REG) 305 takes in the output value 1 to hold therein, and the spread code value −1 of the next chip interval is applied to the input terminal.

Accordingly, although the output of the adder 301 becomes −2, the output of the smoother (SMO) 303 is 0 until the leading edge of the transient interval 3, and the multiplier 302 continuously outputs the value 0. However, since the sum of the multiplier 304 and the latch register (REG) 305 is outputted to the output terminal 306, the value 1 held in the latch register 305 is continuously outputted until the leading edge of the transient interval 3. In the transient interval 3, at the leading edge, the output of the smoother 303 rises from the value 0, and continuously increases to the value 1 at the last edge. Accordingly, the output of the multiplier 302 changes in the range from 0 to −2. By this, the sum of the output of the multiplier 304 and the value held in the latch register 305 appears at the output terminal, changing in the range 1–(−1). Accordingly, the spread code value in the transient interval 3 is shaped into a smoothly changing waveform as shown in FIG. 11. Further, at the last edge of the transient interval 3, the value −1 of the output terminal is taken in by the latch register 305, and the operation moves to the next stage, in which the operation similar to the above is carried out.

Figure 29:
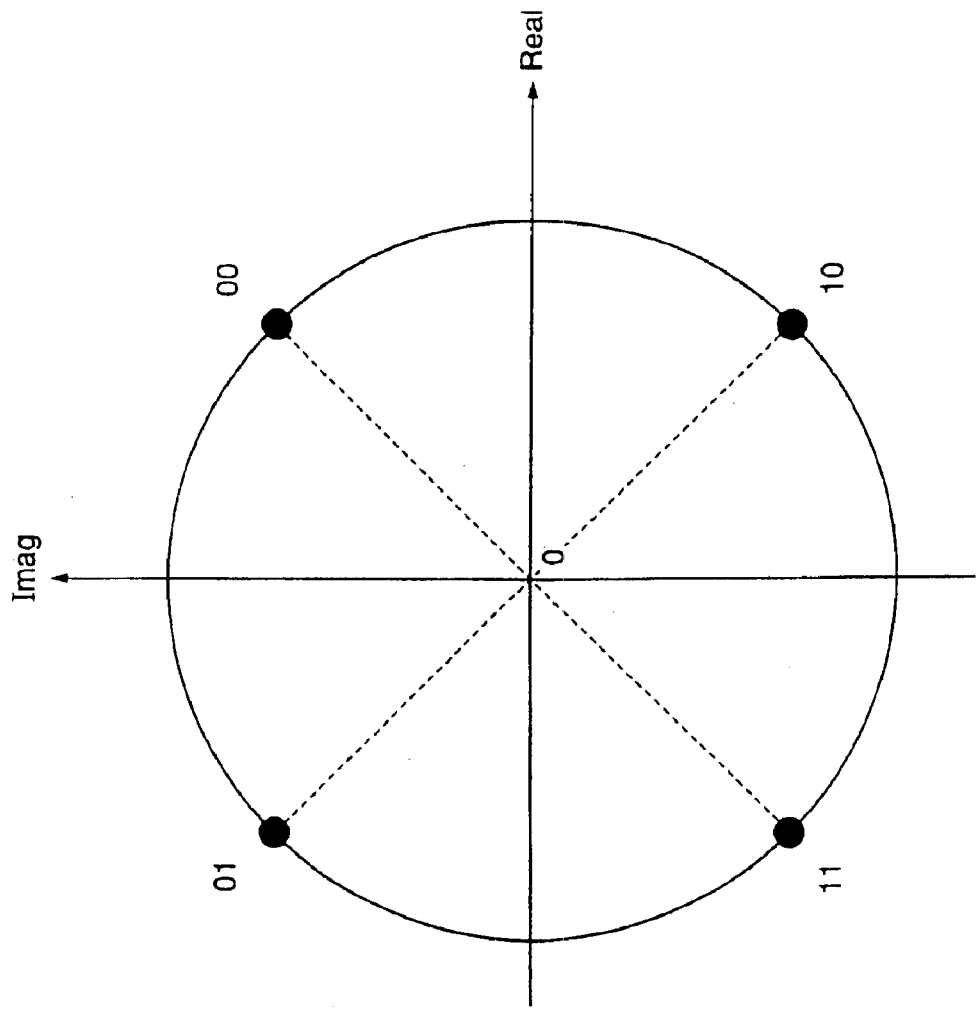
FIG. 29 shows an example of bit arrangement (bit constellation) for the π/4-shifted QPSK.
Figure 30:
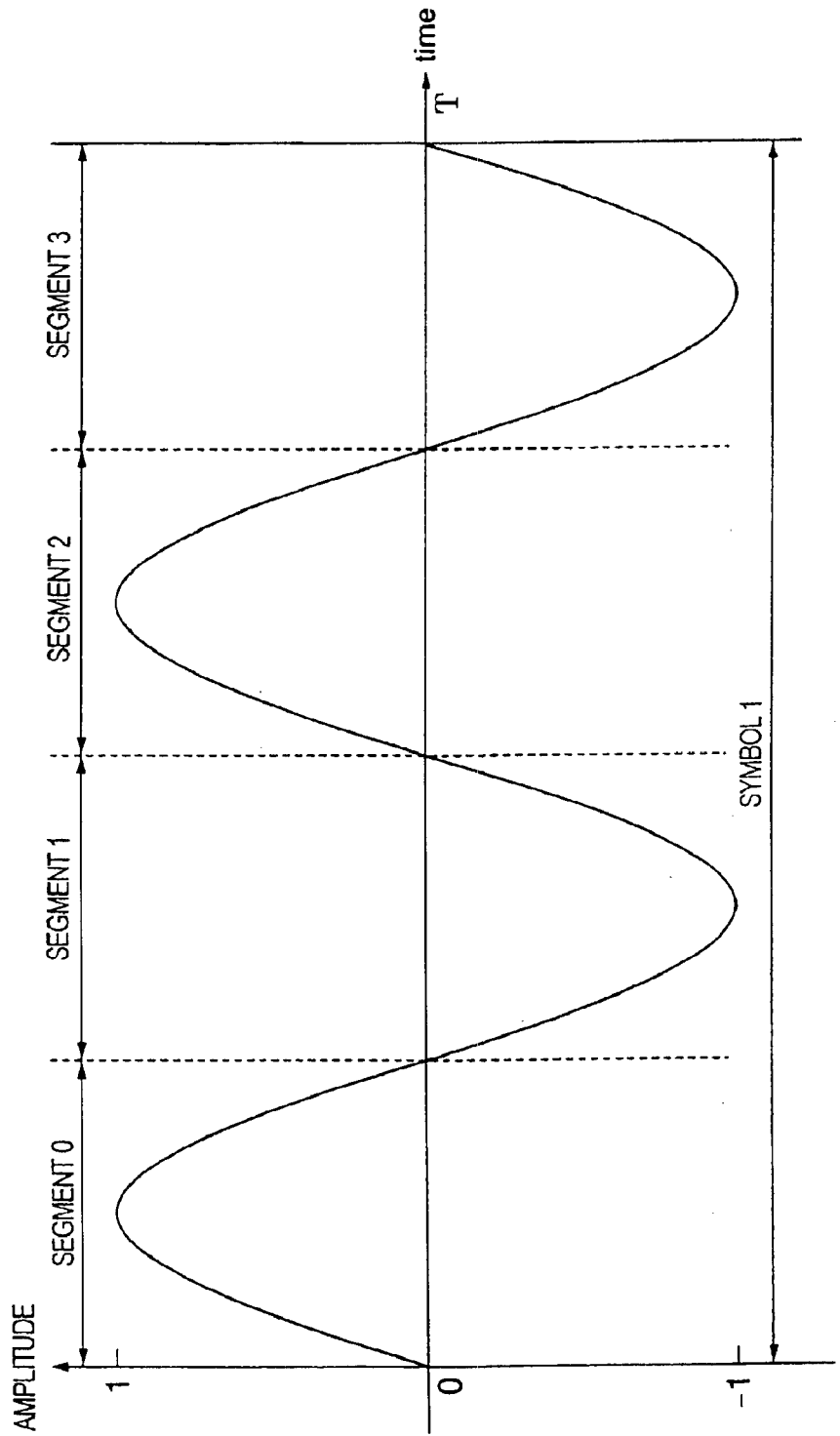
FIG. 30 shows an example of segment configuration in a symbol interval of a primary modulated wave.
Figure 31:
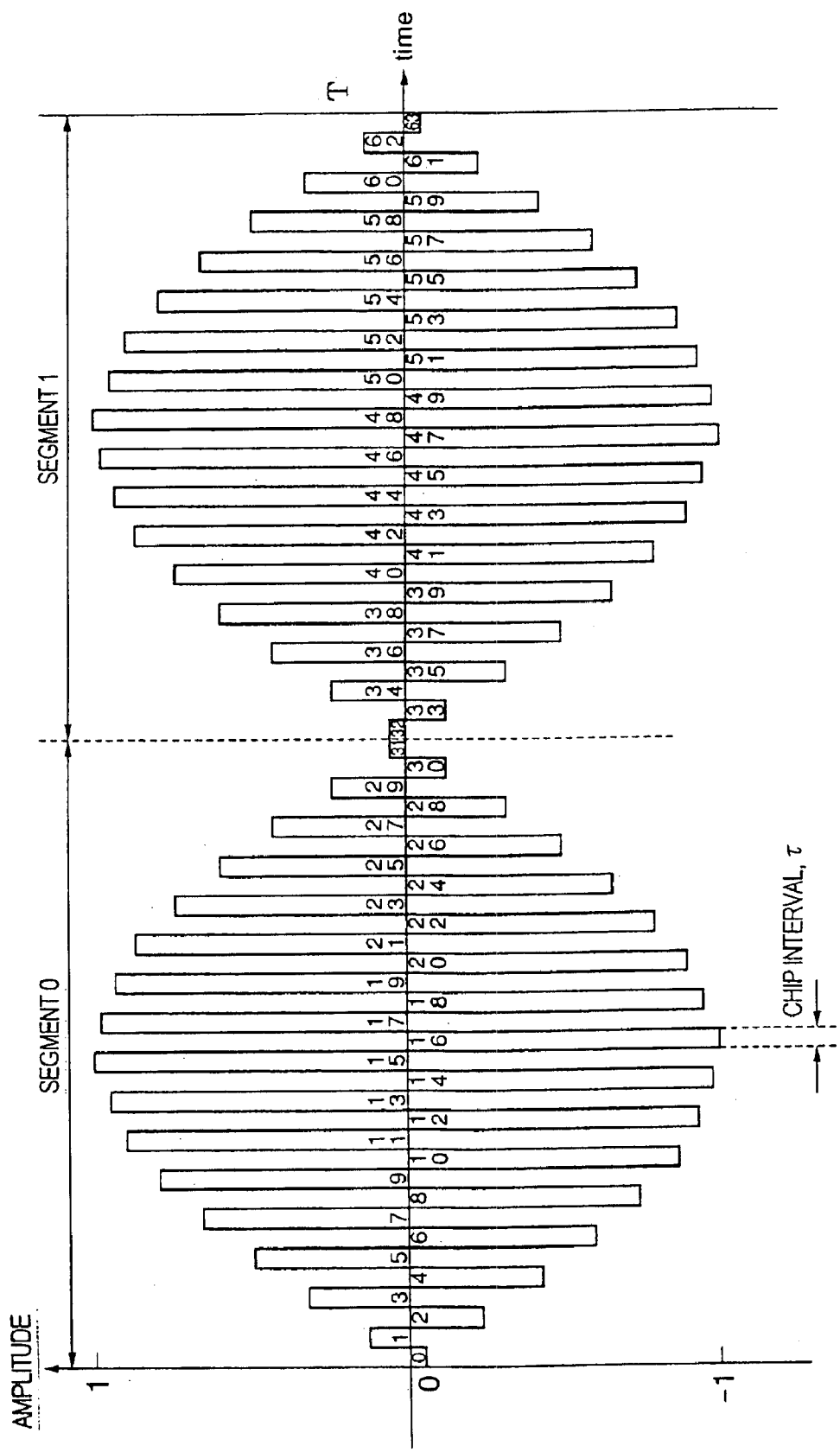
FIG. 31 shows an example of chip configuration in segment intervals.

As described above, by using the spread code sequence waveform continuating circuit (CODE-CS), the chip waveform of the spread signal is made continuous. By inserting this spread code sequence waveform continuating circuit (CODE-CS) between each pair of the spread code generating circuits (CG) 130–13n and the spreading circuits (SS) 120–12n of FIG. 1, is realized the differential CDMA transmission system to which the chip waveform continuating technique of the present invention is applied. Or, in FIG. 29 showing the conventional CDMA transmission system, by inserting the spread code waveform continuating circuit (CODE-CS) between each pair of the spread code generating circuits 130–13n and the spreading circuits 120–12n, can be realized the CDMA transmission system to which the chip waveform continuating technique of the present invention is applied.

[Virtual Segment Interleaving CDMA Transmission System]

In the above, has been described the case in which, in each segment within a symbol, a spread code given by the i-th row of a Walsh function corresponds to a code consisting of successive 32 codes starting from 0th column of the Walsh function.

This Walsh function having the code length of 32 is written as $W_{32}$. The Walsh function $W_{32}$ has the structure given by the equation 1, 32 code sequences each having the code length of 32 is given by sixteen $\{W_{16}, W_{16}\}$ and sixteen $\{W_{16}, \overline{W}_{16}\}$, and there 32 code sequences are orthogonal to one another. Accordingly, 32 spread code sequences generated by the function $\tilde{W}_{32}$, which is obtained by offsetting 16 columns of $W_{32}$, is given by sixteen $\{W_{16}, W_{16}\}$ and sixteen $\{\overline{W}_{16}, W_{16}\}$, and the newly generated 32 code sequences are orthogonal to each other. Here, the function $\tilde{W}_{32}$ is given by the following equation.

$$W_{2n} = \begin{vmatrix} W_N & W_N \\ \overline{W}_N & W_N \end{vmatrix} \quad (44)$$

Further, the validity of the orthogonality is not limited to the case that the offset quantity is 16, and it is easily known that the equation 44 is valid even when N is changed from N=16 to 8, 4, 2, 1 successively. Of course, the equation is valid also in the case of increasing N, as N=32, 64, and so on.

This property that orthogonality of the code sequences is always satisfied even when those sequences are offset by any number depends on the essential property of the Walsh function shown in the equation 1. Utilizing such orthogonality of the Walsh function, it is possible to set a segment that corresponds to a spread code subjected to offset by any quantity. When these offset segments and non-offset segments are intermixed, and it is necessary in particular to distinguish those segments, then it is assumed that a "basic segment" means a segment corresponding to a spread code starting from the 0th column, and a "virtual segment" means, for example, a segment corresponding to a spread code starting from the 16th column, obtained by offsetting only the 16th column.

Figure 14:
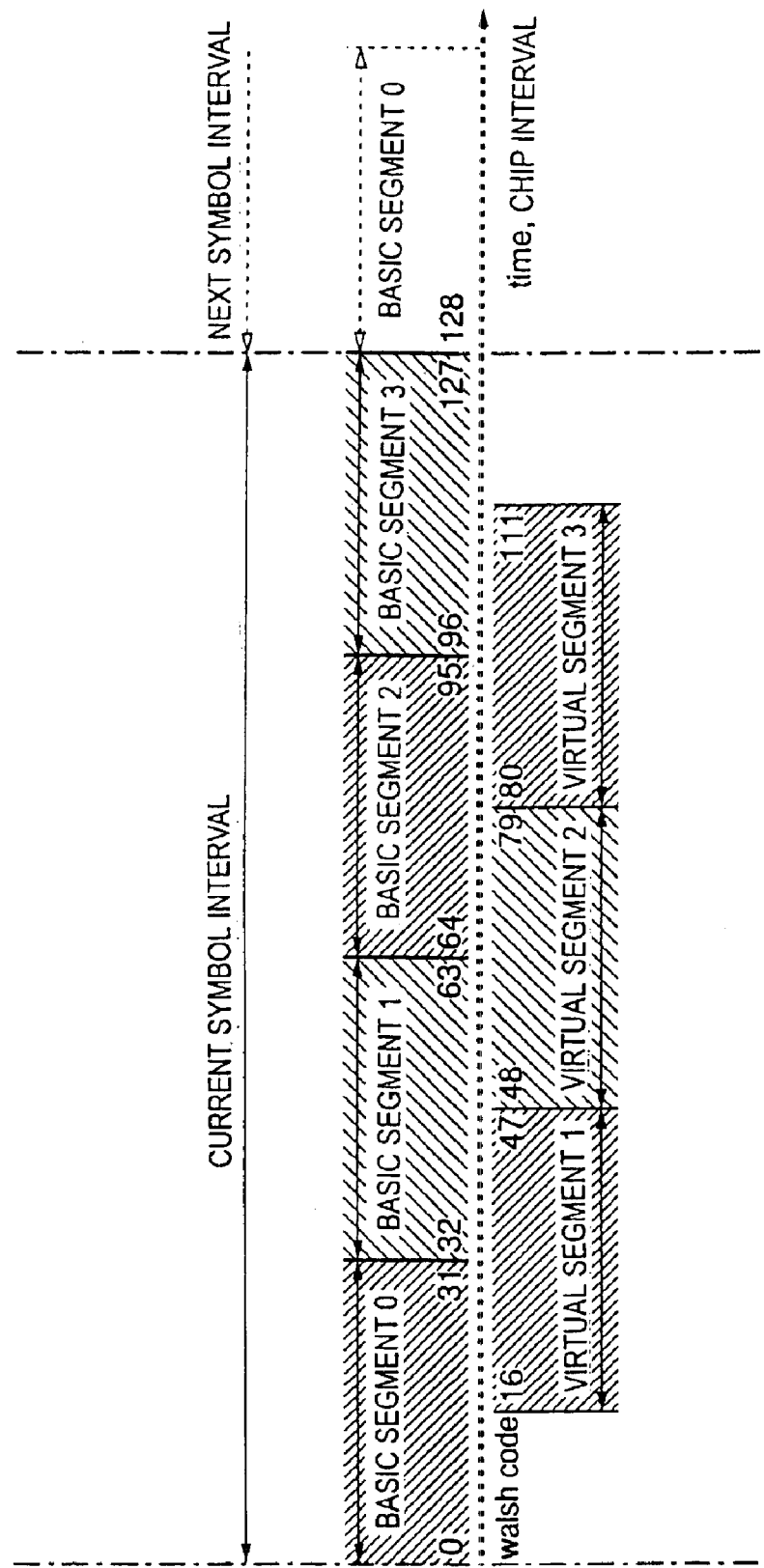
FIG. 14 is a view showing an example of an interleaved state of basic segments and virtual segments.

In the case that optional offset is 16, the relation between the basic segments and the virtual segments is shown in FIG. 14. In the figure, the horizontal axis indicates chip intervals, and the figure shows the case in which 128 chip intervals, from 0th to 127th, exist in the current symbol interval. Since the spread code sequence length is set to 32, 0th–31st chip intervals constitute 0th basic segment corresponding to 0th–31st spread code sequences. Successive 32nd–63rd chip intervals, 64th–95th chip intervals, and 96th–127th chip intervals constitute 1st, 2nd, 3rd basic segments, respectively.

On the other hand, 16th–47th chip intervals constitute 1st virtual segment corresponding to a spread code sequence of 16th–(31st)–15th columns having offset 16. Successive 48th–79th chip intervals constitute 2nd virtual segment corresponding to a spread code sequence of 16th–(31st)–15th columns having offset 16. And, successive 87th–111th chip intervals constitute 3rd virtual segment corresponding to a spread code sequence of 16th–(31st)–15th columns having offset 16.

A features of the present invention lies in that despread signal is obtained in both the basic segment and virtual segment. Namely, in the conventional system, the products of the despread code sequence and the demodulated signal are summed only in the basic segments, and those obtained sums are given as the despread signals corresponding to the basic segment periods. On the other hand, the feature of the present invention lies in the improvement that, in addition to the conventional operation of summing the products of the despread code and the demodulated signal in the basic segments, simple operation of summing also in the virtual segments is carried out, to obtain the despread signals corresponding to the basic segment periods and virtual segment periods.

When the offset between the basic segment and the virtual segment is 16, duplicate interleave structure is realized as shown in FIG. 14. When the offset is made smaller than 16 to promote interleave hierarchy, correlation between noises entering the basic segment period and the virtual segment period is increased to saturate the effect of improving noise suppression ability as one feature of the CDMA transmission system, and the improvement effect becomes smaller in comparison with load volume of circuit. Thus, it is not favorable to make the offset excessively smaller to promote interleave.

When the offset is set to about half of the spread code length in the Walsh function, for example, offset is set to 16 for the code length of 32, then, as described above, interleave becomes the duplicate structure, and improvement of noise suppression ability is effective. In that case, it is possible to obtain communication quality comparable to the CDMA transmission system in which twice the number of basic segments are used for conducting communication.

Namely, communication quality of nearly same level as the case of 8.192 cps with 8 basic segments within a symbol is obtained by 4.096 cps with half the number of basic segments, i.e. 4 basic segments. In this case, as shown in the figure, four basic segments and three virtual segments are used for conducting communication. Despread signals corresponding to basic segments are regenerated at intervals of the chip period of the spread code sequence length 32, and despread signals corresponding to the virtual segments of the duplicate interleave structure are obtained at intermediate times of the basic segments. This corresponds to communication at 8.192 cps, i.e., twice the chip rate in the case of using only the basic segments. The despread signal corresponding to 0th virtual segment offset by 16 chip periods from the 0th basic segment is the despread signal that coincides with the end of the symbol period. Essentially, the end of the symbol period is a time at which information phase of the primary modulated wave fluctuates drastically, thus giving an unstable value. Thus, it is not necessary to employ such despread signal corresponding to the 0th virtual segment. Accordingly, as shown in the figure, seven segments correspond to effective despread signals.

Figure 15:
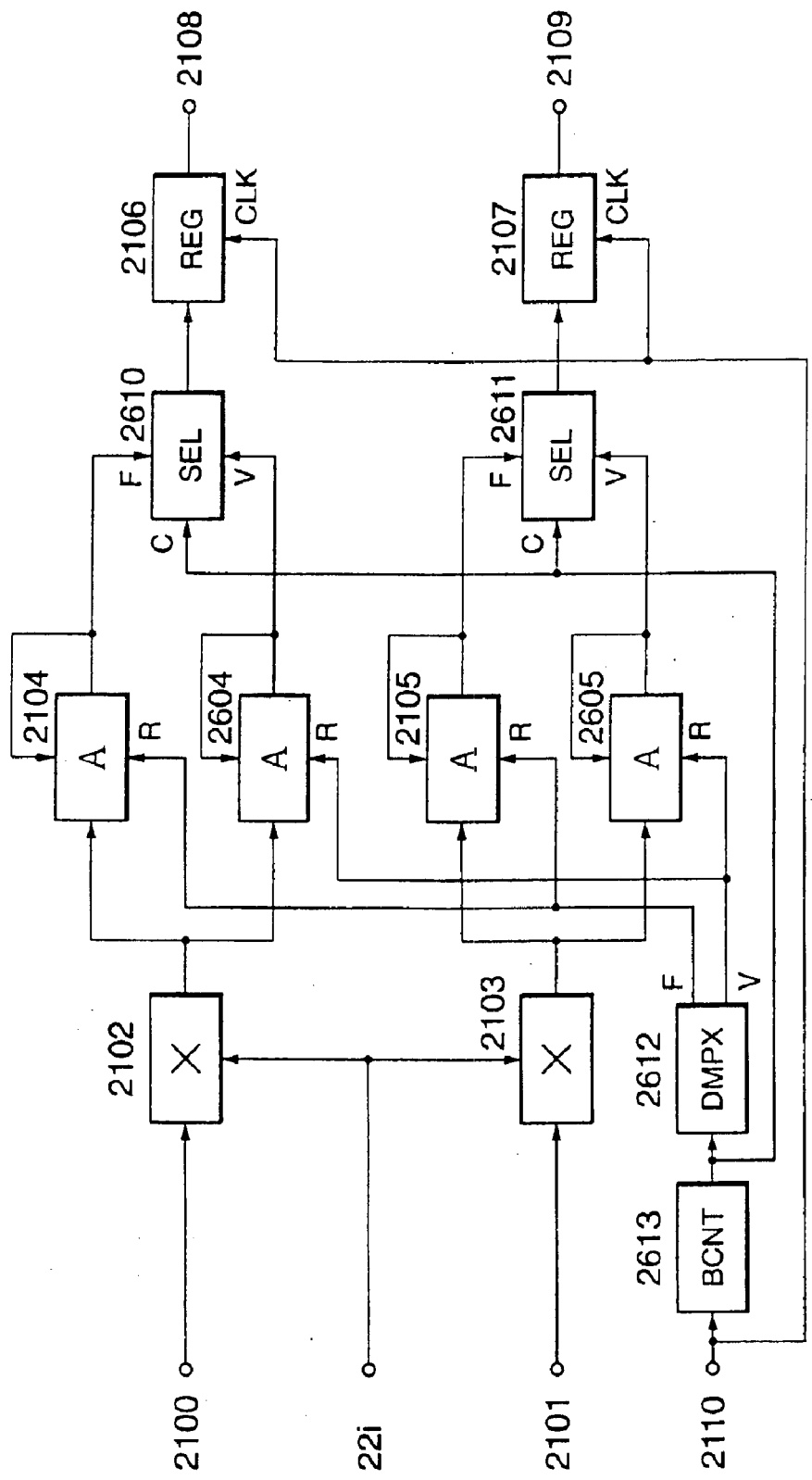
FIG. 15 is a diagram showing an example of a detailed configuration of a virtual segment interleave despreading circuit (deSS-VSI)
Figure 34:
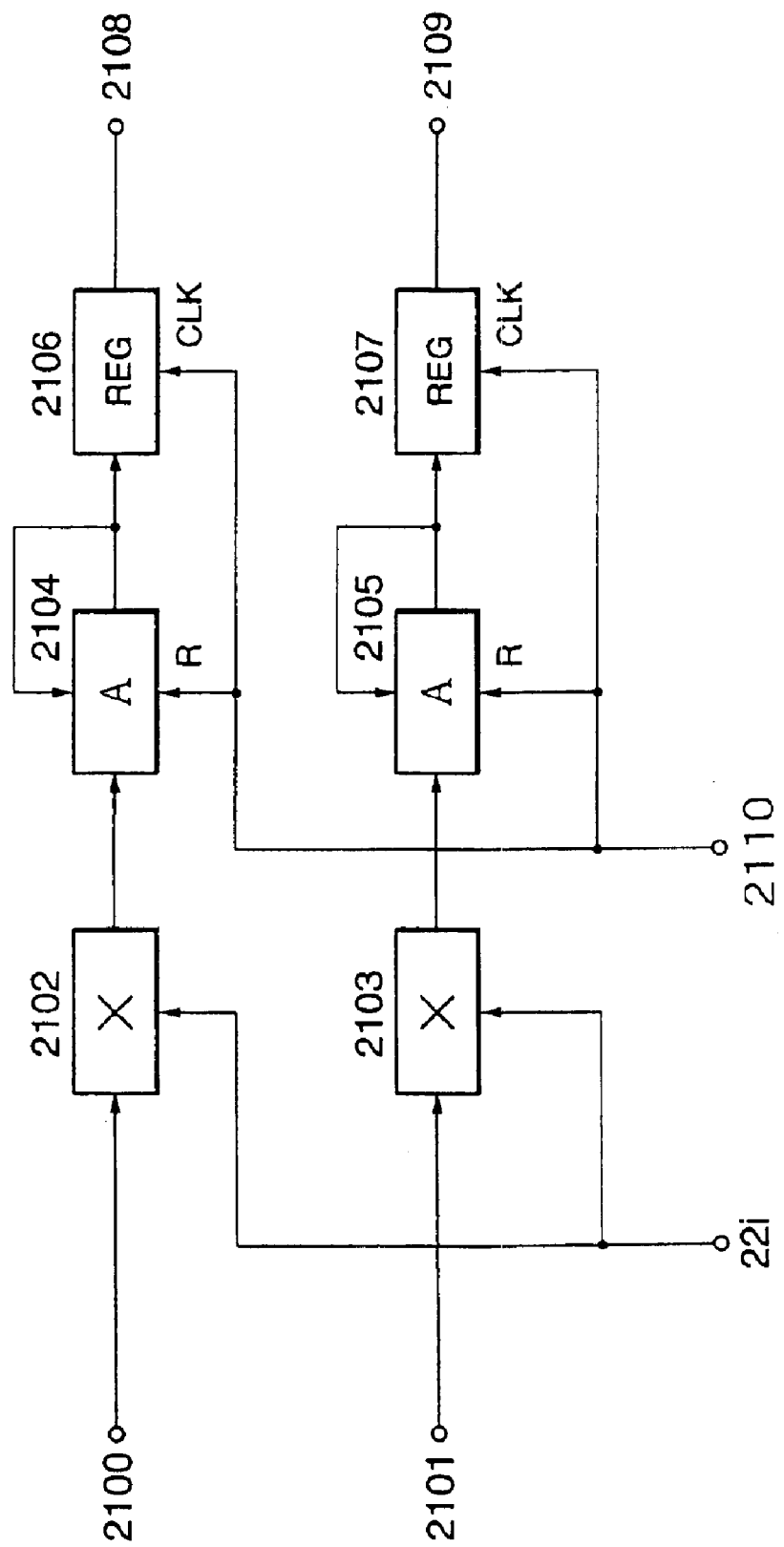
FIG. 34 is a diagram showing an example of a configuration of a despreading circuit (deSS) in the CDMA receiver shown in FIG. 32.

FIG. 15 is a diagram showing an example of a detailed configuration of a virtual segment interleave despreading circuit (deSS-VSI) according to the present invention. In the figure, the input terminals 2100–2101, spread code sequence input terminal 22$i$, multipliers 2102–2103, accumulators 2104–2105, latch registers (REG) 2106–2107, and output terminals 2108–2109 have respectively the same functions as the components added with corresponding reference numerals in the detailed configuration of the conventional despreading circuit (deSS) shown in FIG. 34, and their detailed description will be omitted. Further, the accumulators 2604–2605 have the same function as the accumulators 2104–2105, and their detailed description will be omitted. The selector (SEL) 2610 has the two input terminals F and V, control terminal C, and one input terminal. When a value of binary control signal applied to the control terminal C is 0, the selector selects the value of the input terminal F, and when the value of the binary control signal applied to the control terminal C is 1, the selector selects the value of the input terminal V. The selected value is outputted to the output terminal 2108. Further, the selector (SEL) 2611 has the two input terminals F and V, control terminal C, and one output terminal. When a value of a binary control signal applied to the control terminal C is 0, the selector selects the value of the input terminal F, and when the value of the binary control signal applied to the control terminal C is 1, the selector selects the value of the input terminal V. The selected value is outputted to the output terminal 2109. The demultiplexing circuit (DMPX) 2612 has one input terminal, the two output terminals F and V, and control terminal C. An input signal applied to the input terminal 2110 is outputted exclusively to the output terminal F when a binary control signal applied to the control terminal C is 0, or exclusively to the output terminal V when the binary control signal applied to the control terminal C is 1. The binary counter (BCNT) 2613 is initialized such that its output becomes 0 at each point of leading edge of the first chip interval of a basic segment, such as the chip intervals 0, 128, and so on. Thereafter, the binary counter 2613 counts the number of times of applying a signal to the input terminal 2110, and outputs a value 0 or 1 of the binary least significant digit of the result of counting.

Here, the accumulators 2604–2605, selectors (SEL) 2610–2611, demultiplexing circuit (DMPX) 2612, and binary counter (BCNT) 2613 are a series of components added for obtaining a despread signal corresponding to a virtual segment in the duplicate interleave despreading.

Next, the operation of the virtual segment interleave despreading circuit (deSS-VSI) will be described in due order. Corresponding to each chip, the multiplier 2102 outputs the product of an in-phase component of the demodulated signal applied to the input terminal 2100 and a despread code sequence applied to the input terminal 22$i$. The output of the multiplier 2102 is successively inputted to the accumulators 2104 and 2604, and accumulated there at the time of trailing edge of a chip. Similarly, corresponding to each chip, the multiplier 2103 outputs the product of a quadrature component of the demodulated signal applied to the input terminal 2101 and the despread code sequence applied to the input terminal 22$i$. The output of the multiplier 2103 is successively inputted to the accumulators 2105 and 2605, and accumulated there at the time of trailing edge of a chip. Here, all the accumulated values are reset to zero at a trailing edge of a reset signal applied to each reset terminal R. In each accumulator to which the reset signal is applied at intermediate times of the first chip intervals of the segments, such as chips 0, 16, 32 and so on, the accumulator is reset at a trailing edge of the reset signal to have the accumulated value 0. However, just at the trailing edge of the same chip, an input value and the accumulated value 0 of that accumulator are added and the result of addition is held by the accumulator. Such operation is repeated by the multipliers 2102–2103, accumulators 2104–2105 and 2604–2605, for each chip.

On the other hand, for every 16th chip such as the chips 0, 16, 32, 48 and so on, the reset signal is applied to the terminal 2110 at an intermediate time of the first chip interval of each segment. The binary counter (BCNT), demultiplexing circuit (DMPX), selectors (SEL) 2610–2611, and latch registers (REG) 2106–2107 carry out cyclic operation with respect to a reset signal, as described in the following.

At the leading edge of the first chip in a symbol interval, such as the chips 0, 128, and so on, the binary counter (BCNT) is initialized and its output becomes 0. The binary counter (BCNT) outputs the value 1 at the time when an odd number of reset signals are inputted, and the value 0 at the time when an even number of reset signals are inputted, repeatedly. By this, the binary counter (BCNT) provides alternate outputs with respect to reset signals, outputting the value 0 always at the leading edge of the first chip interval of a basic segment, such as the chips 0, 32, 64, 96, and so on, and outputting the value 1 always at the leading edge of the first chip interval of a virtual segment, such as the chips 16, 48, 80, 112, and so on.

Accordingly, when a reset signal is applied in the chip interval 0, the latch registers (REG) 2106 and 2107 take in and hold the accumulated value of the product of the demodulated signal and the despread code sequence in successive 32 chip intervals before the application of the reset signal, i.e. the chip intervals −32, −31, . . . , −1, from the respective accumulators 2104 and 2105. Those held values are the in-phase and quadrature components of the despread signal in the basic segment 0. At the same time, the reset signal is led through the binary counter (BCNT) and demultiplexing circuit (DMPX) to the terminals R of the accumulators 2104 and 2105. Awaiting a trailing edge of the reset signal, the accumulators 2104 and 2105 are reset, and, at the same time, the binary counter (BCNT) is increment. As a result of the stepping of the binary counter (BCNT), the output value turns to 1, and the distributing circuit (DMPX) and selectors (SEL) are each connected to the side of V, finishing preparation for obtaining the despread signal for the virtual segment by the reset signal in the chip interval 16. Further, at the trailing edge of the chip 0, each of the accumulators 2104 and 2105 is initialized while retaining the input value itself as the accumulated value, finishing a series of operation in the chip interval 0.

At each tailing edge of the successive chip intervals 1, 2, . . . , 15, four accumulators 2104–2605 accumulate respective inputs.

When a reset signal is applied in the following chip interval 16, at the leading edge of the reset signal, the latch registers (REG) 2106 and 2107 take in and hold the accumulated value of the product of the demodulated signal and the despread code sequence in the successive 32 chip intervals before the application of the reset signal, i.e., the chip intervals –116, –15, . . . , 15, from the respective accumulators 2604 and 2605. These held values are the in phase and quadrature components of the despread signal in the virtual segment 0. However, in particular, the despread signal corresponding to the virtual segment 0 in the chip interval 16 extends over the symbol end, and, as described above, is not employed for judging the received information. At the same time, the reset signal is led through the binary counter (BCNT) and demultiplexing circuit (DMPX) to the terminals R of the accumulators 2604 and 2605. Awaiting a trailing edge of the reset signal, the accumulators 2604 and 2605 are reset, and, at the same time, the binary counter (BCNT) is stepped. As a result of the stepping of the binary counter (BCNT), the output value returns to 0, and the demultiplexing circuit (DMPX) and selectors (SEL) are each connected to the same side F as the initial state, finishing preparation for obtaining the despread signal for the virtual segment by the reset signal in the next chip interval 32. Further, at the trailing edge of the chip 16, each of the accumulators 2604 and 2605 is initialized while retaining the input value itself as the accumulated value, finishing a series of operation in the chip interval 16.

Further, at each trailing edge of the successive chip intervals 17, 18, . . . , 31, four accumulators 2104–2605 accumulate respective inputs.

In the chip interval 32, operation similar to the chip interval 0 is carried out. Similarly, the virtual segment interleaving despreading circuit cyclically repeats operation for every 32 chip intervals. Thus, operations in the following chip intervals can be easily inferred, and their description will be omitted.

Figure 35:
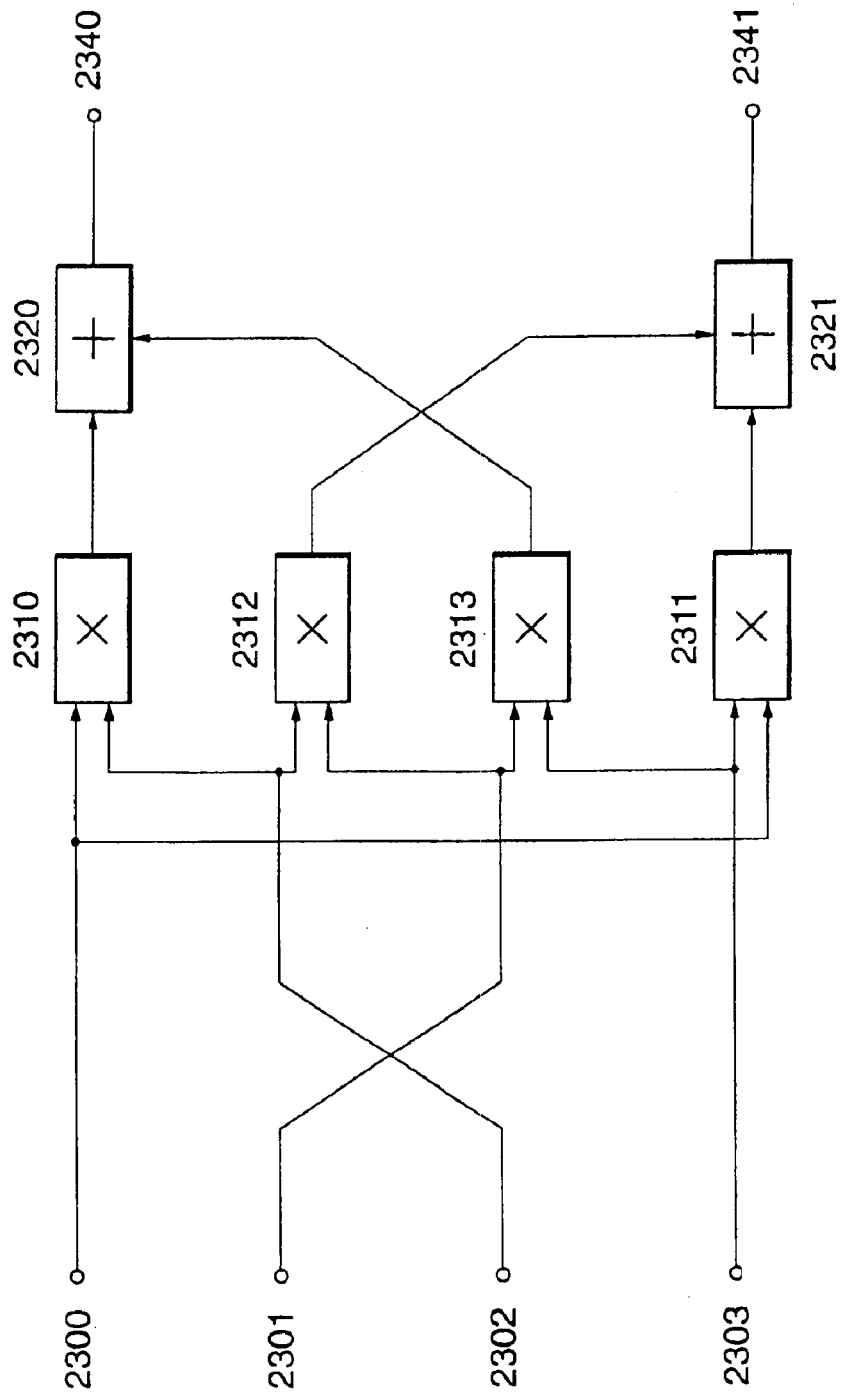
FIG. 35 is a diagram showing an example of a configuration of a phase correction circuit (CMP) in the CDMA receiver shown in FIG. 32.

As described above, by using the virtual segment interleaving despreading circuit (deSS-VSI), it is possible to carry out despread operation by interleaving the segments, without adding any processing on the transmission side of the CDMA transmission system. By substituting this virtual segment interleaving despreading circuit (deSS-VSI) for each of the despreading circuits (deSS) 210–21n in FIG. 4, it is possible to realize the virtual segment interleaving despread CDMA transmission system to which the virtual segment interleave despreading technique of the present invention is applied. Or, in the FIG. 35 showing the conventional CDMA transmission system, by substituting the virtual segment interleaving despreading circuit (deSS-VSI) for each of the despreading circuits (deSS) 210–21n, it is possible to realize the virtual segment interleaving despreading CDMA transmission system to which the virtual segment interleaving despreading technique of the present invention is applied.

As described above referring to the embodiments, the present invention can provide a large-capacity CDMA transmission system that can conduct communication with a high speed moving unit such as an automobile, transmitting more than same quantity of information as the conventional system using the same frequency band width without deteriorating communication quality and without increasing occupied frequency band width in the CDMA transmission system.

Figure 16:
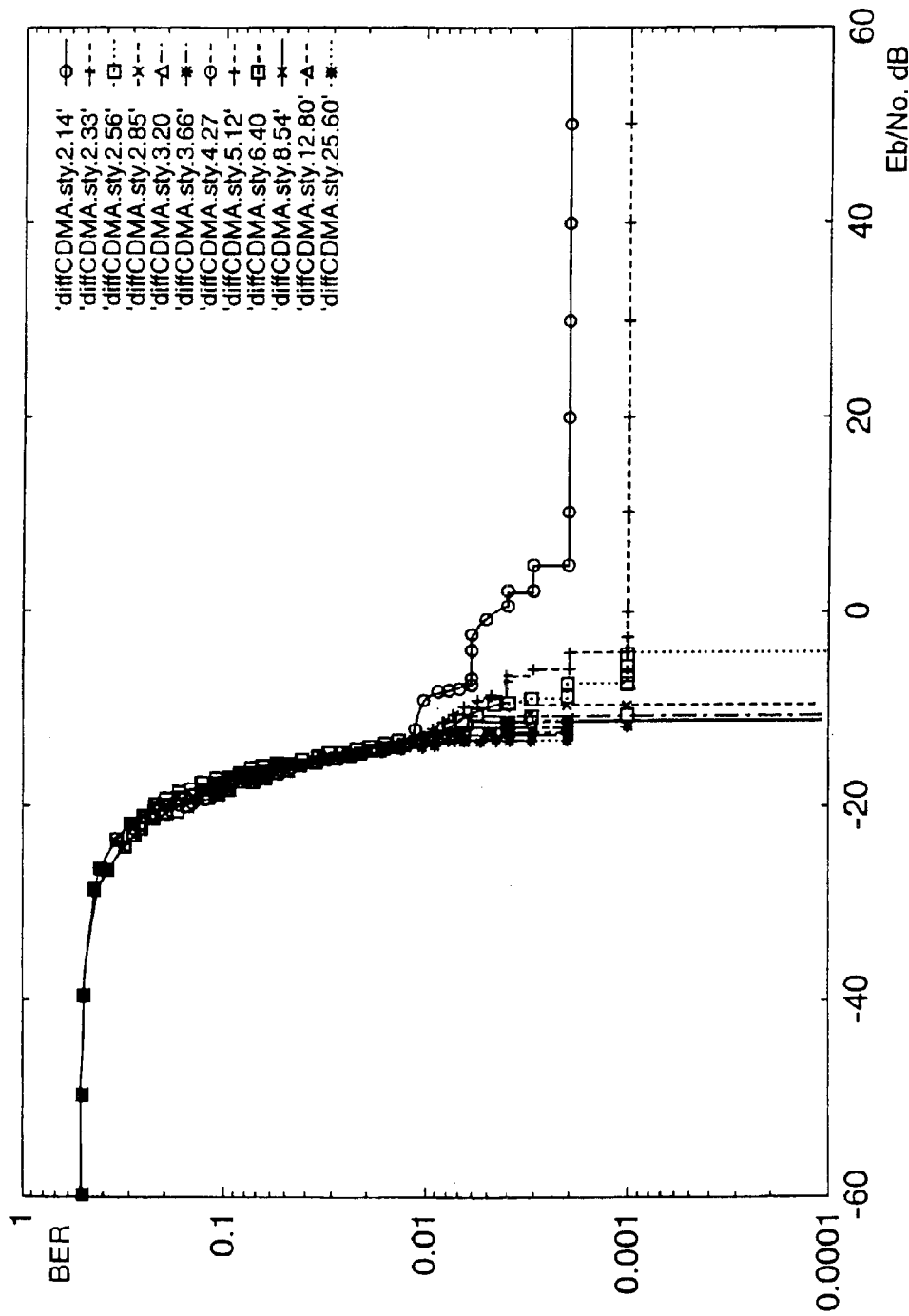
FIG. 16 is a graph showing examples of effect in the stationary telephone mode of the differential CDMA transmission system according to the present invention.
Figure 17:
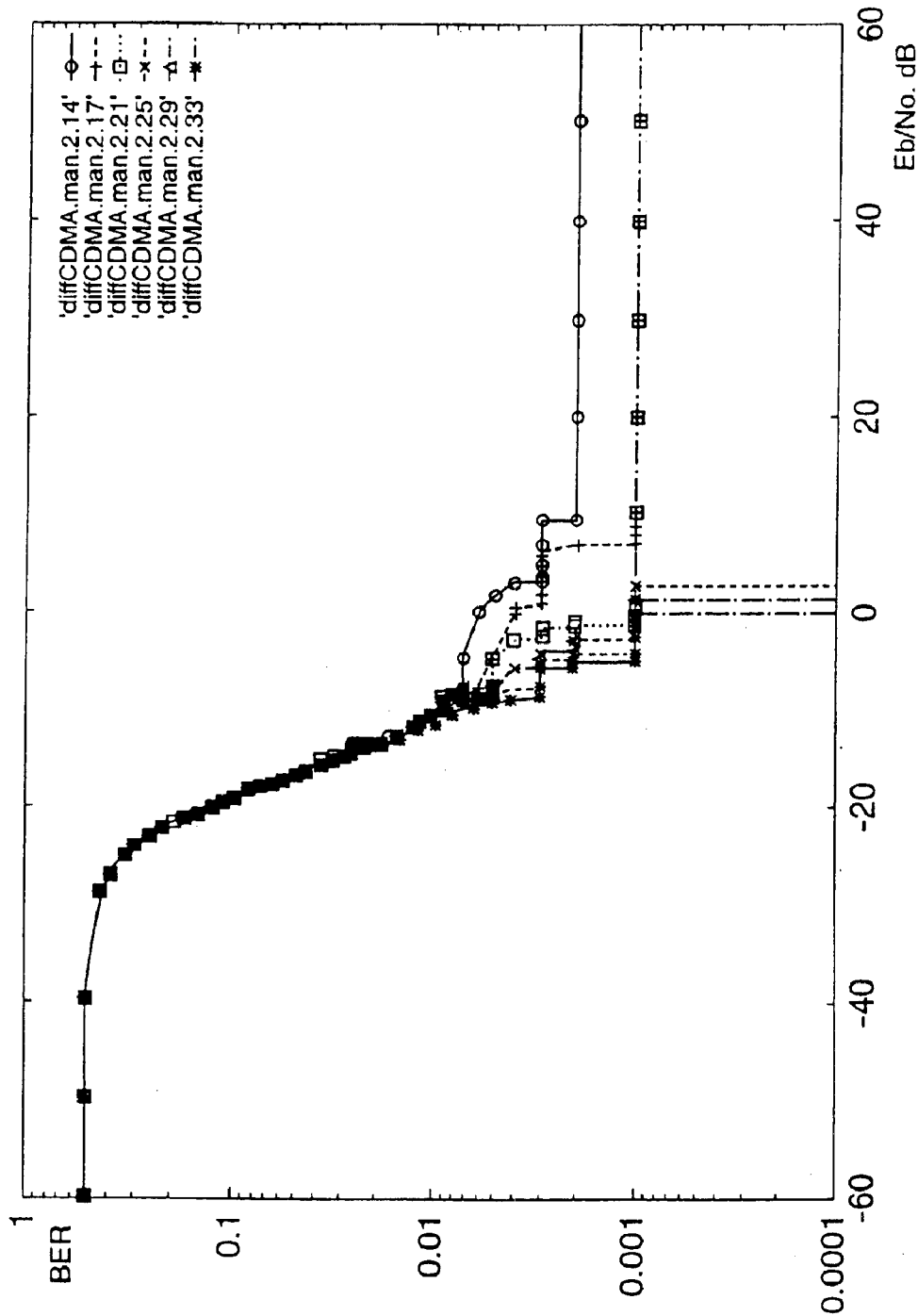
FIG. 17 is a graph showing examples of effect in the pedestrian telephone mode of the differential CDMA transmission system according to the present invention.

FIGS. 16–18 shows the simulation results in the cases that communication is conducted using the differential CDMA transmission system of the present invention, in the same three telephone modes as defined in relation to the description of FIGS. 36–38. The vertical axes indicate BER and the horizontal axes Eb/No. As the system condition in the simulations, it is assumed that the transmission frequency domain is 2 GHz, chip rate is 4.098 Mcps, information transmission rate is 2.048 Mbps, symbol rate is 32 ksps, and spread code sequence length is 32.

When the spread code length is 32 in the conventional CDMA transmission system, it is necessary to assign one channel to the pilot channel, and thus, the number of the information channels is 31 at maximum, and the maximum rate of the information transmission rate is 31×64 kbps= 1.984 Mbps. On the other hand, in the differential CDMA transmission system, a pilot channel is not required, and all channels can be assigned as information channels, and the maximum transmission rate is 32×64 kbps=2.048 Mbps, which is a first effect.

In the stationary telephone mode (diffCDMA.sty) of the differential CDMA transmission system, as shown in FIG. 16, the critical transmission band width is 2.56 MHz. Being affected by the large capacity by the transmission rate of 2.048 Mbps, a floor is generated when the band width is limited to 2.33 MHz or less. However, the frequency utilization efficiency in this case requires an extremely high state of 0.88 bit/Hz or more. Such highly efficient sophisticated frequency utilization lies in the area that can not be realized without applying the virtual segment interleave technique disclosed by the present invention. In the case of the currently utilized CDMA transmission system, the most superior data is the frequency utilization efficiency of about 0.5 bit/Hz. Thus, the effectiveness of the present invention is obvious.

Next, in the case that a stationary state of the stationary telephone mode changes to a slowly moving state of 10 km/h of the pedestrian telephone mode (diffCDMA.man), a second effect of the differential CDMA transmission system can be acknowledged as follows. As shown in FIG. 17, in the differential CDMA transmission system, the critical transmission band width is observed to be 2.25 MHz. In comparison with the fact that, in the conventional CDMA transmission system, the critical transmission band width is 3.46 MHz as shown in FIG. 37, the effect of the differential CDMA transmission system is remarkable. In the automobile telephone mode (diffCDMA.car) travelling at further high speed of 100 km/h as shown in FIG. 18, the critical transmission band width can be observed to be 6.74 MHz. As shown in FIG. 41, in the conventional CDMA transmission system, communication can not be conducted even the widest transmission band width. In contrast, in the differential CDMA transmission system, although somewhat strong received electric field of Eb/No≦20 dB is required, high quality communication with BER≦0.001 can be provided, which clearly shows the dominance of the system.

Figure 19:
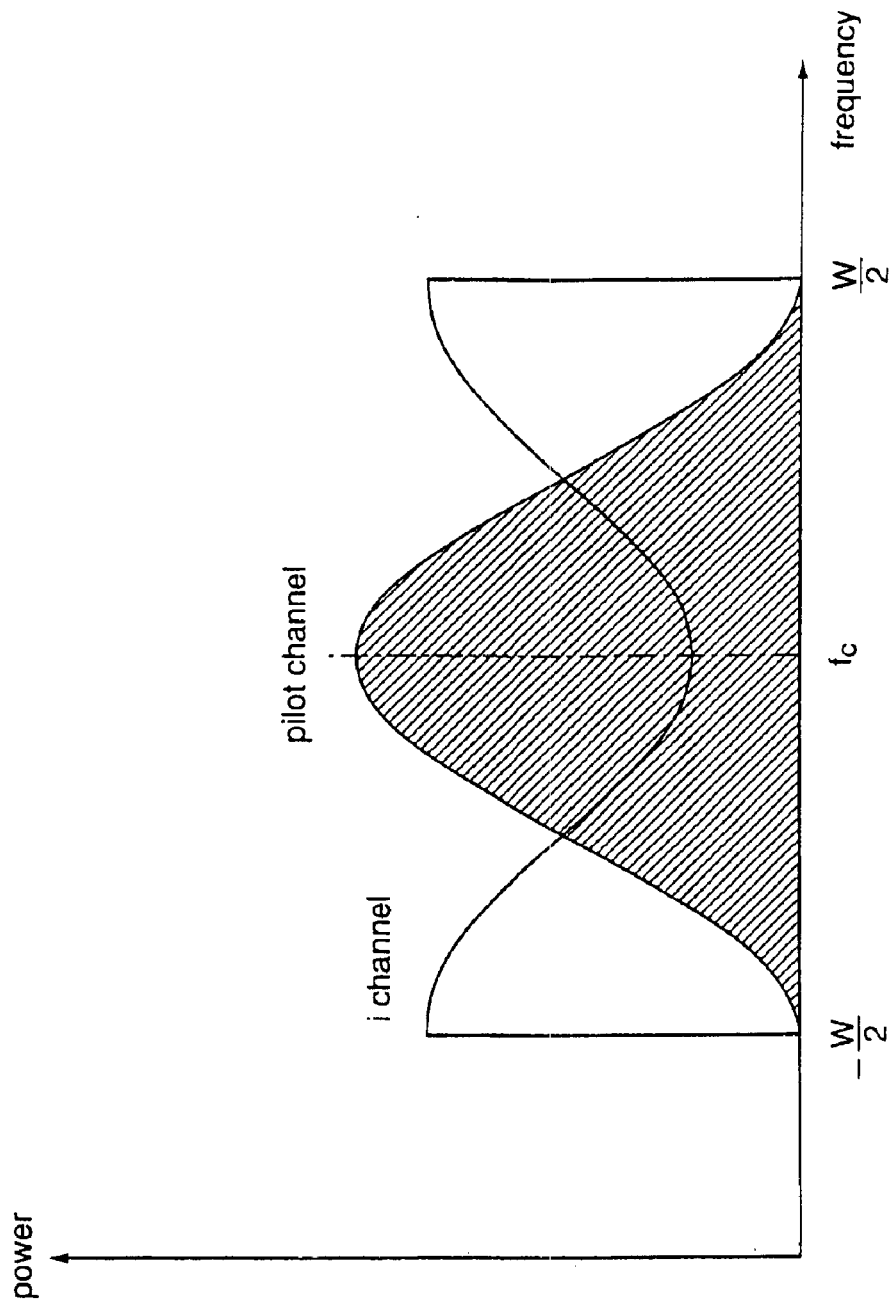
FIG. 19 is a schematic view showing power spectrum distributions of the pilot channel and the information channel.

Thus, the reason that the differential CDMA transmission system has the superior transmission characteristics can be understood from the power spectrum distribution of each channel on the transmission path shown in FIG. 19. In the figure, the vertical axis indicates power, the horizontal axis indicates frequency, $f_c$ indicates carrier frequency, and $f_c \pm W/2$ indicates upper and lower limit frequencies of the transmission band.

Namely, the spectrum of the information i channel, shown by the white area, and the spectrum of the pilot channel, shown by the shaded area, are different from each other in their spread code sequences used. As a result, as shown in the figure, they have different frequency characteristics from each other. When frequency-selective fading such as multi-ray Rayleigh fading arises, each channel suffers from distortion having the frequency characteristics. This is the phenomenon called the frequency-selective fading, and this effect becomes stronger as the moving speed increases.

In the case of the pilot in the conventional CDMA transmission system, effects of fading etc. are removed by subtracting the phase error arising in the pilot channel from the phase error arising in the information channel shown in FIG. 19. In that case, when the distortion having the frequency characteristics is caused, the error in the pilot channel and the error in the information channel are different from each other, and simple operation of obtaining the phase difference can not correctly suppress disturbances such as fading.

On the other hand, in the differential CDMA transmission system disclosed by the present invention, the fading error is removed by countervailing phase errors in adjacent symbol intervals. For transmitting information, only a specified channel is used. Thus, even when spectrum of a specific channel suffers from distortion having frequency characteristics, the spectrum transmitting the information receives the same distortion only, which lessening the effect of the frequency-selective fading. Further, in comparison with the fading period, the symbol interval is much shorter, and thus, the frequency characteristics of the frequency-selective fading distortion become quasi-stationary in adjacent symbol intervals. Thus, by countervailing the phase errors in the adjacent symbol intervals, the differential CDMA transmission system can suppress the frequency-selective fading almost completely, which can realize a new level of high quality communication. On the other hand, with respect to slight deficiency that appears when the transmission band width is set to 6.40 MHz or less in the automobile telephone mode, it is considered that such deficiency is generated since the band width of the transmission signal is diffused over the limited frequency band width owing to a high speed fading phenomenon.

Figure 20:
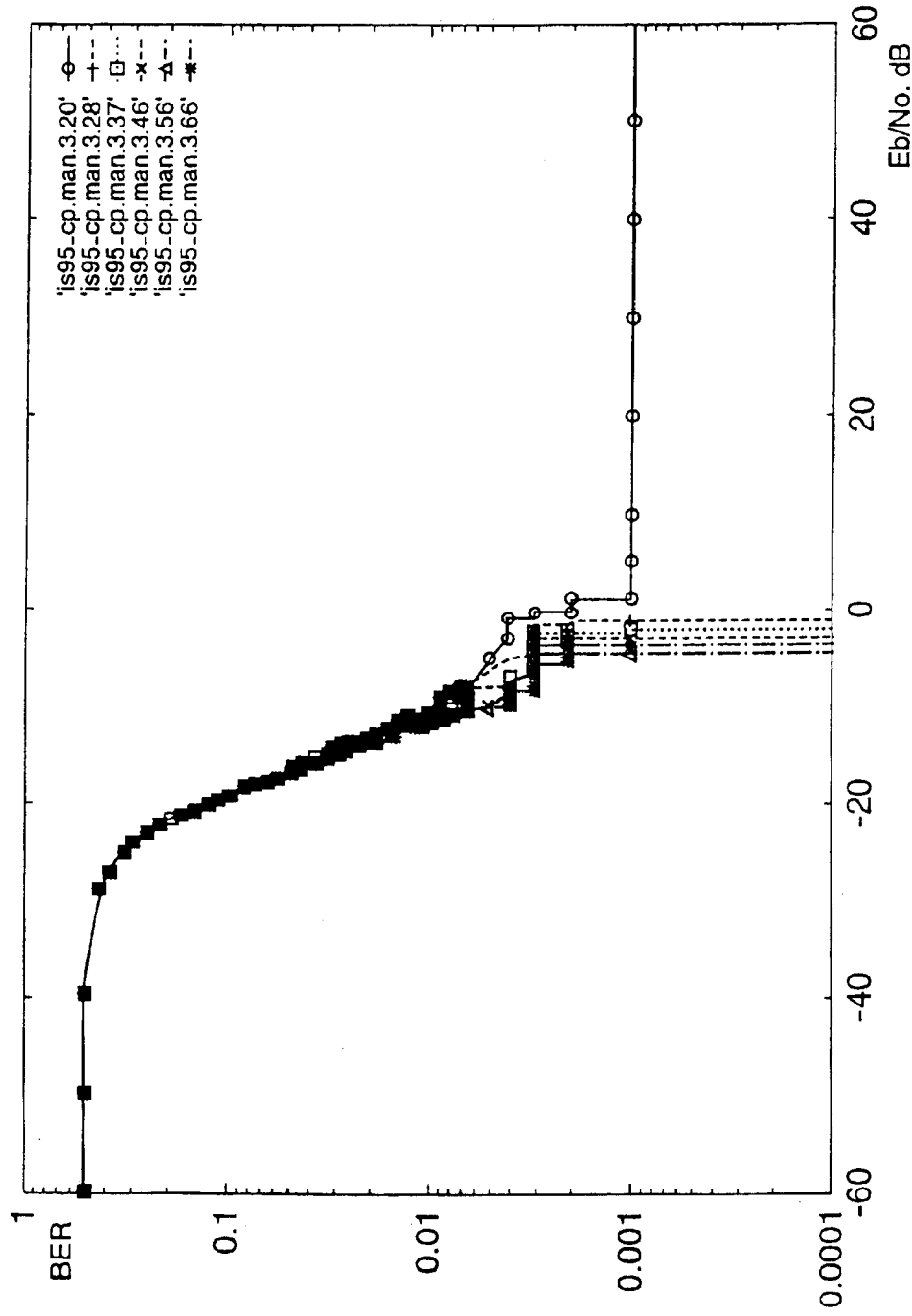
FIG. 20 is a graph showing examples of effect in the pedestrian telephone mode in the case that the phase continuous CDMA technique according to the present invention is applied to the conventional CDMA transmission system.

FIG. 20 (is95_cp.man) shows of simulating communication in the above-described pedestrian telephone mode in the case that the phase continuous technique of the present invention is applied to the conventional CDMA transmission system.

Figure 21:
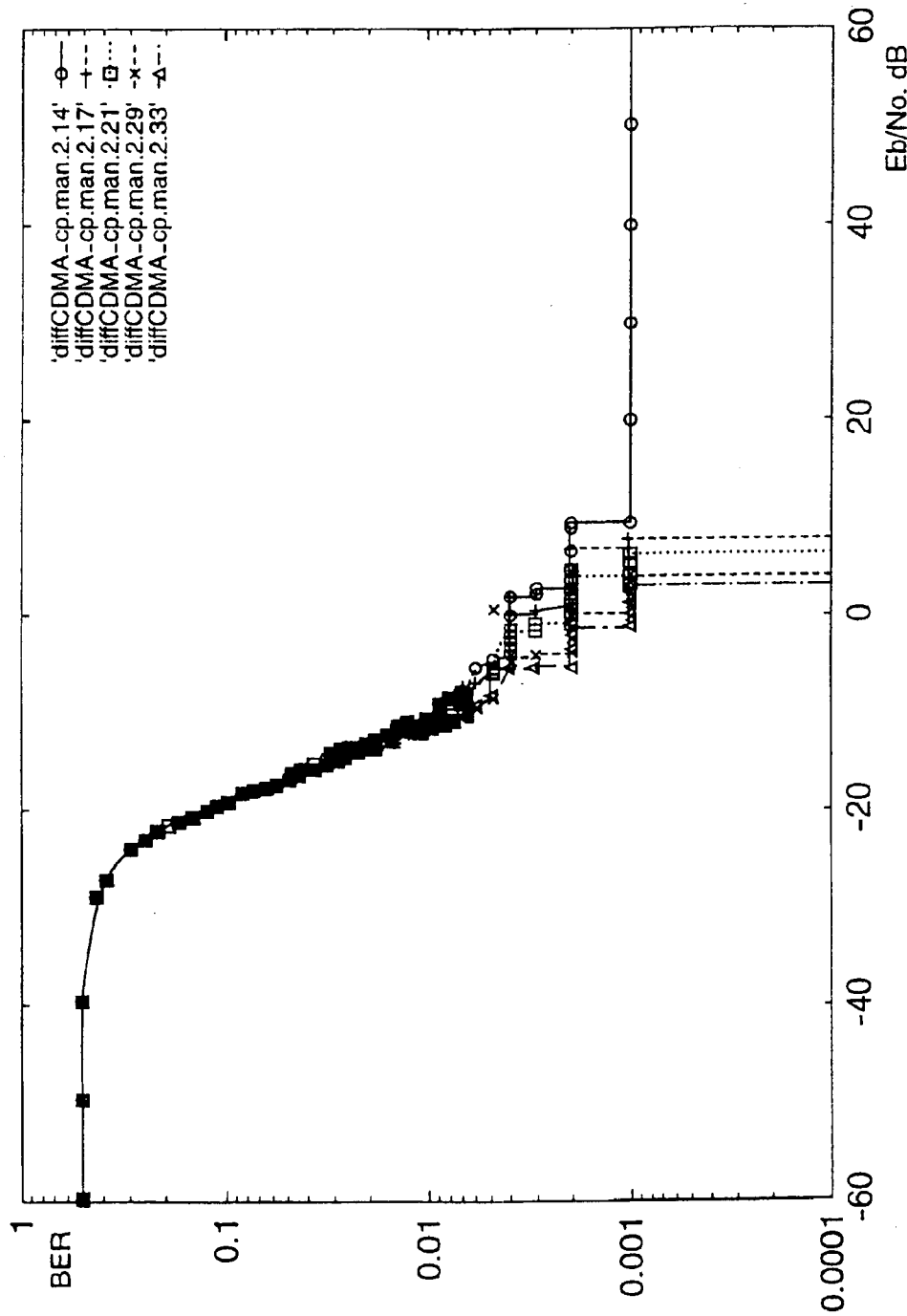
FIG. 21 is a graph showing examples of effect in the pedestrian telephone mode in the case that the phase continuous CDMA technique according to the present invention is applied to the differential CDMA transmission system.

The vertical axis indicates BER, and the horizontal axis indicates Eb/No. The critical transmission band width is observed to be 3.28 MHz. Thus, as obvious from comparison with the critical transmission band with of 3.46 MHz observed in the conventional CDMA transmission system of FIG. 37 to which the phase continuous technique is not applied, the band width can be narrower. Further, FIG. 21 (diffCDMA_cp.man) shows results of simulating communication in the same pedestrian telephone mode (diffCDMA_cp.man) in the case that the phase continuous technique is applied to the differential CDMA transmission system of FIG. 1. The critical transmission band width can be observed to be 2.17 MHz, which is further narrower than the critical transmission band width 2.25 MHz of the differential CDMA transmission system shown in FIG. 17. Thus, the effect of the phase continuous technique is confirmed.

Figure 22:
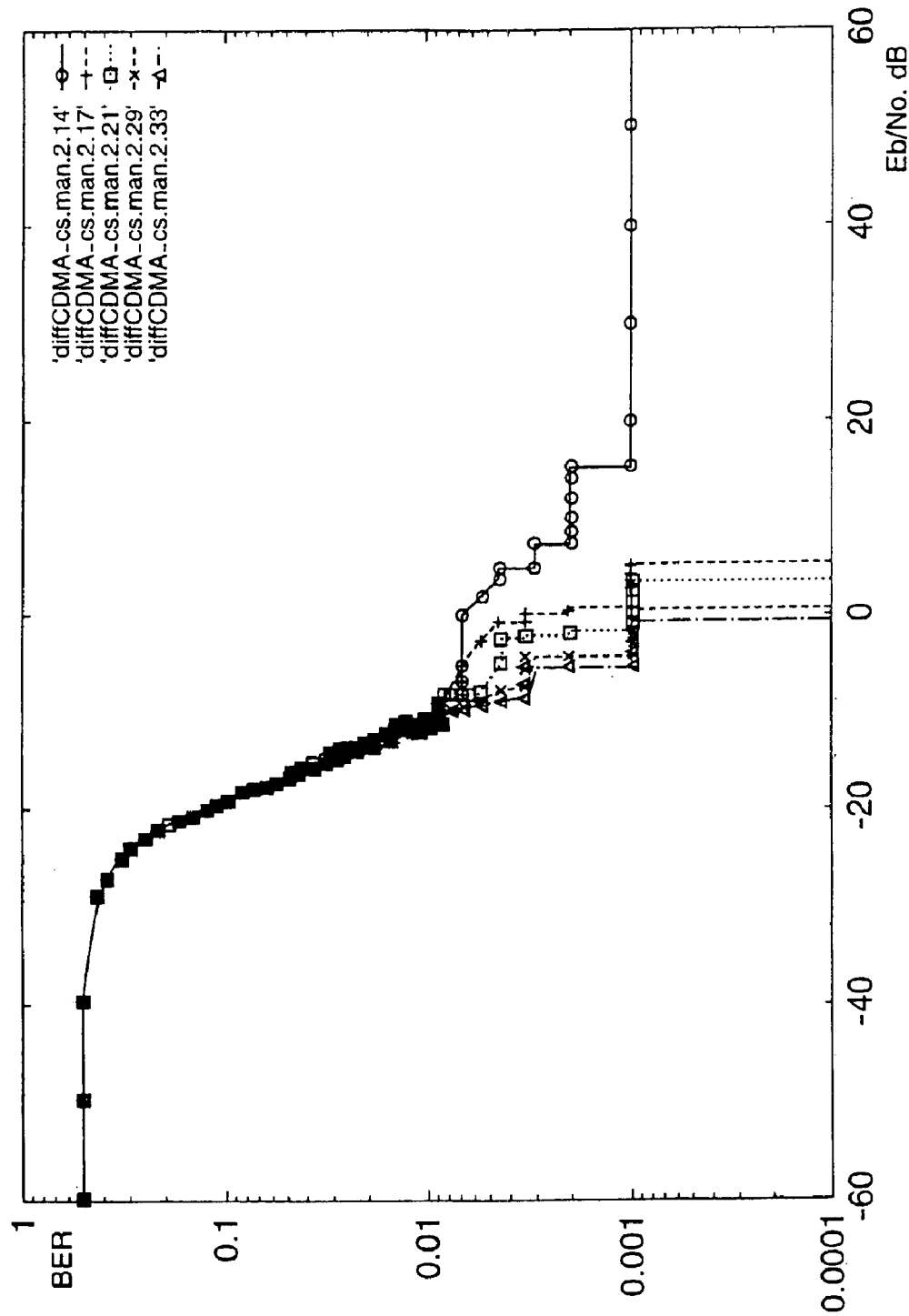
FIG. 22 is a graph showing examples of effect in the pedestrian telephone mode in the case that the chip waveform continuous CDMA technique according to the present invention is applied to the differential CDMA transmission system.

FIG. 22 (diffCDMA_cs.man) shows results of simulating communication in the pedestrian telephone mode in the case that the chip waveform continuating technique is applied to the differential CDMA transmission system of FIG. 1. The vertical axis indicates BER, and the horizontal axis indicates Eb/No. The critical transmission band width is observed to be 2.17 MHz, which is narrower than the critical transmission band width 2.25 MHz of the differential CDMA transmission system of FIG. 17 to which the chip waveform continuating technique is not applied. Thus, the effect of the chip waveform continuating technique is confirmed.

Figure 23:
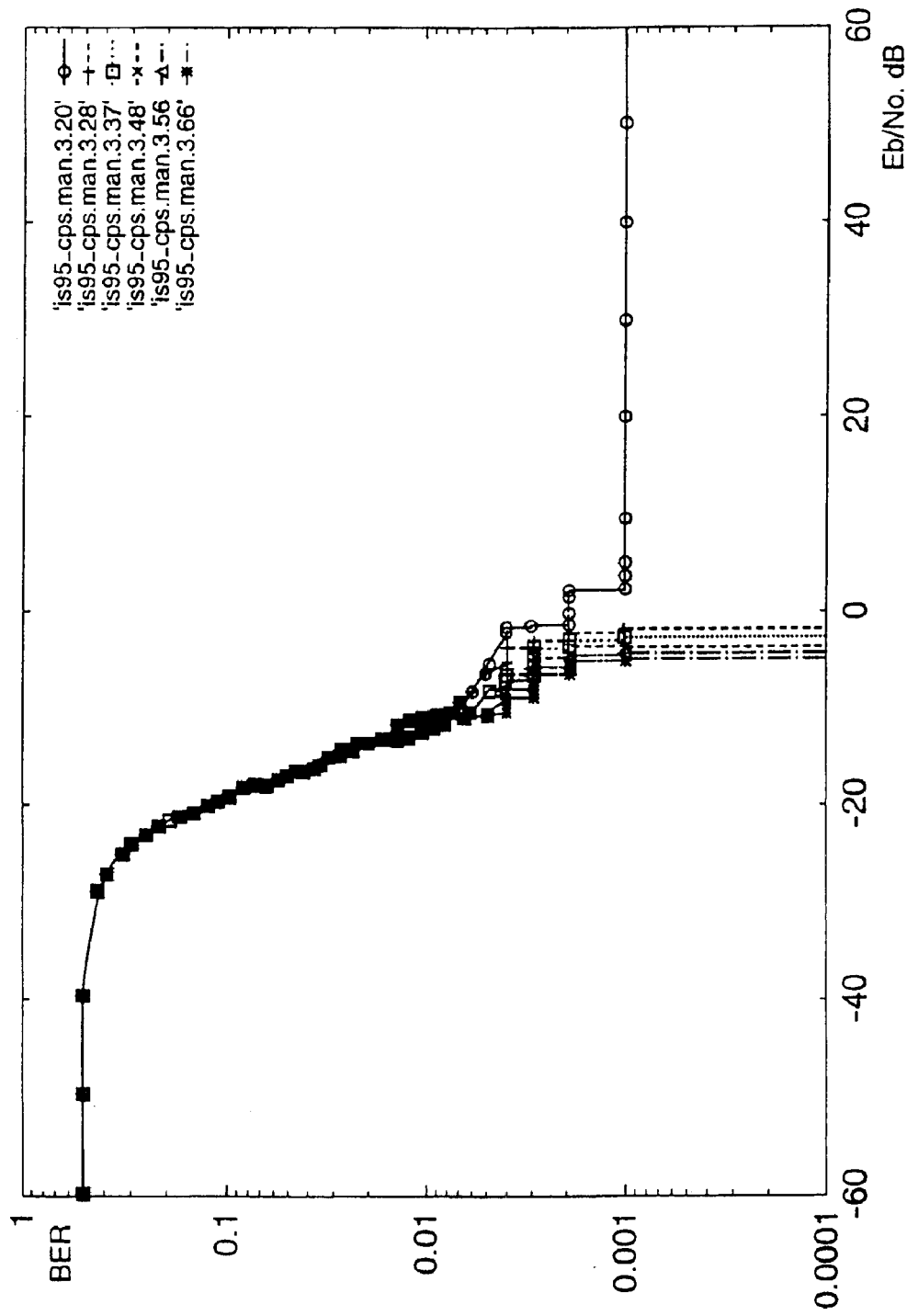
FIG. 23 is a graph showing examples of effect in the pedestrian telephone mode in the case that the phase continuous CDMA technique and the chip waveform continuous CDMA technique according to the present invention are applied to the conventional CDMA transmission system.
Figure 24:
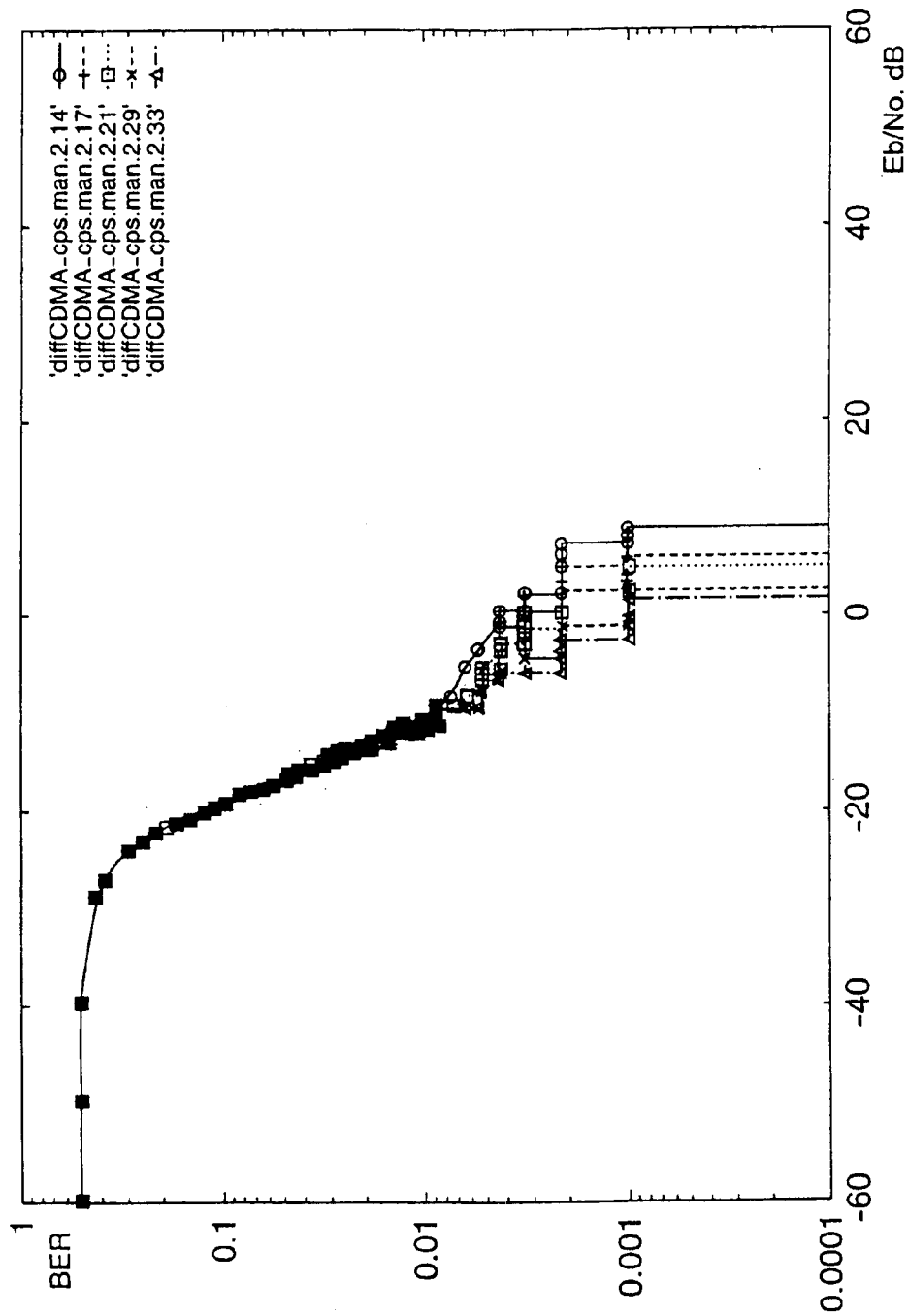
FIG. 24 is a graph showing examples of effect in the pedestrian telephone mode in the case that the phase continuous CDMA technique and the chip waveform continuous CDMA technique according to the present invention are applied to the differential CDMA transmission system.

FIG. 23 (is95_CPS.man) shows results of simulating communication in the pedestrian telephone mode in the case that the phase continuous technique and chip waveform technique of the present invention are applied to the conventional CDMA transmission system. The vertical axis indicates BER, and the horizontal axis indicates Eb/No. The critical transmission band width is observed to be 3.28 MHz, which is narrower than the critical transmission band width 3.46 MHz in the conventional CDMA transmission system of FIG. 37 to which the phase continuous and chip waveform continuating techniques are not applied. Further, FIG. 24 (diffCDMA_cps.man) shows results of simulating the pedestrian telephone mode (diffCDMA_cps.man) in the case that the phase continuous technique and chip waveform continuating technique are applied to the differential CDMA transmission system shown in FIG. 1. The vertical axis indicates BER, and the horizontal axis indicates Eb/No. The critical transmission band width is observed to be 2.14 MHz, which is narrower than the critical transmission band width 2.25 MHz in the conventional CDMA transmission system of FIG. 37 to which the phase continuous technique and chip wave continuating technique are not applied. Thus, the effect of simultaneous applying the phase continuous technique and chip waveform continuating techniqe is clearly shown.

Figure 25:
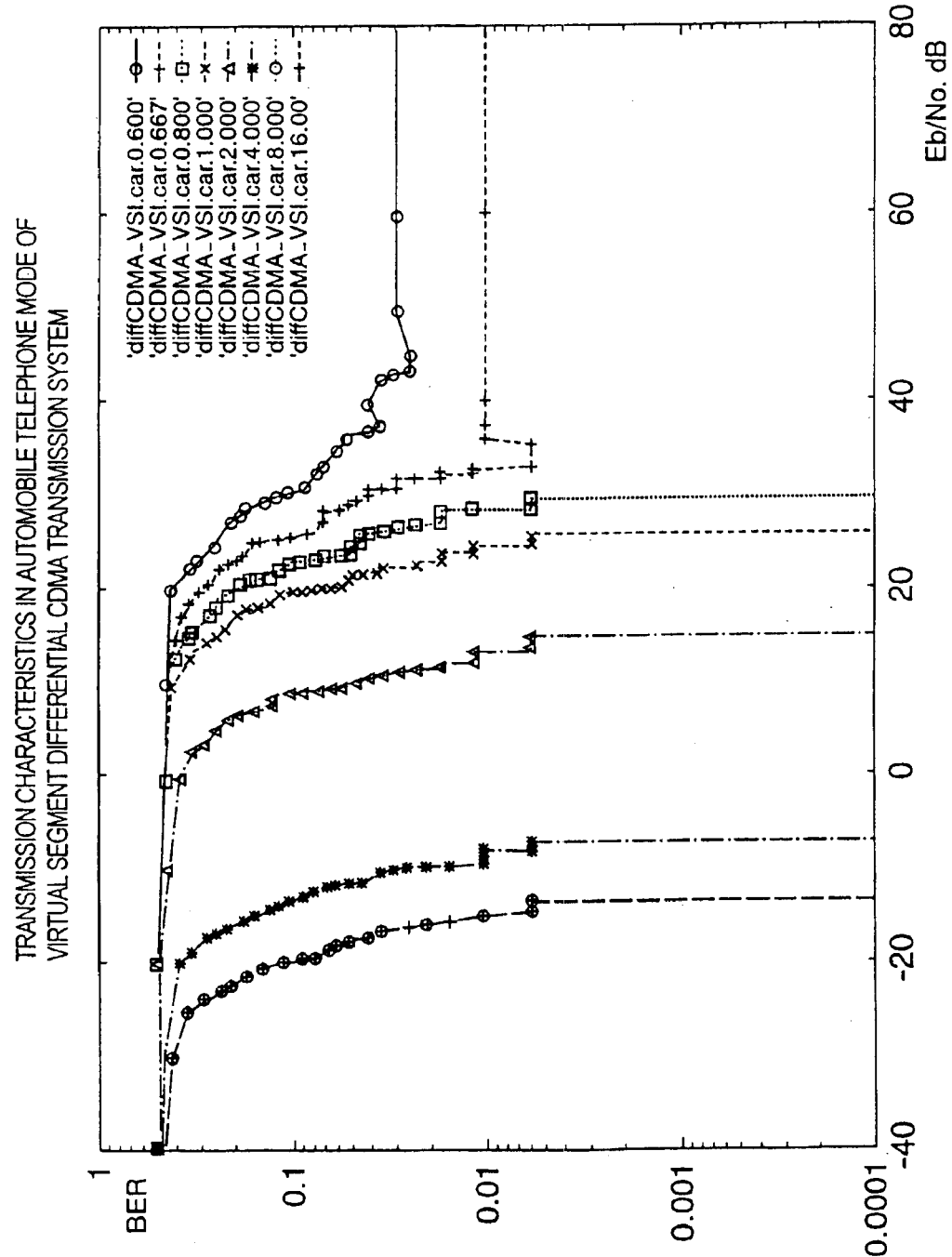
FIG. 25 is a graph showing examples of effect in the automobile telephone mode in the case that the virtual segment interleave despreading technique according to the present invention is applied to the differential CDMA transmission system.

FIG. 25 (diffCDMA_VSI.car) shows result of simulating communication in the automobile telephone mode in the case that the virtual segment interleave technique is applied to the differential CDMA transmission system of FIG. 1. The vertical axis indicates BER, and the horizontal axis indicates Eb/No. The critical transmission band width is observed to be 0.80 MHz, which is narrower than the critical transmission band width 6.74 MHz in the differential CDMA transmission system of FIG. 18 to which the chip waveform continuating technique is not applied. Thus, the effect of the virtual segment interleaving technique can be confirmed. In this critical transmission band width, the frequency utilization efficiency is 2.5 bit/Hz, and showing remarkable improvement effect.

In the above-described embodiments, the present invention has been described taking an example of the radio transmission system. However, the present invention can be applied to the optical communication system using fiber etc., and similar effects as in the application to the radio communication can be obtained. Namely, drift of an emission wavelength, i.e. oscillating frequency of laser usually used as a light source which is a disturbance factor in the optical communication system, can be made to correspond to the already-described Doppler shift in the radio transmission system. As a mode of light that proceeds through a fiber core, may be mentioned a mode in which light proceeds straightly, and a mode in which light proceeds being slightly inclined and repeating reflection between a core and clad, for example. Lights of those modes interfere with each other, and this interference can be made to correspond to the fading phenomenon in the radio transmission system. Further, when optical communication develops from intensity to multiple coherent communication, drift of the oscillating frequency of a light source corresponding to the Doppler shift, inter-mode interference and inter-wavelength interference corresponding to the multi-ray fading will become more obvious, and the effect of the present invention will be more remarkable.

What is claimed is:

1. A code division multiple access transmission system, comprising:

on a transmitting side, a means for obtaining a primary modulated wave by performing differential coding phase modulation on a carrier signal in accordance with information; and a means for generating a spread signal including a plurality of basic and virtual segments, by multiplying said primary modulated wave by a spread code repeatedly a plurality of times, changing a time region, via said basic and virtual segments, within a symbol period, and for transmitting said generated spread signal; and on a receiving side, a means for detecting a phase difference between a past symbol and a present symbol, by performing quasi-synchronous detection and despreading, and difference operation; and a means for outputting the detected phase difference as information of said symbol.

2. A code division multiple access transmission system, comprising:

on a transmission side, a means for obtaining a primary modulated wave by performing phase modulation on a carrier signal in accordance with information;

a means for excluding rapid fluctuation of a phase value in a symbol end area of said primary modulated wave; and a means for generating a spread signal by multiplying said primary modulated wave, from which the rapid fluctuation of the phase value is excluded, by a spread code, and for transmitting said generated spread signal; and on a receiving side, a means for regenerating the information by despreading, said despreading being performed by obtaining a sum of values that, in turn, are obtained by multiplying the received spread signal by a corresponding despread code.

3. A code division multiple access transmission system, comprising:

on a transmitting side, a means for obtaining a primary modulated wave by performing phase modulation on a carrier signal in accordance with information;

a means for excluding rapid fluctuation of a value of a spread code in an end area of a spread code period; and a means for generating a spread signal by multiplying said primary modulated wave by a spread code, from which the rapid fluctuation of the value of the spread code is excluded, and for transmitting said generated spread signal; and on a receiving side, a means for regenerating the information by despreading, said despreading being performed by obtaining a sum of values that, in turn, are obtained by multiplying the received spread signal by a corresponding despread code.

4. A code division multiple access transmission system, comprising:

on a transmitting side, a means for obtaining a primary modulated wave by performing phase modulation on a carrier signal in accordance with information; and a means for generating a spread signal including a plurality of basic and virtual segments, by multiplying said primary modulated wave by a spread code sequence repeatedly a plurality of times, via said basic and virtual segments within a symbol period, and for transmitting said spread signal; and on a receiving side, a means for regenerating the information by despreading, said despreading being performed by obtaining a sum of values that, in turn, are obtained by multiplying basic and virtual segments of a received spread signal by a corresponding despread code sequence;

wherein said means for regenerating, on the receiving side, performs said despreading in virtual segments defined by superposing the said basic and virtual segments, changing a time region.

5. A code division multiple access transmission system comprising:

on a transmitting side, a means for obtaining a primary modulated wave by performing differential coding phase modulation on a carrier signal in accordance with information;

a means for excluding rapid fluctuation of a phase value in a symbol end area of said primary modulated wave; and a means for generating a spread signal including a plurality of transmission segments, by multiplying said primary modulated wave by a spread code repeatedly a plurality of times, changing a time region within a symbol period, and for transmitting said spread signal; and on a receiving side, a means for detecting a phase difference between a past symbol and a present symbol, by performing quasi-synchronous detection and despreading, and difference operation of a received spread signal; and a means for outputting the detected phase difference as information of said symbol.

6. A code division multiple access transmission system comprising:

on a transmitting side, a means for obtaining a primary modulated wave by performing differential coding phase modulation on a carrier signal in accordance with information;

a means for excluding rapid fluctuation of a spread code in an end area of a spread code period of said spread code; and a means for generating a spread signal including a plurality of transmission segments, by multiplying said primary modulated wave by a spread code repeatedly a plurality of times, changing a time region within a symbol period, and for transmitting said spread signal; and on a receiving side, a means for detecting a phase difference between a past symbol and a present symbol, by performing quasi-synchronous detection and despreading, and difference operation of a received spread signal; and a means for outputting the detected phase difference as information of said symbol.

7. The code division multiple access transmission system according to claim 1, further comprising, on the receiving side:

a means for regenerating the information by despreading, said despreading being performed by obtaining a sum of values that, in turn, are obtained by multiplying basic and virtual segments of the received spread signal by a corresponding despread code;

wherein said means for regenerating, on the receiving sides, performs said despreading in virtual segments defined by superposing the said basic and virtual segments, changing a time region.

8. The code division multiple access transmission system according to claim 5, further comprising, on the transmitting side:

a means for excluding rapid fluctuation of a spread code in an end area of a spread code period of said spread code.

9. The code division multiple access transmission system according to claim 5, further comprising, on the receiving side:

a means for regenerating the information by despreading, said despreading being performed by obtaining a sum of values that, in turn, are obtained by multiplying transmission segments of the received spread signal by a corresponding despread code;

wherein said means for regenerating, on the receiving side, performs said despreading in virtual segments defined by superposing the transmission segments, changing a time region.

10. The code division multiple access transmission system according to claim 6, further comprising, on the receiving side:

a means for regenerating the information by despreading, said despreading being performed by obtaining a sum of values that, in turn, are obtained by multiplying transmission segments of the received spread signal by a corresponding despread code;

wherein said means for regenerating, on the receiving side, performs said despreading in virtual segments defined by superposing the transmission segments, changing a time region.

11. The code division multiple access transmission system according to claim 8, further comprising, on the receiving side:

a means for regenerating the information by despreading, said despreading being performed by obtaining a sum of values that, in turn, are obtained by multiplying transmission segments of the received spread signal by a corresponding despread code;

wherein said means for regenerating, on the receiving side, performs said despreading in virtual segments defined by superposing the transmission segments, changing a time region.

12. The code division multiple access transmission system according to claim 2, further comprising, on the transmitting side:

a means for excluding rapid fluctuation of a spread code in an end area of a spread code period of said spread code.

13. The code division multiple access transmission system according to claim 2, wherein:

said means for regenerating, on the receiving side, performs said despreading in virtual segments defined by superposing the transmission segments.

14. The code division multiple access transmission system according to claim 12, wherein:

said means for regenerating, on the receiving side, performs said despreading in virtual segments defined by superposing the transmission segments.

15. The code division multiple access receiving system according to claim 3, wherein:

said means for regenerating, on the receiving side, performs said despreading in virtual segments defined by superposing the transmission segments.

16. The code division multiple access transmission system according to claim 4, further comprising, on the transmitting side:

a means for excluding rapid fluctuation of a spread code in an end area of a spread code period of said spread code sequence.

17. The code division multiple access transmission system according to claim 7, further comprising, on the transmitting side:

a means for excluding rapid fluctuation of a spread code in an end area of a spread code period of said spread code sequence.

* * * * *